US010380153B2

(12) United States Patent
Chomley

(10) Patent No.: US 10,380,153 B2
(45) Date of Patent: Aug. 13, 2019

(54) METHODS, CONTROLLERS AND DEVICES FOR ASSEMBLING A WORD

(71) Applicant: CHOMLEY CONSULTING PTY. LTD, Surrey Hills, Victoria (AU)

(72) Inventor: Timothy Michael Chomley, Surrey Hills (AU)

(73) Assignee: CHOMLEY CONSULTING PTY. LTD., Surrey Hills, Victoria (AU)

(*) Notice: Subject to any disclaimer, the term of this patent is extended or adjusted under 35 U.S.C. 154(b) by 229 days.

(21) Appl. No.: 14/403,564

(22) PCT Filed: May 30, 2013

(86) PCT No.: PCT/AU2013/000568
§ 371 (c)(1),
(2) Date: Nov. 24, 2014

(87) PCT Pub. No.: WO2013/177624
PCT Pub. Date: Dec. 5, 2013

(65) Prior Publication Data
US 2015/0134642 A1    May 14, 2015

(30) Foreign Application Priority Data
May 30, 2012   (AU) ................................ 2012902255
Apr. 12, 2013   (AU) ................................ 2013204311

(51) Int. Cl.
G06F 16/33    (2019.01)
G06F 3/023    (2006.01)
(Continued)

(52) U.S. Cl.
CPC ........ *G06F 16/3344* (2019.01); *G06F 3/0235* (2013.01); *G06F 3/0237* (2013.01); *G06F 3/04886* (2013.01); *G06F 17/276* (2013.01)

(58) Field of Classification Search
None
See application file for complete search history.

(56) References Cited

U.S. PATENT DOCUMENTS 5,953,541 A     9/1999  King et al.
6,377,965 B1 *  4/2002  Hachamovitch ...... G06F 17/276
                                                    715/203
(Continued)

FOREIGN PATENT DOCUMENTS

TW      201013466 A1    4/2010
WO      WO 2010/035574 A1    4/2010
WO      WO 2012/061701 A1    5/2012

OTHER PUBLICATIONS

International Search Report dated Aug. 2, 2013 issued in International Application No. PCT/AU2013/000568, filed May 30, 2013.
(Continued)

*Primary Examiner* — Uyen T Le
(74) *Attorney, Agent, or Firm* — Merchant & Gould P.C.

(57) ABSTRACT

A method of assembling a word comprising: a memory storing a sequence of one or more word components of the word; a word locator for locating a set of one or more valid words from a plurality of possible words, each valid word comprising a sequence of one or more word components corresponding to the sequence of word components stored in the memory; the processor receiving a user input from a keyboard device having a plurality of keys respectively associated with a plurality of possible word components; a word component determiner to validate that a user input word component is a valid subsequent word component that validly continues from the sequence of word components, and a word component adder of the processor adding the user input word component to the stored sequence of word components of the word.

16 Claims, 64 Drawing Sheets

(51) Int. Cl.
*G06F 3/0488* (2013.01)
*G06F 17/27* (2006.01)

(56) References Cited

U.S. PATENT DOCUMENTS

| | | | | |
|---|---|---|---|---|
| 7,447,627 | B2* | 11/2008 | Jessee | G06F 17/26 704/1 |
| 8,874,427 | B2* | 10/2014 | Ross | G06F 17/30985 341/107 |
| 9,400,782 | B2* | 7/2016 | Longe | G06F 3/0237 |
| 9,613,015 | B2* | 4/2017 | Badger | G06F 3/0237 |
| 2004/0136564 | A1* | 7/2004 | Roeber | G06F 3/0488 382/100 |
| 2005/0192802 | A1* | 9/2005 | Robinson | G06K 9/00872 704/240 |
| 2007/0100890 | A1* | 5/2007 | Kim | G06F 3/018 |
| 2007/0198514 | A1* | 8/2007 | Schwenke | G06F 17/30687 |
| 2009/0006543 | A1* | 1/2009 | Smit | G06F 17/30864 709/203 |
| 2010/0149107 | A1 | 6/2010 | Perry | |
| 2010/0277424 | A1 | 11/2010 | Chang et al. | |
| 2011/0210923 | A1 | 9/2011 | Pasquero et al. | |

OTHER PUBLICATIONS

International Preliminary Report on Patentability dated Mar. 18, 2014 issued in International Application No. PCT/AU2013/000568, filed May 30, 2013.
Internet Citation, "Eclipse 3.1 Java Development Tools—Basic Tutorial," retrieved from http://archive.eclipse.org/eclipse/downloads/drops/R-3.1-200506271435/, Jun. 28, 2005, printed on Jan. 13, 2017, (6 pages).
Extended European Search Report dated Oct. 27, 2015 in corresponding European Application No. 13797730.2, in 38 pages.
Second Patent Examination Report dated Mar. 18, 2016 in corresponding Australian Application No. 2013204311, in 3 pages.
First Office Action dated Aug. 9, 2016 in corresponding Chinese Application No. 201380027905.1, in 13 pages.
Second Office Action dated Mar. 20, 2017 in corresponding Chinese Application No. 201380027905.1, in 15 pages.

* cited by examiner

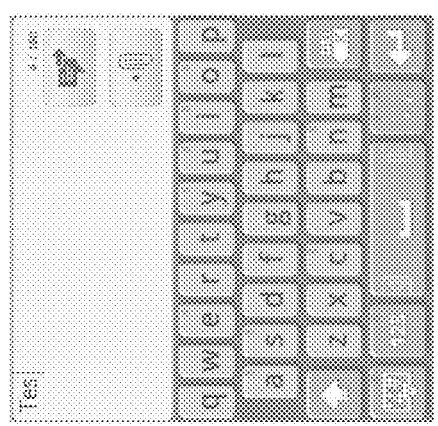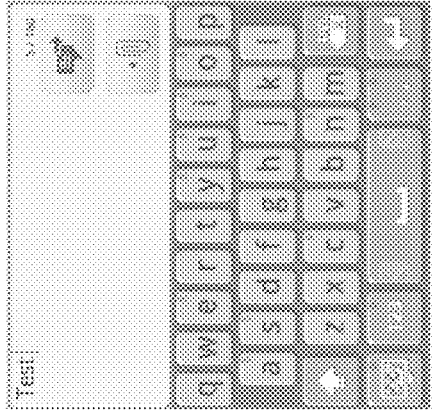
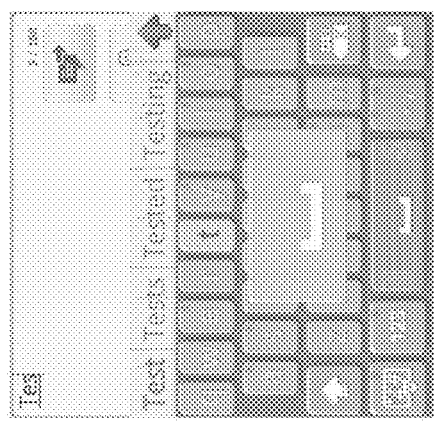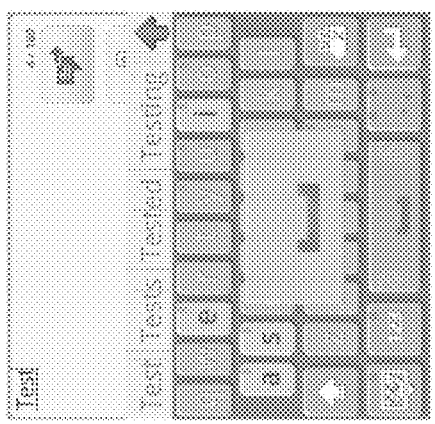
Figure 22A
Figure 22B
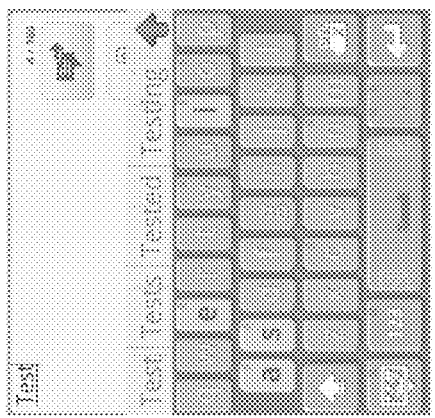

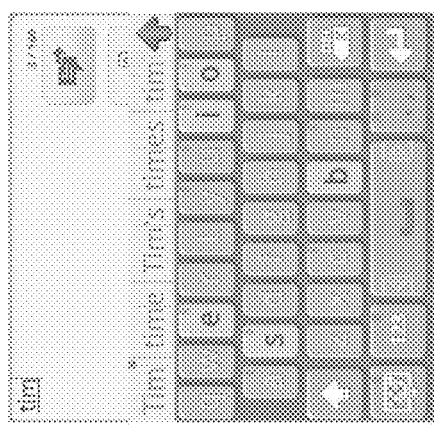
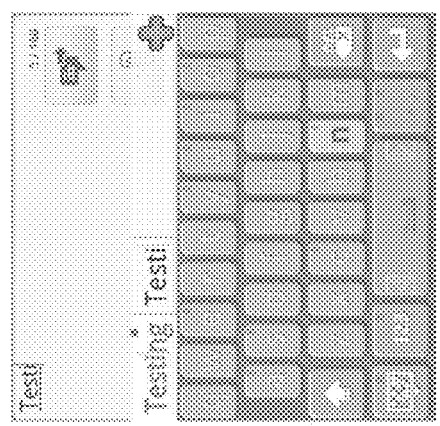
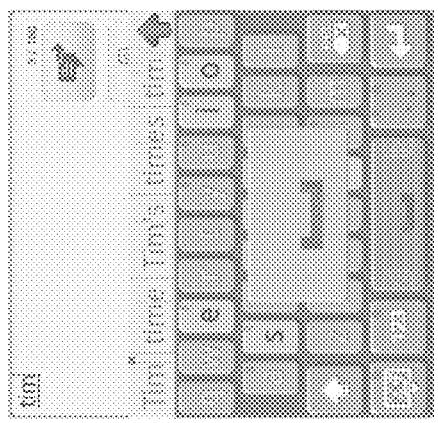
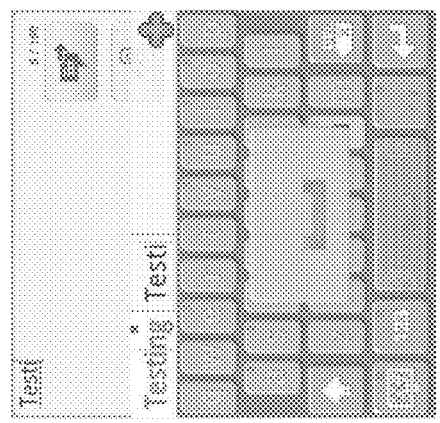
Figure 22C
Figure 22D
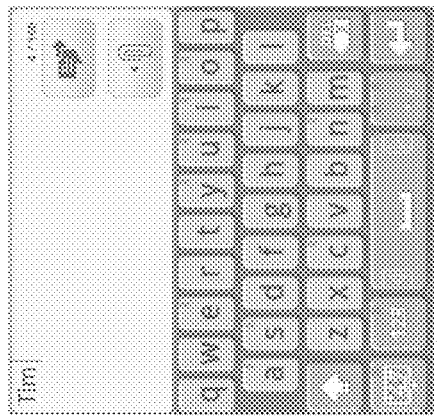
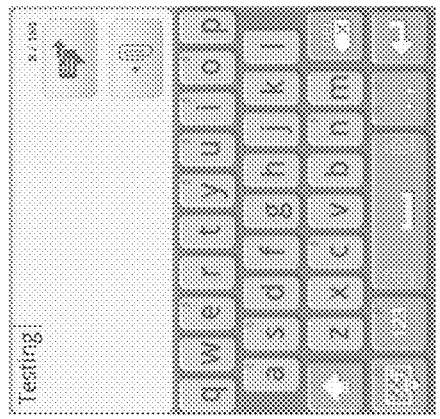

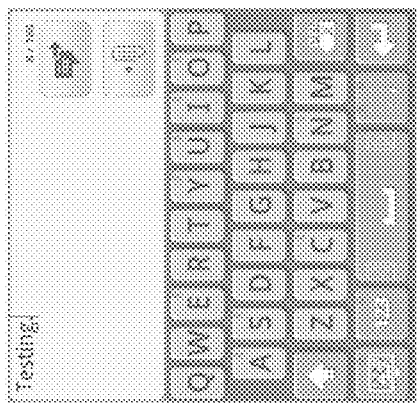 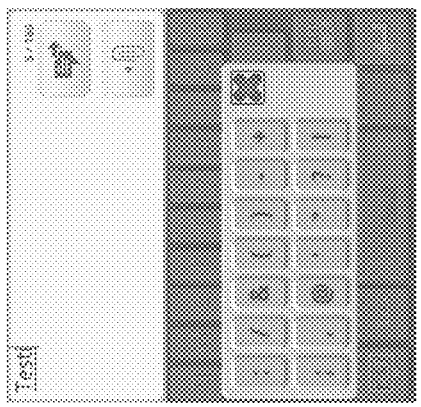
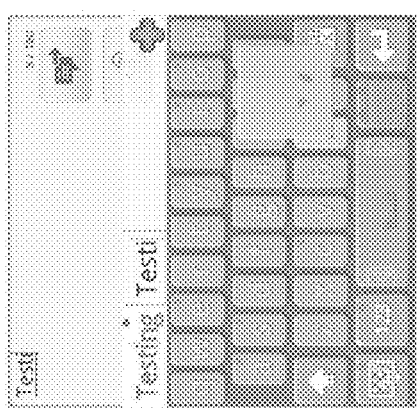 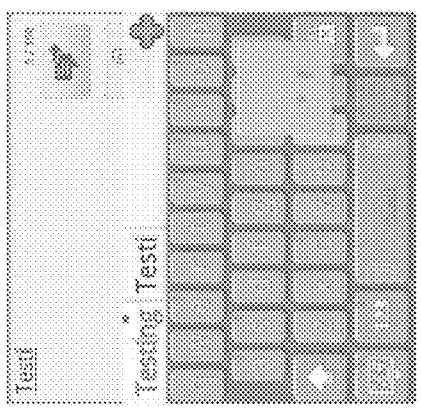
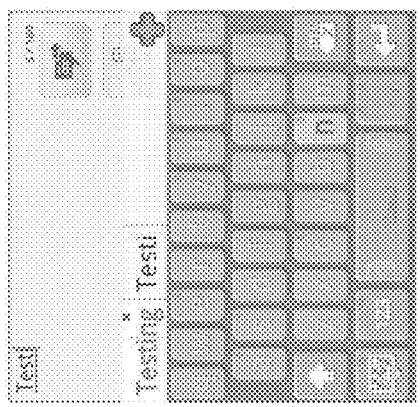 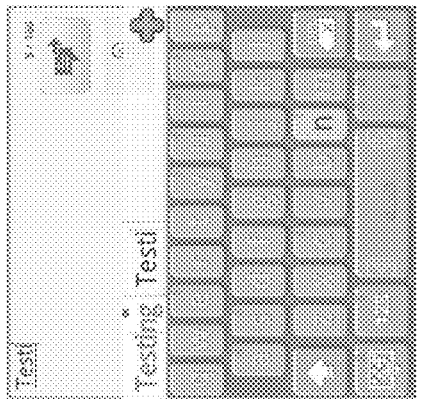
Figure 23A  Figure 23B

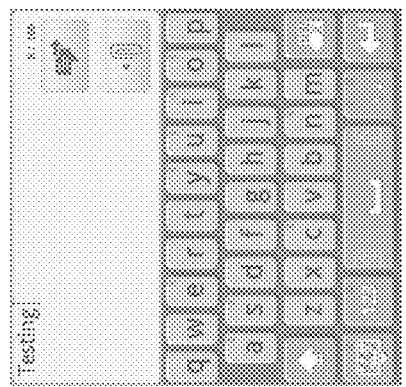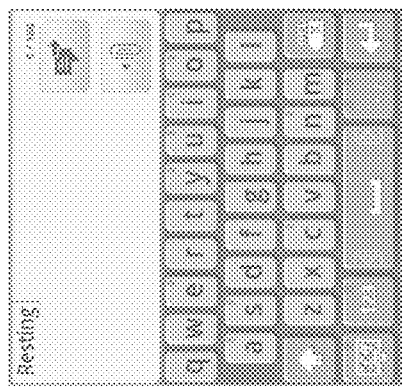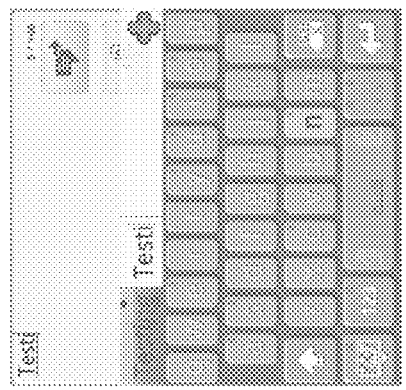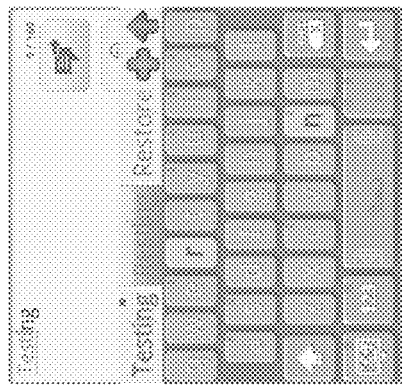
Figure 24A
Figure 24B
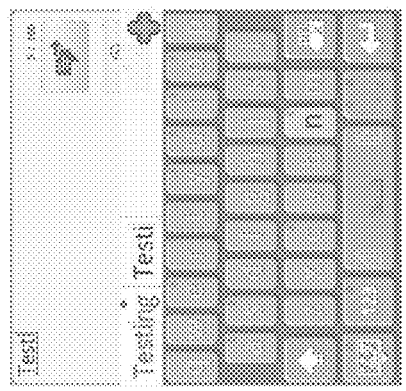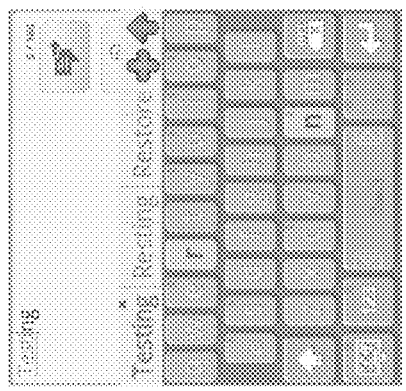

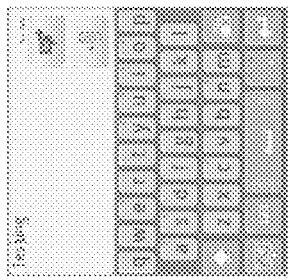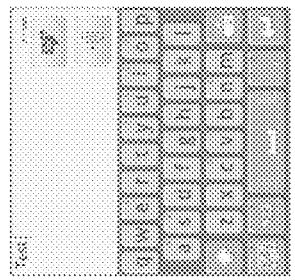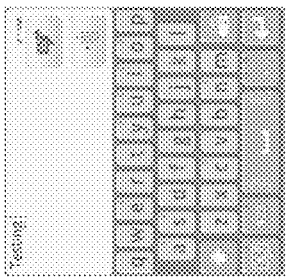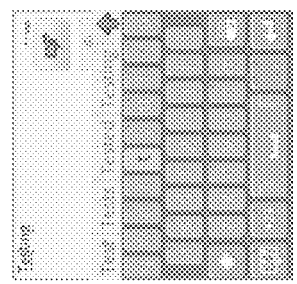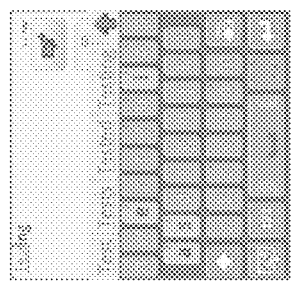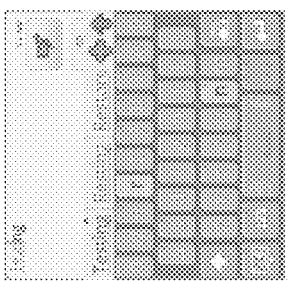
Figure 26A
Figure 26B
Figure 26C

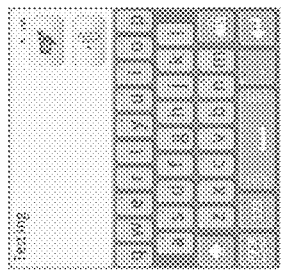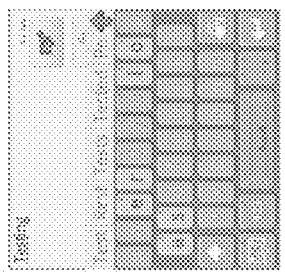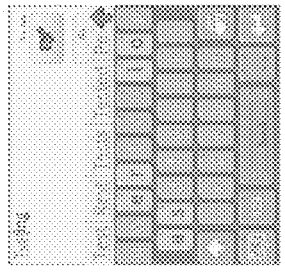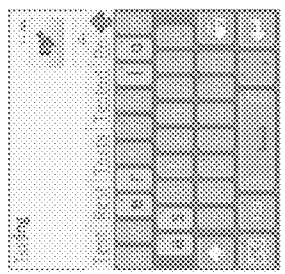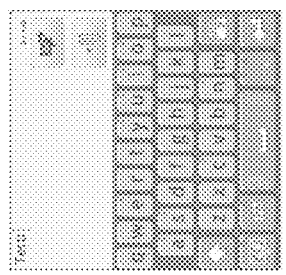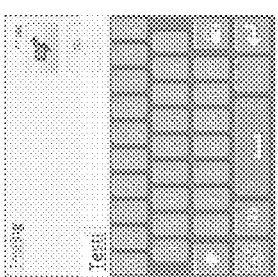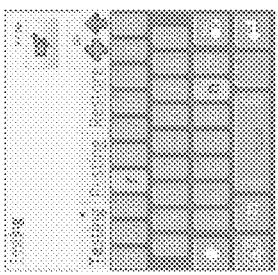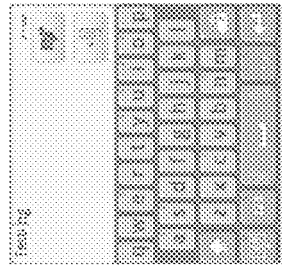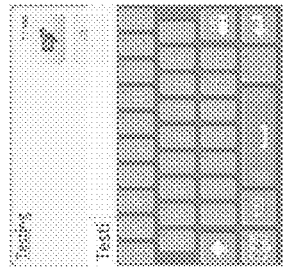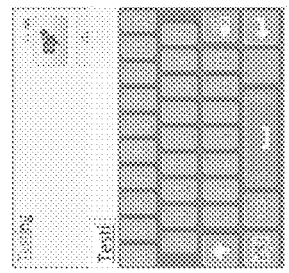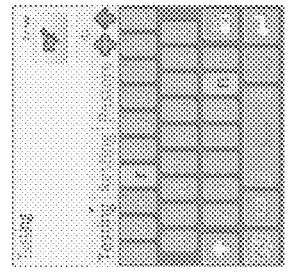
Figure 26E Figure 26F Figure 26G

METHODS, CONTROLLERS AND DEVICES FOR ASSEMBLING A WORD

RELATED APPLICATIONS

This application claims the benefit of the priority of Australian provisional application no. 2012902255 and the priority of Australian standard application no. 2013204311. The content of Australian provisional application no. 201290255 and the content of Australian standard application no. 2013204311 are incorporated by reference in their entireties.

FIELD

The present invention relates to methods, controllers and devices for assembling a word, and is of particular but by no means exclusive application in assembling a word using a keyboard device displayed on a touchscreen.

BACKGROUND

In smartphones, the user input device is typically a software-implemented virtual keyboard displayed by a touchscreen of the smartphone. To assemble or type a word, a user touches the touchscreen at positions corresponding to the keys of the keyboard associated with the letters of the word. The keys displayed by the touchscreen are normally smaller than the keys of a typical computer keyboard. Thus, it is more common for a user to type a wrong letter on a touchscreen of a smartphone than on a conventional keyboard.

There is a need for an improved or alternative technique for assembling a word using a keyboard displayed on a touchscreen.

SUMMARY OF THE INVENTION

In a first aspect, the present invention provides a method of assembling a word comprising a sequence of word components according to one or more word assembly conventions, the method comprising:
 a memory storing a sequence of one or more word components of the word;
 a word locator of a processor locating a set of one or more valid words from a plurality of possible words stored in a words database, each valid word comprising a sequence of one or more word components corresponding to the sequence of word components stored in the memory;
 the processor receiving a user input from a keyboard device having a plurality of keys respectively associated with a plurality of possible word components, the received user input corresponding to one of the keys of the keyboard device;
 a word component determiner of the processor determining that a user input word component is a valid subsequent word component that validly continues from the sequence of word components stored in the memory based on the set of valid words located by the word locator, the user input word component being the possible word component associated with the key of the keyboard device corresponding to the user input received by the processor; and
 a word component adder of the processor adding the user input word component to the stored sequence of word components of the word.

In an embodiment, the method further comprises:
 a display controller of the processor controlling a display to display the keys of the keyboard device; and
 in response to the word locator locating the set of valid words:
  the word component determiner determining a set of one or more valid subsequent word components based on the set of valid words located by the word locator, wherein each valid subsequent word component validly continues from the sequence of word components stored in the memory; and
  the display controller controlling the display to modify the display of the key associated with each valid subsequent word component.

In an embodiment, the method further comprises the display controller controlling the display to display one or more, or all, of the valid words located by the word locator, in response to the word locator locating the set of valid words.

In an embodiment, each word component is a Latin alphabetic letter.

In an embodiment, the possible word components comprise the 26 Latin alphabetic letters.

In an embodiment, the word is a logographic character, and each word component is a character stroke.

In an embodiment, the keyboard device is a software-implemented keyboard displayed on a display.

In an embodiment, the method further comprises:
 in response to the processor receiving the user input, the word locator locating a set of one or more additional valid words from the plurality of possible words stored in the words database, each additional valid word comprises a sequence of one or more word components corresponding to a subset of the sequence of word components stored in the memory.

In an embodiment, the method further comprises the display controller controlling the display to display one or more, or all, of the additional valid words located by the word locator.

In an embodiment, the method further comprises:
 in response to the word locator locating the set of valid words:
  a valid word set size determiner of the processor determining that the set of valid words consists of only one valid word; and
  the display controller controlling the display to modify the display of the valid word.

In an embodiment, the method further comprises:
 in response to the word locator locating the set of additional valid words:
  a valid word set size determiner determining that the set of additional valid words consists of only one additional valid word, the display controller controlling the display to modify the display of the additional valid word.

In an embodiment, the method further comprises:
 in response to the word component adder adding a word component to the sequence of word components stored in the memory:
  a letter number comparator of the processor determining that the stored sequence of word components of the word has the same number of word components as one of the set of valid words; and
  the display controller controlling the display to modify the display of the valid word that has the same number of word components as the stored sequence of word components of the word.

In an embodiment, the method further comprises:
in response to the word component adder adding a word component to the sequence of word components stored in the memory:
- a letter number comparator of the processor determining that the stored sequence of word components of the word does not have the same number of word components as one of the set of valid words; and
- the display controller controlling the display to modify the display of the valid word that does not have the same number of word components as the stored sequence of word components of the word.

In an embodiment, the method further comprises:
in response to the word locator locating the set of more than one valid words:
- a common word component determiner of the processor determining that each of the valid words comprises a sequence of one or more common subsequent valid word components that (i) are common to all valid words, and that (ii) validly continue from the sequence of word components stored in the memory; and
- the character adder adding the sequence of common subsequent valid word components to the sequence of word components stored in the memory.

In an embodiment, each of the possible words stored in the words database is categorized into one of a plurality of word categories, and the set of valid words located by the word locator is based on the word category of a previous assembled word.

In a second aspect, the present invention provides a method of assembling a word comprising a sequence of word components according to one or more word assembly conventions, the method comprising:
- a memory storing a sequence of one or more word components of the word;
- a word locator of a processor locating a set of one or more valid words from a plurality of possible words stored in a words database, each valid word comprising a sequence of one or more word components corresponding to the sequence of word components stored in the memory;
- a word component determiner of the processor determining a set of one or more valid subsequent word components based on the set of valid words located by the word locator, wherein each valid subsequent word component validly continues from the sequence of word components stored in the memory;
- a display controller controlling the display to display a keyboard device having a plurality of keys respectively associated with a plurality of possible word components; and
- the processor receiving a user input from the keyboard device, the received user input corresponding to one of the keys of the keyboard device;
- a key position determiner of the processor determining a display position of the key associated with the possible word component corresponding to each valid subsequent word component;
- a closest key determiner of the processor determining which one of the keys associated with the possible word components corresponding to the valid subsequent word components is displayed closest to the key corresponding to the user input; and
- a word component adder of the processor adding to the sequence of word components stored in the memory the possible word component corresponding to the valid subsequent word component associated with the key determined by the closest key determiner to be displayed closest to the key corresponding to the user input.

In an embodiment, the method further comprises the display controller controlling the display to modify the display of the key associated with the possible word component corresponding to each valid subsequent word component.

In an embodiment, the method further comprises the display controller controlling the display to display the possible word component corresponding to the valid subsequent word component associated with the key determined by the closest key determiner to be displayed closest to the key corresponding to the user input.

In an embodiment, the method further comprises the display controller controlling the display to display one or more, or all, of the valid words located by the word locator, in response to the word locator locating the set of valid words.

In an embodiment, each word component is a Latin alphabetic letter.

In an embodiment, the possible word components comprise the 26 Latin alphabetic letters.

In an embodiment, the word is a logographic character, and each word component is a character stroke.

In an embodiment, the keyboard device is a software-implemented keyboard displayed on a display.

In an embodiment, the method further comprises:
in response to the processor receiving the user input, the word locator locating a set of one or more additional valid words from the plurality of possible words stored in the words database, each additional valid word comprises a sequence of one or more word components corresponding to a subset of the sequence of word components stored in the memory.

In an embodiment, the method further comprises the display controller controlling the display to display one or more, or all, of the additional valid words located by the word locator.

In an embodiment, the method further comprises:
in response to the word locator locating the set of valid words:
- a valid word set size determiner of the processor determining that the set of valid words consists of only one valid word; and
- the display controller controlling the display to modify the display of the valid word.

In an embodiment, the method further comprises:
in response to the word locator locating the set of additional valid words:
- a valid word set size determiner determining that the set of additional valid words consists of only one additional valid word, the display controller controlling the display to modify the display of the additional valid word.

In an embodiment, the method further comprises:
in response to the word component adder adding a word component to the sequence of word components stored in the memory:
- a letter number comparator of the processor determining that the stored sequence of word components of the word has the same number of word components as one of the set of valid words; and
- the display controller controlling the display to modify the display of the valid word that has the same number of word components as the stored sequence of word components of the word.

In an embodiment, the method further comprises:
in response to the word component adder adding a word component to the sequence of word components stored in the memory:
  a letter number comparator of the processor determining that the stored sequence of word components of the word does not have the same number of word components as one of the set of valid words; and
  the display controller controlling the display to modify the display of the valid word that does not have the same number of word components as the stored sequence of word components of the word.

In an embodiment, the method further comprises:
in response to the word locator locating the set of more than one valid words:
  a common word component determiner of the processor determining that each of the valid words comprises a sequence of one or more common subsequent valid word components that (i) are common to all valid words, and that (ii) validly continue from the sequence of word components stored in the memory; and
  the character adder adding the sequence of common subsequent valid word components to the sequence of word components stored in the memory.

In an embodiment, each of the possible words stored in the words database is categorized into one of a plurality of word categories; and
  the set of valid words located by the word locator is based on the word category of a previous assembled word.

In a third aspect, the present invention provides a method of assembling a word comprising a sequence of word components according to one or more word assembly conventions, the method comprising:
  a memory storing a sequence of one or more word components of the word;
  a word locator of a processor locating a set of one or more valid words from a plurality of possible words stored in a words database, each valid word comprising a sequence of one or more word components corresponding to the sequence of word components stored in the memory;
  the processor receiving a user input from a keyboard device having a plurality of keys respectively associated with a plurality of possible word components, the received user input corresponding to one of the keys of the keyboard device;
  a word component determiner of the processor determining that the user input word component is a valid further subsequent word component based on the set of valid words located by the word locator, the valid further subsequent word component being a word component that validly continues from one or more intermediate word components that in turn continue from the sequence of word components stored in the memory; and
  a word component adder of the processor adding the user input word component and the intermediate word components to the sequence of word components stored in the memory.

In an embodiment, the word component determiner determined that the user input word component is not a valid subsequent word component.

In an embodiment, the one or more intermediate word components consist of a punctuation mark.

In an embodiment, the method further comprises:
in response to the processor receiving the user input:
  an alternative word component locator of the processor locating an alternative word component from an alternative word component database comprising one or more sets of alternative word components associated with respective word components, based on the user input word component;
  the word component determiner determining that the alternative word component is a valid subsequent word component continuing from the sequence of word components stored in the memory based on the set of valid words located by the word locator; and
  the word component adder adding the alternative input word component to the sequence of word components stored in the memory.

In an embodiment, the alternative word component locator locates the alternative word component based on the user input word component in response to a determination by the word component determiner that the user input word component is not a valid subsequent word component.

In a fourth aspect, the present invention provides a method of assembling a word comprising a sequence of word components according to one or more word assembly conventions, the method comprising:
  a memory storing a sequence of one or more word components of the word;
  a word locator of a processor locating a set of one or more additional valid words from a plurality of possible words stored in a words database, each additional valid word comprising a sequence of one or more word components corresponding to a subset of the sequence of word components stored in the memory;
  the processor receiving a user input from a keyboard device having a plurality of keys respectively associated with a plurality of possible word components, the received user input corresponding to one of the keys of the keyboard device;
  a word component determiner of the processor determining that a user input word component is a valid subsequent word component that validly continues from the sequence of word components stored in the memory based on the set of additional valid words located by the word locator, the user input word component being the possible word component associated with the key of the keyboard device corresponding to the user input received by the processor; and
  a word component adder of the processor adding the user input word component to the sequence of word components stored in the memory.

In an embodiment, the method further comprises:
a display controller of the processor controlling a display to display the keys of the keyboard device; and
in response to the word locator locating the set of additional valid words:
  the word component determiner determining a set of one or more valid subsequent word components based on the set of additional valid words located by the word locator; and
  the display controller controlling the display to modify the display of the key associated with each valid subsequent word component.

In an embodiment, the method further comprises the display controller controlling a display to display one or more, or all, of the additional valid words located by the word locator.

In an embodiment, each word component is a Latin alphabetic letter.

In an embodiment, the possible word components comprise the 26 Latin alphabetic letters.

In an embodiment, the word is a logographic character, and each word component is a character stroke.

In an embodiment, the keyboard device is a software-implemented keyboard displayed on a display.

In an embodiment, the method further comprises:
in response to the word locator locating the set of additional valid words:
 a valid word set size determiner of the processor determining that the set of additional valid words consists of only one additional valid word; and
 the display controller controlling the display to modify the display of the additional valid word.

In an embodiment, the method further comprises:
in response to the word component adder adding a word component to the sequence of word components stored in the memory:
 a letter number comparator of the processor determining that the stored sequence of word components of the word has the same number of word components as one of the set of additional valid words; and
 the display controller controlling the display to modify the display of the additional valid word that has the same number of word components as the stored sequence of word components of the word.

In an embodiment, the method further comprises:
in response to the word component adder adding a word component to the sequence of word components stored in the memory:
 a letter number comparator of the processor determining that the stored sequence of word components of the word does not have the same number of word components as one of the set of additional valid words; and
 the display controller controlling the display to modify the display of the additional valid word that does not have the same number of word components as the stored sequence of word components of the word.

In an embodiment, the method further comprises:
in response to the word locator locating a set of more than one additional valid word:
 a common word component determiner of the processor determining that each of the additional valid words comprises a sequence of one or more common subsequent valid word components that (i) are common to all additional valid words, and that (ii) validly continue from the sequence of word components stored in the memory; and
 the character adder adding the sequence of common subsequent valid word components to the sequence of word components stored in the memory.

In an embodiment, each of the possible words stored in the words database is categorized into one of a plurality of word categories, and the set of additional valid words located by the word locator is based on the word category of a previous assembled word.

In a fifth aspect, the present invention provides a method of assembling a word comprising a sequence of word components according to one or more word assembly conventions, the method comprising:
 a memory storing a sequence of one or more word components of the word;
 a word locator of a processor locating one valid word from a plurality of possible words stored in a words database, the valid word comprising a sequence of one or more word components corresponding to the sequence of word components stored in the memory;
 a display controller of the processor controlling a display to display the valid word;
 a valid word set size determiner of the processor determining that only one valid word is located by the word locator; and
 the display controller controlling the display to modify the display of the valid word.

In a sixth aspect, the present invention provides a method of assembling a word comprising a sequence of word components according to one or more word assembly conventions, the method comprising:
 a memory storing a sequence of one or more word components of the word;
 a word locator of a processor locating one valid word from a plurality of possible words stored in a words database, the valid word comprising a sequence of one or more word components corresponding to the sequence of word components stored in the memory;
 a display controller of the processor controlling a display to display the valid word.
 a valid word set size determiner of the processor determining that the set of additional valid words consists of only one additional valid word, the display controller controlling the display to modify the display of the additional valid word.

In a seventh aspect, the present invention provides a method of assembling a word comprising a sequence of word components according to one or more word assembly conventions, the method comprising:
 a memory storing a sequence of one or more word components of the word;
 a word locator of a processor locating a set of one or more valid words from a plurality of possible words stored in a words database, each valid word comprising a sequence of one or more valid word components including a sequence of one or more word components corresponding to the sequence of word components stored in the memory;
 a display controller of the processor controlling a display to display one or more, or all, of the valid words located by the word locator;
 a letter number comparator determining that the stored sequence of word components of the word has the same number of word components as one of the set of valid words; and
 the display controller controlling the display to modify the display of the valid word that has the same number of word components as the stored sequence of word components of the word.

In an eighth aspect, the present invention provides a method of assembling a word comprising a sequence of word components according to one or more word assembly conventions, the method comprising:
 a memory storing a sequence of one or more word components of the word;
 a word locator of a processor locating a set of one or more valid words from a plurality of possible words stored in a words database, each valid word comprising a sequence of one or more valid word components including a sequence of one or more word components corresponding to the sequence of word components stored in the memory;

a display controller of the processor controlling a display to display one or more, or all, of the valid words located by the word locator;

a letter number comparator determining that the stored sequence of word components of the word does not have the same number of word components as one of the set of valid words; and the display controller controlling the display to modify the display of the valid word that does not have the same number of word components as the stored sequence of word components of the word.

In a ninth aspect, the present invention provides a method of assembling a word comprising a sequence of word components according to one or more word assembly conventions, the method comprising:

a memory storing a sequence of one or more word components of the word;

a word locator of a processor locating a set of one or more valid words from a plurality of possible words stored in a words database, each valid word comprising a sequence of one or more word components corresponding to the sequence of word components stored in the memory;

a common word component determiner of the processor determining that each of the located valid words comprises a sequence of one or more common subsequent valid word components that (i) are common to all valid words, and that (ii) validly continue from the sequence of word components stored in the memory; and a character adder of the processor adding the sequence of common subsequent valid word components to the sequence of word components stored in the memory.

In a tenth aspect, the present invention provides a method of assembling a sequence of words comprising a first word and a second word, the method comprising:

a memory storing the first word;

a word locator of a processor locating a valid word corresponding to the first word from a plurality of possible words stored in a words database, each of the possible words categorized into one of a plurality of word categories;

the memory storing a sequence of one or more word components of the second word;

the word locator locating a set of one or more valid words from a plurality of possible words stored in a words database based on the word category of the first word, each valid word comprising a sequence of one or more word components corresponding to the sequence of word components stored in the memory; and a word component adder of the processor adding a word component that validly continues from the sequence of word components stored in the memory based on the set of valid words located by the word locator.

In an embodiment, the word categories include verbs and nouns.

In an embodiment, the method further comprises a display controller controlling a display to display one or more, or all, of the valid words located by the word locator, in response to the word locator locating the set of valid words.

In an embodiment, each word component is a Latin alphabetic letter.

In an embodiment, the possible word components comprise the 26 Latin alphabetic letters.

In an embodiment, the word is a logographic character, and each word component is a character stroke.

In an embodiment, the method further comprises:
in response to the word locator locating the set of valid words:
a valid word set size determiner of the processor determining that the set of valid words consists of only one valid word; and
the display controller controlling the display to modify the display of the valid word.

In an embodiment, the method further comprises:
in response to the word component adder adding a word component to the sequence of word components stored in the memory:
a letter number comparator of the processor determining that the stored sequence of word components of the word has the same number of word components as one of the set of valid words; and
the display controller controlling the display to modify the display of the valid word that has the same number of word components as the stored sequence of word components of the word.

In an embodiment, the method further comprises:
in response to the word component adder adding a word component to the sequence of word components stored in the memory:
a letter number comparator of the processor determining that the stored sequence of word components of the word does not have the same number of word components as one of the set of valid words; and
the display controller controlling the display to modify the display of the valid word that does not have the same number of word components as the stored sequence of word components of the word.

In an embodiment, the method further comprises:
in response to the word locator locating the set of more than one valid words:
a common word component determiner of the processor determining that each of the valid words comprises a sequence of one or more common subsequent valid word components that (i) are common to all valid words, and that (ii) validly continue from the sequence of word components stored in the memory; and
the character adder adding the sequence of common subsequent valid word components to the sequence of word components stored in the memory.

In an eleventh aspect, the present invention provides a method of assembling text comprising a sequence of characters, the method comprising:

a processor receiving a user input from a keyboard device having one or more punctuation keys respectively associated with one or more punctuation characters, the received user input corresponding to one of the punctuation keys of the keyboard device;

the processor determining that the punctuation character associated with the punctuation key corresponding to the user input corresponds to one of a set of terminating punctuation characters; and the processor adding to the text (i) the punctuation character associated with the punctuation key corresponding to the user input and (ii) a space character.

In a twelfth aspect, the present invention provides a controller for assembling a word comprising a sequence of word components according to one or more word assembly conventions, the controller comprising:

a memory for storing a sequence of one or more word components of the word; and a processor arranged to:
  locate a set of one or more valid words from a plurality of possible words stored in a words database, each valid word comprising a sequence of one or more word components corresponding to the sequence of word components stored in the memory;
  receive a user input from a keyboard device having a plurality of keys respectively associated with a plurality of possible word components, the received user input corresponding to one of the keys of the keyboard device;
  determine that a user input word component is a valid subsequent word component that validly continues from the sequence of word components stored in the memory based on the located set of valid words, the user input word component being the possible word component associated with the key of the keyboard device corresponding to the user input received by the processor; and
  add the user input word component to the stored sequence of word components of the word.

In an embodiment, the processor is further arranged to:
control a display to display the keys of the keyboard device; and
in response to a location of the set of valid words:
  determine a set of one or more valid subsequent word components based on the set of valid words located by the word locator, wherein each valid subsequent word component validly continues from the sequence of word components stored in the memory; and
  control the display to modify the display of the key associated with each valid subsequent word component.

In an embodiment, the processor is further arranged to control the display to display one or more, or all, of the located valid words, in response to a location of the set of valid words.

In an embodiment, each word component is a Latin alphabetic letter.

In an embodiment, the possible word components comprise the 26 Latin alphabetic letters.

In an embodiment, the word is a logographic character, and each word component is a character stroke.

In an embodiment, the keyboard device is a software-implemented keyboard displayed on a display.

In an embodiment, the processor is further arranged to:
in response to a receipt of the user input, locate a set of one or more additional valid words from the plurality of possible words stored in the words database, each additional valid word comprises a sequence of one or more word components corresponding to a subset of the sequence of word components stored in the memory.

In an embodiment, the processor is further arranged to control the display to display one or more, or all, of the located additional valid words.

In an embodiment, the processor is further arranged to:
in response to a location of the set of valid words:
  determine that the set of valid words consists of only one valid word; and
  control the display to modify the display of the valid word.

In an embodiment, the processor is further arranged to:
in response to a location of the set of additional valid words:
  determine that the set of additional valid words consists of only one additional valid word; and
  control the display to modify the display of the additional valid word.

In an embodiment, the processor is further arranged to:
in response an adding of a word component to the sequence of word components stored in the memory:
  determine that the stored sequence of word components of the word has the same number of word components as one of the set of valid words; and
  control the display to modify the display of the valid word that has the same number of word components as the stored sequence of word components of the word.

In an embodiment, the processor is further arranged to:
in response an adding of a word component to the sequence of word components stored in the memory:
  determine that the stored sequence of word components of the word does not have the same number of word components as one of the set of valid words; and
  control the display to modify the display of the valid word that does not have the same number of word components as the stored sequence of word components of the word.

In an embodiment, the processor is further arranged to:
in response a location of more than one valid words:
  determine that each of the valid words comprises a sequence of one or more common subsequent valid word components that (i) are common to all valid words, and that (ii) validly continue from the sequence of word components stored in the memory; and
  add the sequence of common subsequent valid word components to the sequence of word components stored in the memory.

In an embodiment, each of the possible words stored in the words database is categorized into one of a plurality of word categories, and the location of the set of valid words is based on the word category of a previous assembled word.

In a fourteenth aspect, the present invention provides a controller for assembling a word comprising a sequence of word components according to one or more word assembly conventions, the controller comprising:
  a memory for storing a sequence of one or more word components of the word; and
  a processor arranged to:
    locate a set of one or more valid words from a plurality of possible words stored in a words database, each valid word comprising a sequence of one or more word components corresponding to the sequence of word components stored in the memory;
    determine a set of one or more valid subsequent word components based on the located set of valid words, wherein each valid subsequent word component validly continues from the sequence of word components stored in the memory;
    control a display to display a keyboard device having a plurality of keys respectively associated with a plurality of possible word components; and receive a user input from the keyboard device, the received user input corresponding to one of the keys of the keyboard device;
    determine a display position of the key associated with the possible word component corresponding to each valid subsequent word component;
    determine which one of the keys associated with the possible word components corresponding to the valid subsequent word components is displayed closest to the key corresponding to the user input; and
add to the sequence of word components stored in the memory the possible word component corresponding to the valid subsequent word component associated with the key determined by the closest key determiner to be displayed closest to the key corresponding to the user input.

In an embodiment, the processor is further arranged to control the display to modify the display of the key associated with the possible word component corresponding to each valid subsequent word component.

In an embodiment, the processor is further arranged to control the display to display the possible word component corresponding to the valid subsequent word component associated with the key determined by the closest key determiner to be displayed closest to the key corresponding to the user input.

In an embodiment, the processor is further arranged to control the display to display one or more, or all, of the located valid words, in response to a location of the set of valid words.

In an embodiment, each word component is a Latin alphabetic letter.

In an embodiment, the possible word components comprise the 26 Latin alphabetic letters.

In an embodiment, the word is a logographic character, and each word component is a character stroke.

In an embodiment, the keyboard device is a software-implemented keyboard displayed on a display.

In an embodiment, the processor is further arranged to:
in response to a receipt of the user input, locate a set of one or more additional valid words from the plurality of possible words stored in the words database, each additional valid word comprises a sequence of one or more word components corresponding to a subset of the sequence of word components stored in the memory.

In an embodiment, the processor is further arranged to control the display to display one or more, or all, of the located additional valid words.

In an embodiment, the processor is further arranged to:
in response to a location of the set of valid words:
determine that the set of valid words consists of only one valid word; and
control the display to modify the display of the valid word.

In an embodiment, the processor is further arranged to:
in response to a location of the set of additional valid words:
determine that the set of additional valid words consists of only one additional valid word; and
control the display to modify the display of the additional valid word.

In an embodiment, the processor is further arranged to:
in response an adding of a word component to the sequence of word components stored in the memory:
determine that the stored sequence of word components of the word has the same number of word components as one of the set of valid words; and
control the display to modify the display of the valid word that has the same number of word components as the stored sequence of word components of the word.

In an embodiment, the processor is further arranged to:
in response an adding of a word component to the sequence of word components stored in the memory:
determine that the stored sequence of word components of the word does not have the same number of word components as one of the set of valid words; and
control the display to modify the display of the valid word that does not have the same number of word components as the stored sequence of word components of the word.

In an embodiment, the processor is further arranged to:
in response a location of more than one valid words:
determine that each of the valid words comprises a sequence of one or more common subsequent valid word components that (i) are common to all valid words, and that (ii) validly continue from the sequence of word components stored in the memory; and
add the sequence of common subsequent valid word components to the sequence of word components stored in the memory.

In an embodiment, each of the possible words stored in the words database is categorized into one of a plurality of word classes; and
the location of the set of valid words is based on the word class of a previous assembled word.

In a fifteenth aspect, the present invention provides a controller for assembling a word comprising a sequence of word components according to one or more word assembly conventions, the controller comprising:
a memory for storing a sequence of one or more word components of the word; and
a processor arranged to:
locate a set of one or more valid words from a plurality of possible words stored in a words database, each valid word comprising a sequence of one or more word components corresponding to the sequence of word components stored in the memory;
receive a user input from a keyboard device having a plurality of keys respectively associated with a plurality of possible word components, the received user input corresponding to one of the keys of the keyboard device;
determine that the user input word component is a valid further subsequent word component based on the located set of valid words, the valid further subsequent word component being a word component that validly continues from one or more intermediate word components that in turn continue from the sequence of word components stored in the memory; and
add the user input word component and the intermediate word components to the sequence of word components stored in the memory.

In an embodiment, the processor determined that the user input word component is not a valid subsequent word component.

In an embodiment, the one or more intermediate word components consist of a punctuation mark.

In an embodiment, the processor is further arranged to:
in response to a receipt of the user input:
locate an alternative word component from an alternative word component database comprising one or more sets of alternative word components associated with respective word components, based on the user input word component;
determine that the alternative word component is a valid subsequent word component continuing from the sequence of word components stored in the memory based on the located set of valid words; and add the alternative input word component to the sequence of word components stored in the memory.

In an embodiment, the processor locates the alternative word component based on the user input word component in response to a determination that the user input word component is not a valid subsequent word component.

In a sixteenth aspect, the present invention provides a controller for assembling a word comprising a sequence of word components according to one or more word assembly conventions, the controller comprising:
  a memory for storing a sequence of one or more word components of the word; and
  a processor arranged to:
    locate a set of one or more additional valid words from a plurality of possible words stored in a words database, each additional valid word comprising a sequence of one or more word components corresponding to a subset of the sequence of word components stored in the memory;
    receive a user input from a keyboard device having a plurality of keys respectively associated with a plurality of possible word components, the received user input corresponding to one of the keys of the keyboard device;
    determine that a user input word component is a valid subsequent word component that validly continues from the sequence of word components stored in the memory based on the located set of additional valid words, the user input word component being the possible word component associated with the key of the keyboard device corresponding to the user input received by the processor; and
    add the user input word component to the sequence of word components stored in the memory.

In an embodiment, the processor is further arranged to:
control a display to display the keys of the keyboard device; and
in response to a location of the set of additional valid words:
  determine a set of one or more valid subsequent word components based on the set of additional valid words located by the word locator; and
  control the display to modify the display of the key associated with each valid subsequent word component.

In an embodiment, the processor is further arranged to control the display to display one or more, or all, of the located additional valid words.

In an embodiment, each word component is a Latin alphabetic letter.

In an embodiment, the possible word components comprise the 26 Latin alphabetic letters.

In an embodiment, the word is a logographic character, and each word component is a character stroke.

In an embodiment, the keyboard device is a software-implemented keyboard displayed on a display.

In an embodiment, the processor is further arranged to:
in response to a location of the set of additional valid words:
  determine that the set of additional valid words consists of only one additional valid word; and
  control the display to modify the display of the additional valid word.

In an embodiment, the processor is further arranged to:
in response to an adding of a word component to the sequence of word components stored in the memory:
  determine that the stored sequence of word components of the word has the same number of word components as one of the set of additional valid words; and
  control the display to modify the display of the additional valid word that has the same number of word components as the stored sequence of word components of the word.

In an embodiment, the processor is further arranged to:
in response to an adding of a word component to the sequence of word components stored in the memory:
  determine that the stored sequence of word components of the word does not have the same number of word components as one of the set of additional valid words; and
  control the display to modify the display of the additional valid word that does not have the same number of word components as the stored sequence of word components of the word.

In an embodiment, the processor is further arranged to:
in response to a location of more than one additional valid word:
  determine that each of the additional valid words comprises a sequence of one or more common subsequent valid word components that (i) are common to all additional valid words, and that (ii) validly continue from the sequence of word components stored in the memory; and
  add the sequence of common subsequent valid word components to the sequence of word components stored in the memory.

In an embodiment, each of the possible words stored in the words database is categorized into one of a plurality of word categories, and the location of the set of additional valid words is based on the word category of a previous assembled word.

In a seventeenth aspect, the present invention provides a controller for assembling a word comprising a sequence of word components according to one or more word assembly conventions, the controller comprising:
  a memory for storing a sequence of one or more word components of the word; and
  a processor arranged to:
    locate one valid word from a plurality of possible words stored in a words database, the valid word comprising a sequence of one or more word components corresponding to the sequence of word components stored in the memory;
    control a display to display the valid word.
    determine that only one valid word is located; and
    control the display to modify the display of the valid word.

In an eighteenth aspect, the present invention provides a controller for assembling a word comprising a sequence of word components according to one or more word assembly conventions, the controller comprising:
  a memory for storing a sequence of one or more word components of the word; and
  a processor is arranged to:
    locate one valid word from a plurality of possible words stored in a words database, the valid word comprising a sequence of one or more word components corresponding to the sequence of word components stored in the memory;
    control a display to display the valid word;
    determine that the set of additional valid words consists of only one additional valid word; and control the display to modify the display of the additional valid word.

In a nineteenth aspect, the present invention provides a controller for assembling a word comprising a sequence of word components according to one or more word assembly conventions, the controller comprising:
a memory for storing a sequence of one or more word components of the word; and
a processor arranged to:
locate a set of one or more valid words from a plurality of possible words stored in a words database, each valid word comprising a sequence of one or more valid word components including a sequence of one or more word components corresponding to the sequence of word components stored in the memory;
control a display to display one or more, or all, of the located valid words;
determine that the stored sequence of word components of the word has the same number of word components as one of the set of valid words; and
control the display to modify the display of the valid word that has the same number of word components as the stored sequence of word components of the word.

In a twentieth aspect, the present invention provides a controller for assembling a word comprising a sequence of word components according to one or more word assembly conventions, the controller comprising:
a memory for storing a sequence of one or more word components of the word;
a processor arranged to:
locate a set of one or more valid words from a plurality of possible words stored in a words database, each valid word comprising a sequence of one or more valid word components including a sequence of one or more word components corresponding to the sequence of word components stored in the memory;
control a display to display one or more, or all, of the located valid words;
determine that the stored sequence of word components of the word does not have the same number of word components as one of the set of valid words; and
control the display to modify the display of the valid word that does not have the same number of word components as the stored sequence of word components of the word.

In a twenty-first aspect, the present invention provides a controller for assembling a word comprising a sequence of word components according to one or more word assembly conventions, the controller comprising:
a memory for storing a sequence of one or more word components of the word; and
a processor arranged to:
locate a set of one or more valid words from a plurality of possible words stored in a words database, each valid word comprising a sequence of one or more word components corresponding to the sequence of word components stored in the memory;
determine that each of the located valid words comprises a sequence of one or more common subsequent valid word components that (i) are common to all valid words, and that (ii) validly continue from the sequence of word components stored in the memory; and
add the sequence of common subsequent valid word components to the sequence of word components stored in the memory.

In a twenty-second aspect, the present invention provides a controller for assembling a sequence of words comprising a first word and a second word, the controller comprising:
a memory for storing the first word; and
a processor arranged to:
locate a valid word corresponding to the first word from a plurality of possible words stored in a words database, each of the possible words categorized into one of a plurality of word categories;
store a sequence of one or more word components of the second word;
locate a set of one or more valid words from a plurality of possible words stored in a words database based on the word category of the first word, each valid word comprising a sequence of one or more word components corresponding to the sequence of word components stored in the memory; and
add a word component that validly continues from the sequence of word components stored in the memory based on the located set of valid words.

In an embodiment, the word categories include verbs and nouns.

In an embodiment, the processor is further arranged to control a display to display one or more, or all, of the located valid words, in response to a location of the set of valid words.

In an embodiment, each word component is a Latin alphabetic letter.

In an embodiment, the possible word components comprise the 26 Latin alphabetic letters.

In an embodiment, the word is a logographic character, and each word component is a character stroke.

In an embodiment, the processor is further arranged to:
in response to a location of the set of valid words:
determine that the set of valid words consists of only one valid word; and
control the display to modify the display of the valid word.

In an embodiment, the processor is further arranged to:
in response an adding of a word component to the sequence of word components stored in the memory:
determine that the stored sequence of word components of the word has the same number of word components as one of the set of valid words; and
control the display to modify the display of the valid word that has the same number of word components as the stored sequence of word components of the word.

In an embodiment, the processor is further arranged to:
in response an adding of a word component to the sequence of word components stored in the memory:
determine that the stored sequence of word components of the word does not have the same number of word components as one of the set of valid words; and
control the display to modify the display of the valid word that does not have the same number of word components as the stored sequence of word components of the word.

In an embodiment, the processor is further arranged to:
in response a location of more than one valid words:
determine that each of the valid words comprises a sequence of one or more common subsequent valid word components that (i) are common to all valid words, and that (ii) validly continue from the sequence of word components stored in the memory; and add the sequence of common subsequent valid word components to the sequence of word components stored in the memory.

In a twenty-third aspect, the present invention provides a controller for assembling text comprising a sequence of characters, the controller comprising:

a processor arranged to:
receive a user input from a keyboard device having one or more punctuation keys respectively associated with one or more punctuation characters, the received user input corresponding to one of the punctuation keys of the keyboard device;
determine that the punctuation character associated with the punctuation key corresponding to the user input corresponds to one of a set of terminating punctuation characters; and
add to the text (i) the punctuation character associated with the punctuation key corresponding to the user input and (ii) a space character.

In a twenty-fourth aspect, the present invention provides computer program code which when executed implements the above method.

In a twenty-fifth aspect, the present invention provides a computer readable medium comprising the above computer program code.

In a twenty-sixth aspect, the present invention provides a device comprising the above controller.

In a twenty-seventh aspect, the present invention provides the above device in the form of a smartphone.

BRIEF DESCRIPTION OF DRAWINGS

In order that the invention may be more clearly ascertained, embodiments will now be described, by way of example, with reference to the accompanying drawings, in which:

FIGS. 22A to 22I each comprises a series of screenshots illustrating the ContextualKey functionality, the ComposingMode functionality, the PreKeyCorrection functionality, and the KeyShading functionality;

FIGS. 23A to 23C each comprises a series of screenshots illustrating the ComposingMode functionality, the PreKeyCorrection functionality, and the KeyShading functionality;

FIGS. 24A and 24B each comprises a series of screenshots illustrating the KeyShading functionality and ComposingMode functionality;

FIGS. 26A to 26G each comprises a series of screenshots illustrating the AutomaticSystems functionality;

FIGS. 30A to 30G each comprises a series of screenshots illustrating the AutomaticSystems functionality;

FIG. 32 comprises a table illustrating the different formats used by the smartphone when implementing the various functionalities;

DETAILED DESCRIPTION

Referring to the figures, there is illustrated an embodiment of the invention in the form of a smartphone 10. It is envisaged that the invention need not be in the form of a smartphone. For example, the invention may alternatively be in the form of a notebook computer. The smartphone 10 is configured to implement a number of functionalities to assist or enable a user to assemble or type a word. It will be appreciated that each of these functionalities may be temporarily disabled by the user.

Figure 1A:
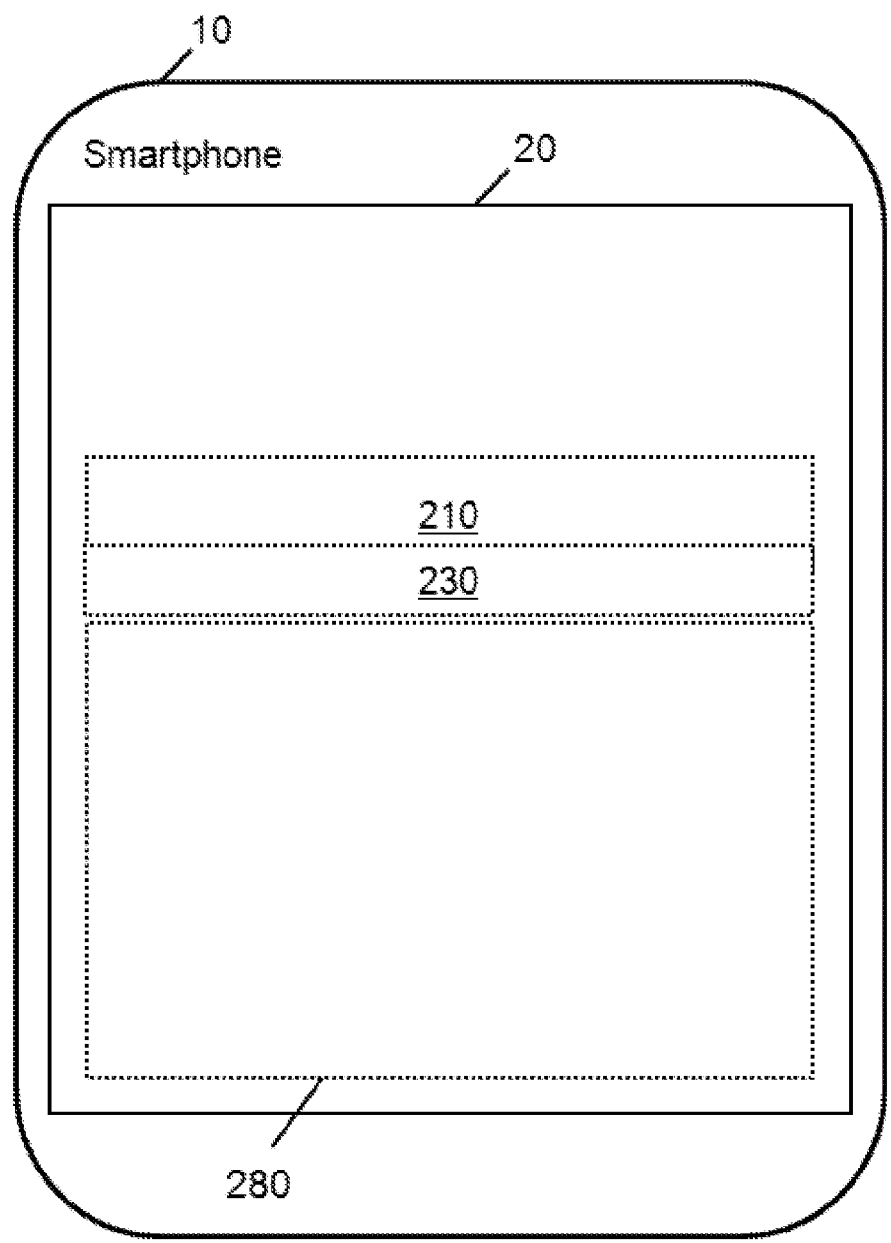
FIG. 1A is a schematic diagram of a smartphone according to an embodiment of the invention.

FIG. 1A is a schematic diagram of the smartphone 10. The smartphone 10 comprises a display in the form of a touchscreen 20. The touchscreen 20 is adapted to display a number of elements. One of the elements is a keyboard 280 comprising a plurality of keys. Another one of the elements is a ComposingWordArea 210 for displaying a letter or letters input by the user to assemble the word. Another one of the elements is a ValidWordsPanel 230 for displaying one or more words located by the smartphone 10.

Figure 1B:
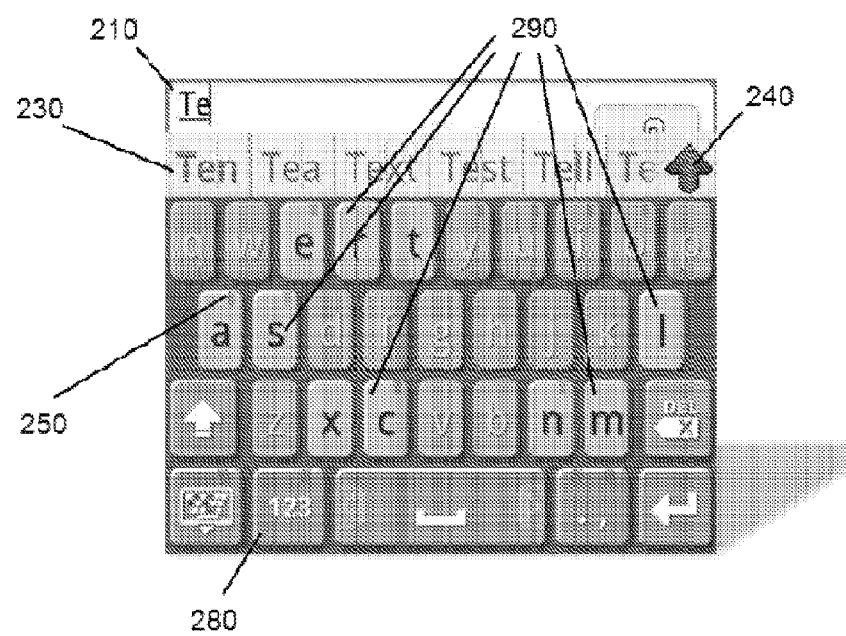
FIG. 1B is a screenshot of a portion of a touchscreen display of the smartphone.

The touchscreen 20 serves as a user input device that is operable by the user to assemble the word. In particular, the user can select one or more of the keys of the keyboard 280 by touching or contacting the touchscreen 20 at a position or positions of the touchscreen 20 corresponding to the key or keys of the keyboard 280. The smartphone 10 is configured to detect the following types of user inputs from the touchscreen 20:

A "press" action analogous to the action of the user pressing and releasing a key on a conventional computer keyboard A "double press" action where the user performs the "press" action twice in quick succession A "hold" action where the user performs the "press" action but does not release the key as quickly A "long hold" action where the user maintains the "hold" action for a longer period of time FIG. 1B is a screenshot illustrating of the elements displayed by the touchscreen 20. The ValidWordsPanel 230 displays the words "Ten", "Tea" "Text", "Test" and "Tell", and part of the word "Term". These are some of the words located by the smartphone 10. The ComposingWordArea 210 displays the letters "Te" added by the user to assemble a word the user intends to assemble. After all the letters of the word the user intends to assemble are added, the added letters (which are displayed in the ComposingWordArea 210) can be combined with other text (such as other word or words, punctuation etc) to form phrases and sentences.

Herein, the term ComposingWord refers to the letter or letters added by the user and displayed in the ComposingWordArea 210; the term ValidWords refers to the words located by the smartphone 10 and displayed in the ValidWordsPanel 230; and the term PrimaryValidWord refers to the first word of the ValidWords (which in FIG. 1B is "Ten").

The ValidWordsPanel 230 includes a contextual button 240. In FIG. 1B, the contextual button 240 is displayed with a picture of a "Up Arrow" (that is, an upward pointing arrow). Upon the user pressing the "Up Arrow" button 240, the touchscreen 20 displays more or all of the ValidWords. The ValidWordsPanel 230 may include alternative or additional buttons. For example, as described in further detail below in the section entitled PointofDeviation, the ValidWordsPanel 230 may include an additional "Auto-Fill" button 242.

The display of the ValidWordsPanel 230 may be modified to display the ValidWords located by the smartphone 10 but not displayed in the ValidWordsPanel 230. Specifically, the user can scroll the display of the ValidWordsPanel 230 by touching a finger on the ValidWordsPanel 230 and sliding the finger across the ValidWordsPanel 260 horizontally along the length of the ValidWordsPanel 260 (that is, by a horizontal scrolling action) to control the touchscreen 20 to display the other ValidWords located by the smartphone 10.

In FIG. 1B, the ValidWordsPanel 260 is displayed in a compact mode. The ValidWordsPanel 260 can be modified to display in a full-screen mode instead of the compact mode. In the full-screen mode, the user can scroll the display of the ValidWordsPanel 230 by touching a finger on the ValidWordsPanel 260 and sliding a finger across the ValidWordsPanel 260 vertically (that is, by a vertical scrolling action). The ValidWordsPanel 260 may also be separated into different sections or windows that a user can alternate between using Tabs.

The keyboard 280 is arranged in a QWERTY layout. The keyboard 280 includes 26 letter keys respectively associated with the 26 Latin alphabetic letters. The keyboard 280 also includes a number of punctuation and system keys.

In FIG. 1B, the letter keys "e", "r", "t", "a", "s", "l", "x", "c", "n" and "m" appear to be shaded 290. The shaded keys 290 are keys that are associated with letters determined by the smartphone 10 to validly continue from the letters of the ComposingWord. The shading of letter keys is one of the functionalities implemented by the smartphone 10, and is described in greater detail below in the section entitled KeyShading.

Herein, the term ValidLetterKey refers to a letter key associated with a letter that validly continues from the letters of the ComposingWord, and the term InvalidLetterKey refers to a letter key associated with a letter that does not validly continue from the ComposingWord. However, persons skilled in the art will appreciate that in an alternative embodiment, ValidLetterKeys may include other types of keys such as number keys or punctuation keys.

In FIG. 1B, the letter keys "e", "y", "u", "i", "o", "a", "s", "c" and "n" are displayed with an indicator tab 250. When a user holds a letter key having an indicator tab 250, a pop-up-mini-keyboard is displayed on the touchscreen 20. This is another one of the functionalities implemented by the smartphone 10. Further description of this functionality is provided below in the section entitled KeyPreviewPopup.

Figure 2:
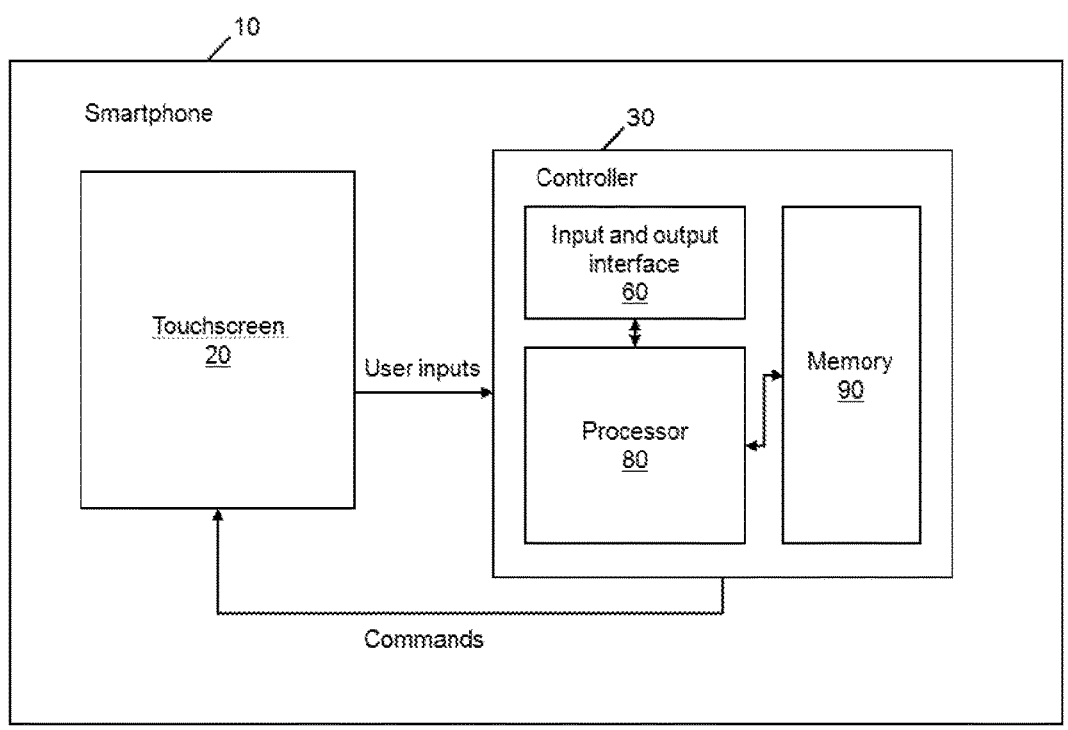
FIG. 2 is a block diagram of the functional components of the smartphone.

FIG. 2 is a block diagram showing the functional components of the smartphone 10. As indicated above, the smartphone 10 comprises a touchscreen 20. The touchscreen 20 is connected to a controller 30. The controller 30 comprises a processor 80 and a memory 90. The processor 80 is arranged to execute program code stored in the memory 90 to implement a plurality of modules to control the smartphone 10. For example, the processor 80 is arranged to execute a display controller to control the touchscreen 20 to display the keyboard 280. Persons skilled in the art will appreciate that one or more of the modules may be implemented in an alternative way. For example, one of the modules may be implemented by a dedicated circuit.

The controller 30 also has an input and output interface 60 to enable the processor 80 to receive user inputs from the touchscreen 20, and to send commands to the touchscreen 20 to control the touchscreen 20.

Figure 3:
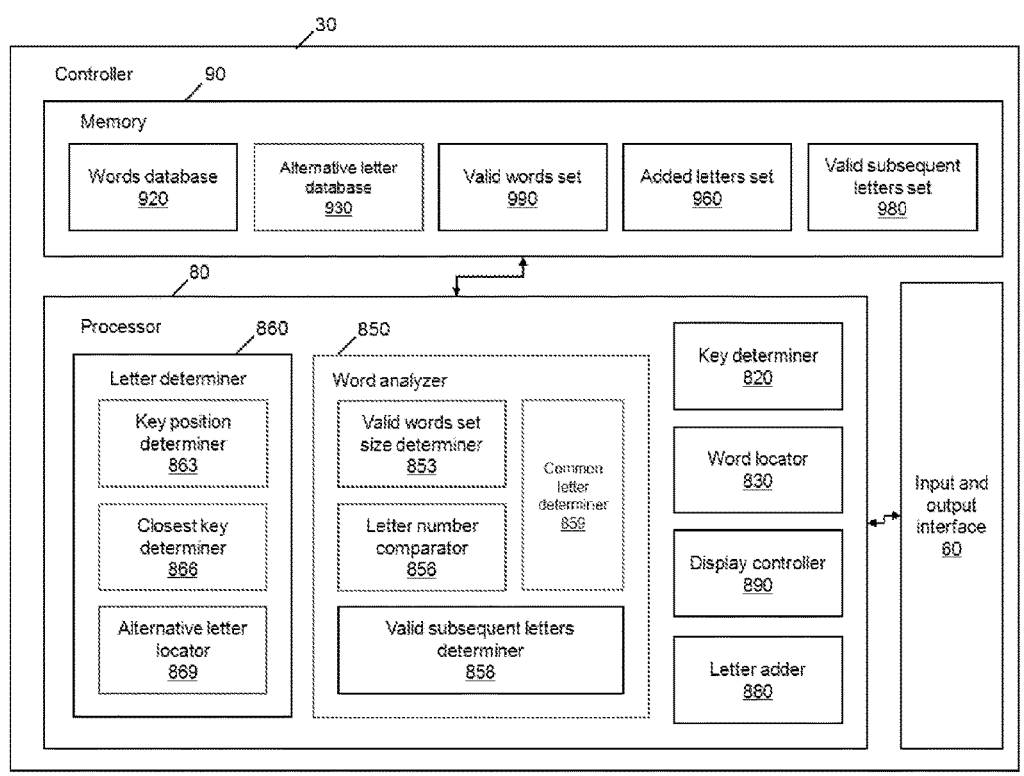
FIG. 3 is a functional block diagram of the controller of the smartphone.

FIG. 3 is a block diagram showing the modules implemented by the processor 80. The modules include the display controller 890, a key determiner 820, a word locator 830, a letter determiner 860, a word analyzer 850 and a letter adder 880. The letter determiner 860 includes a plurality of sub-modules including a key position determiner 863, a closest key determiner 866 and an alternative letter locator 869. The word analyzer 850 includes a plurality of sub-modules including a valid words set size determiner 853, a letter number comparator 856, a valid subsequent letters determiner 858, and a common letter determiner 859.

As indicated above, the memory 90 stores program code that can be implemented by the processor 80 to implement the modules. The memory 90 also includes a word database 920 comprising a plurality of preloaded words. It is envisaged that the words database 920 may additionally or alternatively comprise a set of user defined words that are input by the user (for example, when a word is not present in the word database), a set of words derived from a contacts database (that is, a database comprising a plurality of contacts) etc. Persons skilled in the art will appreciate that the smartphone 10 may include more than one word database 920.

The memory 90 also includes an alternative letter database 930 storing one or more sets of alternative letters. When carrying out the word assembly operation, the memory 90 may also store an added letters set 960 comprising the letter or letters of the ComposingWord, and a valid words set 990 comprising the ValidWords including the PrimaryValidWord. Persons skilled in the art will appreciate that the added letters set 960 may consist only of one letter or comprise more than one letter.

KeyShading

As indicated above, a number of functionalities are implemented by the smartphone 10 to assist a user to assemble a word. One of the functionalities is KeyShading.

Figure 4:
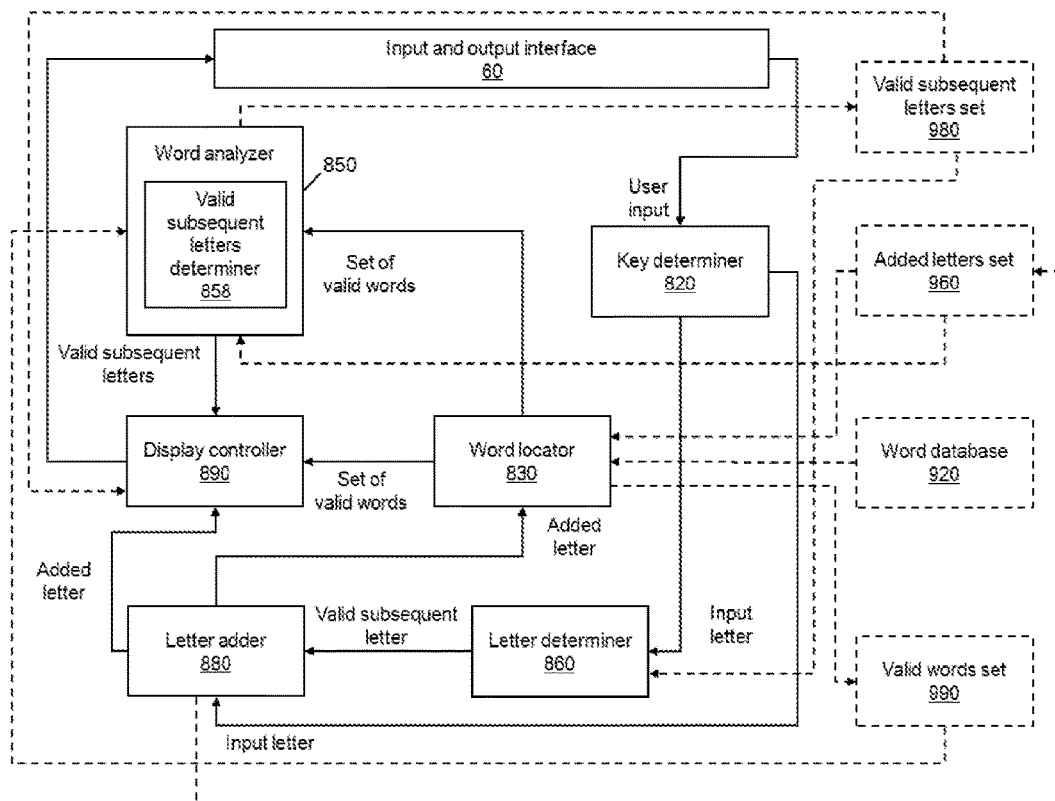
FIG. 4 is a functional block diagram of the modules of the controller implementing the KeyShading functionality.

FIG. 4 is a block diagram of the modules implementing the KeyShading functionality. The controller 30 is adapted to receive a user input from the touchscreen 20 via the input and output interface 60. The key determiner 820 of the processor 80 is arranged to determine whether or not the user input received by the controller 30 corresponds to one of the key of the keyboard 280. The user input corresponds to the position of the contact or touch detected by the touchscreen 20. The key determiner 820 is also arranged to determine whether or not the input letter is the first letter of a word to be assembled. If the input letter is the first letter of a word to be assembled, the key determiner 820 outputs the input letter to the letter adder 880. Upon receiving the input letter, the letter adder 880 adds the input letter to the added letters set 960 stored in the memory 90.

After the input letter is added to the added letters set 960, the display controller 890 controls the touchscreen 20 to display the letter or letters of the added letters set 960 (which in this case consist of just the added letter recently added to the added letters set 960) as the ComposingWord in the ComposingWordArea 210. In addition, the word locator 830 locates a set of one or more ValidWords based on the added letters set 960. The word locator 830 does this by locating a word or words comprising a first letter corresponding to the added letter. The set of ValidWords are located from the possible words stored in the word database 920 of the memory 90. The set of ValidWords are then output by the word locator 830 to the memory 90 for storage in the valid words set 990.

After the set of ValidWords is located by the word locator 830, the valid subsequent letter determiner 858 determines a valid subsequent letter for each one of the set of ValidWords stored in the valid words set 990, each valid subsequent letter being the subsequent letter of a ValidWord that validly continues from the first letter of the ValidWord. Upon determining a valid subsequent letter for each one of the set of ValidWords, the valid subsequent letter determiner 858 outputs each of the valid subsequent letter or letters to the memory 90 for storage in a valid subsequent letters set 980.

In this case, the first ValidWord located by the word locator 830 is displayed in the ValidWordsPanel 230 as the PrimaryValidWord. However, it is envisaged that the PrimaryValidWord may not be the first ValidWord located by the word locator 830 but is selected from the set of ValidWords based on the popularity of each of the ValidWords in an alternative embodiment.

After the set of ValidWords is located by the word locator 830, the display controller 890 controls the touchscreen 20 to display in the ValidWordsPanel 230 of the touchscreen 20 one or more of the words of the set of ValidWords stored in the valid words set 990. After the valid subsequent letter or letters are determined by the valid subsequent letter determiner 858, the display controller 890 controls the touchscreen 20 to modify the display of the key or keys that are associated with the valid subsequent letter or letters as one or more ValidLetterKeys. The display controller 890 controls the touchscreen 20 to modify the display of each ValidLetterKey by controlling the touchscreen 20 to display a modified "shaded" version of the key.

If the input letter is not the first letter of a word the user intends to assemble, upon receiving the input letter from the key determiner 820, the letter determiner 860 determines whether the input letter is a valid subsequent letter that validly continues from a letter or letters stored in the added letters set 960 based on the set of ValidWords stored in the valid words set 990 of the memory 990.

The set of ValidWords stored in the valid words set 990 is located by the word locator 830 based on all of the letter or letters stored in the added letters set 960. The word locator 830 locates the set of ValidWords by locating a word or words comprising an initial sequence of letter or letters corresponding to all of the added letter or letters stored in the added letters set 960. The ValidWords are located by the word locator 830 from the possible words stored in the word database 920.

The letter determiner 860 determines whether the input letter is a valid subsequent letter based on the set of ValidWords stored in the valid words set 990 of the memory 990, by using letter or letters stored in the valid subsequent letters set 980.

The letter or letters stored in the valid subsequent letters set 980 are determined by the valid subsequent letters determiner 858 based on the set of ValidWords stored in the valid words sets 990 and the added letters stored in the added letters set 960. If the input letter is the first letter of the word the user intends to assemble, each valid subsequent letter determined by the valid subsequent letter determiner 858 is the second letter of a ValidWord that validly continues from the first letter of the ValidWord. If the input letter is not the first letter of the word the user intends to assemble, each valid subsequent letter determined by the valid subsequent letter determiner 858 is the subsequent letter of a ValidWord that validly continues from the letter of the ValidWord corresponding to the letter of the word to be assembled. For example, if the input letter is the second letter of the word the user intends to assemble, each valid subsequent letter determined by the valid subsequent letter determiner 858 is the third letter of a ValidWord that validly continues from the second letter of the ValidWord. Alternatively, if the input letter is the third letter of the word to be assembled, each valid subsequent letter determined by the valid subsequent letter determiner 858 is the fourth letter of a ValidWord that validly continues from the third letter of the ValidWord. Persons skilled in the art will appreciate that the position of the valid subsequent letter within a ValidWord may not correspond to the position of the letter to be added to the ComposingWord, for example, where the ValidWord includes a non-terminating punctuation mark (such as a hyphen).

Upon a determination by letter determiner 860 that the input letter is a valid subsequent letter, the letter adder 880 adds the input letter to the added letters set 960 of the memory 90. The display controller 890 then controls the touchscreen 20 to display the letters of the added letters set 960 (which include the added letter recently added to the added letters set 960) as the ComposingWord in the ComposingWordArea 210.

The KeyShading functionality may be described with respect to the following example where the user the user intends to assemble the word "cat". Initially, before any letters are input by the user, all of the keys of the keyboard 280 are ValidLetterKeys. After inputting the letter "c", words that start with the letter "c" are located. Then, the next letter of each located word is used to define a set of valid subsequent letters. Based on the set of valid subsequent letters, the display and/or the functionality of the keys of the keyboard 280 that are ValidLetterKeys are modified: The display of ValidLetterKeys are shaded. Additionally, InvalidLetterKey presses are ignored. It will be appreciated that in an alternative embodiment, the modification may only involve modifying the display of valid keys without ignoring InvalidLetterKey presses, or involve ignoring InvalidLetterKey presses without modification to the display of the ValidLetterKeys.

PreKeyCorrection

Figure 5:
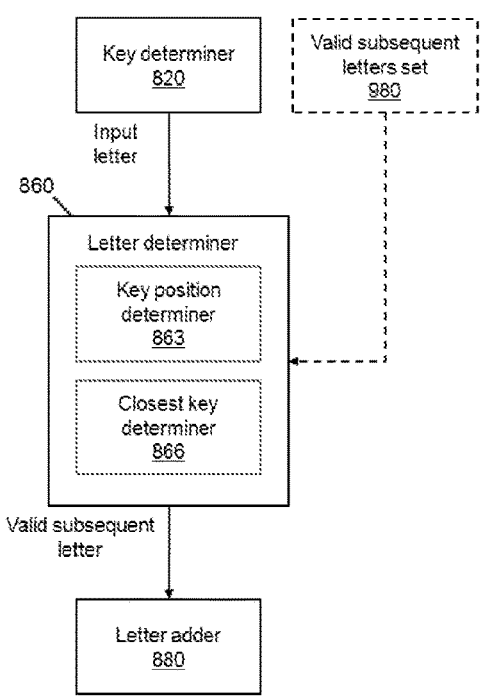
FIG. 5 is a functional block diagram of the modules of the controller implementing the PreKeyCorrection functionality.

Another one of the functionalities implemented by the smartphone 10 is PreKeyCorrection. FIG. 5 is a functional block diagram illustrating the PreKeyCorrection functionality in greater detail.

Upon a determination by the letter determiner 860 that the input letter is not a valid subsequent letter (that is, upon a determination that the user input does not correspond to one of the ValidLetterKeys determined by the valid subsequent letter determiner 858), the letter determiner 860 determines a ValidLetterKey in place of the key associated with the input letter. More specifically, upon a determination by the letter determiner 860 that the input letter is not a valid subsequent letter, a key position determiner 863 of the letter determiner 860 determines the display position of each ValidLetterKey (that is, the display position of each ValidLetterKey). Then, a closest key determiner 866 of the letter determiner 860 determines which one of the ValidLetterKeys is displayed closest to the key corresponding to the input letter, and determines that the ValidLetterKey determined to be displayed closest to the key corresponding to the user input is the key. Herein, the term ClosestValidLetterKey refers to the key determined to be displayed closest to the key corresponding to the user input.

PostKeyCorrection

Another one of the functionalities implemented by the smartphone 10 is PostKeyCorrection where the word locator 830 additionally locates one or more ValidWords in addition to the set of ValidWords.

The word locator 830 locates the one or more additional ValidWords based on a sub-sequence of the added letters in the added letters set 960, by locating a word or words comprising a sequence of letter or letters corresponding to a sub-sequence of added letters stored in the added letters set 960 of the memory 90. For example, the word locator 830 may locate the additional ValidWords based on the subsequence "es" when the added letters set 960 consists of the letters "Tes". By locating words based on a subsequence of the added letters stored in the added letters set 960 rather than on all the letters of the added letters set 960, the smartphone 10 allows for the case where one or more of the letters previously added by the user were incorrectly added (for example, in a scenario where the user mistypes a key and adds the letter associated with the mistyped key). The additional ValidWords are located by the word locator 830 from the words stored in the word database 920. Any additional ValidWords located by the word locator 830 are stored in the valid words set 990 of the memory 90.

The display controller 890 is arranged to control the touchscreen 20 to display the additional ValidWords in the ComposingWordArea 210 together with the ValidWords located via the KeyShading functionality. In addition, the display controller 890 is arranged to modify the keys associated with subsequent valid letters that validly continues from the additional ValidWords located by the word locator 830. Herein, the term AdditionalValidLetterKey refers to a key associated with a subsequent valid letter that validly continues from one of the additional ValidWords located by the word locator 830.

To enable the user to differentiate between ValidLetterKeys (that are located via the KeyShading functionality) and AdditionalValidLetterKeys (that are additionally located via the PostKeyCorrection functionality), the display of the AdditionalValidLetterKeys are modified differently to the display of the ValidLetterKeys. Specifically, the display of AdditionalValidLetterKeys are shaded in a darker colour to the shading colour of the display of ValidLetterKeys located via the KeyShading functionality.

ComposingMode

Another one of the functionalities implemented by the smartphone 10 is ComposingMode where the ComposingWord is compared to the PrimaryValidWord. In operation, the colour of the PrimaryValidWord is modified to indicate that (i) the PrimaryValidWord is the only word in the valid words set 990 (that is, based on the letters added so far, there is only one ValidWord and no AdditionalValidWords, or there is only one AdditionalValidWord and no ValidWords), (ii) the ComposingWord has the same number of letters as the PrimaryValidWord, or (iii) the ComposingWord does not have the same number of letters as the PrimaryValidWord. The smartphone 10 is configured to exclude non-letters in its calculation of the number of letters of a word. However, it is envisaged that an alternative embodiment of the smartphone 10 may include non-letters in its calculation of the number of letters of a word.

Figure 6:
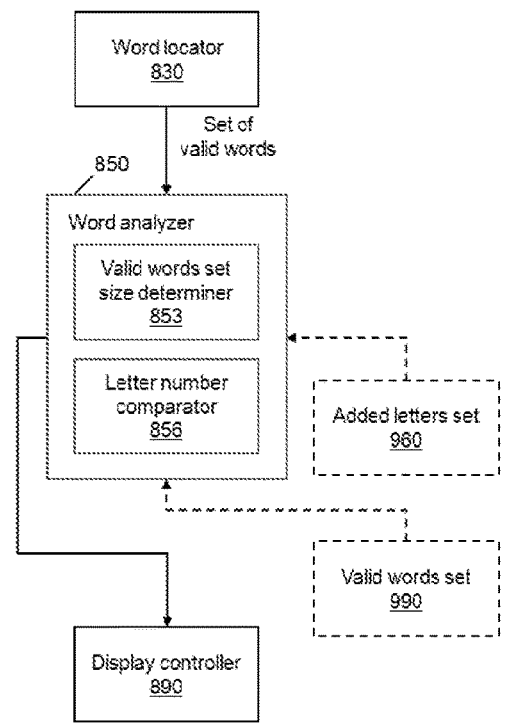
FIG. 6 is a functional block diagram of the modules of the controller implementing the ComposingMode functionality.

FIG. 6 is a functional block diagram illustrating the ComposingMode functionality in greater detail. The comparisons between the ComposingWord and the PrimaryValidWord are performed by the word analyzer 850.

The letter number comparator 853 of the word analyzer 850 is arranged to determine whether or not the ComposingWord has the same number of letters as the PrimaryValidWord. The letter number comparator 853 does this by counting the letters of the ComposingWord and the PrimaryValidWord and determining whether or not the two are the same. If the letter number comparator 853 determines that the ComposingWord has the same number of letters as the PrimaryValidWord, the display controller 890 modifies the colour of the display of the PrimaryValidWord to blue. The colour modification is intended to indicate to the user that the ComposingWord substantially corresponds to the PrimaryValidWord, and that the ComposingWord can be automatically corrected (for example, to correct any inconsistencies due to capitalization or alternative letters) to correspond to the PrimaryValidWord. Otherwise, if the letter number comparator 853 determines that the ComposingWord does not have the same number of letters as the PrimaryValidWord, the display controller 890 modifies the colour of the display of the ValidWord in the ValidWordsPanel 830 to green. This indicates the user that the ComposingWord substantially corresponds to a partially assembled PrimaryValidWord. Persons skilled in the art will appreciate that the colour modification may be expressed in a different manner. For example, the smartphone 10 may be configured to aurally output a particular sound or tone instead of visually modifying the colour of the display of the PrimaryValidWord.

The valid words set size determiner 853 of the word analyzer 850 is arranged to determine whether or not the set of ValidWords stored in the valid words set 990 consist of only one ValidWord. If the word analyzer 850 determines that the set of ValidWords stored in the valid words set 990 consist of only one ValidWord, the display controller 890 modifies the colour of the display of the ValidWord in the ValidWordsPanel 830 to orange. The colour modification indicates to the user that the PrimaryValidWord is the only ValidWord located by the word locator 830, and that the ComposingWord can be automatically completed (and, if there is any inconsistencies due to capitalization or alternative letters, corrected) to correspond to the PrimaryValidWord.

Herein, when the letter number comparator 853 determines that the ComposingWord has the same number of letters as the PrimaryValidWord, the ComposingWord is referred to as an AutoCorrectableWord (which is displayed in blue); when the letter number comparator 853 determines that the ComposingWord does not have the same number of letters as the PrimaryValidWord, the ComposingWord is referred to as a PreValidWord (which is displayed in green); and when valid words set size determiner 853 determines that the set of ValidWords stored in the valid words set 990 consist of only one ValidWord, the ComposingWord is referred to as an AutoCompletableWord (which is displayed in orange).

In this implementation of the ComposingMode functionality, the comparison to the ComposingWord (and the colour modification resulting from the comparison) is with respect to the PrimaryValidWord. However, it is envisaged that the comparison (and the colour modification resulting from the comparison) may apply to another one or more than one of the words displayed in the ValidWordsPanel 230, or to more than one of the words displayed in the ValidWordsPanel 230.

ContextualKey

Another one of the functionalities is the ContextualKey functionality. In operation, the smartphone 10 automatically corrects a ComposingWord to a AutoCorrectableWord, or completes (and if there are correctable letters, corrects) a ComposingWord to a AutoCompletableWord (that is, the smartphone 10 will automatically complete the word assembly process) upon receiving a further user input corresponding to a key associated with the space character or a punctuation character. For example, when the ComposingWord is a AutoCorrectableWord, pressing the spacebar or a punctuation key corrects the ComposingWord to the AutoCorrectableWord by correcting any inconsistencies due to capitalization or alternative letters (for example, correcting the capitalization of a letter or letter, and/or making any appropriate substitutions to replace certain letters with alternative letters such as replacing "e" with "é").

Also, the smartphone 10 is configured to automatically correct and/or complete the ComposingWord to one of the ValidWords displayed in the ValidWordsPanel 230 upon the user selecting the ValidWord from the ValidWordsPanel 230 (that is, by the user pressing the ValidWord displayed in the ValidWordsPanel 230).

AutomaticSystems

Another set of functionalities implemented by the smartphone 10 is AutomaticSystems.

One of the AutomaticSystems functionalities is AutomaticNonTerminatingPunctuationInsertion. Upon a determination by the letter determiner 860 that the input letter is not a valid subsequent word component, the letter determiner 860 determines whether or not the input letter is a valid further subsequent letter that validly continues from a punctuation mark that in turn continues from the ComposingWord. This determination is based on the set of ValidWords stored in the valid words set 920 and added letter or letters of the ComposingWord stored in the added letters set 960. If the letter determiner 860 determines that the input letter is a valid further subsequent letter that validly continues from a punctuation mark that in turn continues from the ComposingWord, the letter adder 880 adds the punctuation mark before adding the valid further subsequent letter.

In this implementation, the letter determiner 860 determines that the input letter is a valid further subsequent letter based on comparisons involving all of the ValidWords stored in the valid words set 920. In particular, the letter determiner 860 determines that the input letter is a valid further subsequent letter only if the input letter validly continues from the same punctuation mark when compared to all of the ValidWords stored in the valid words set 920.

It is envisaged that in an alternative embodiment, a valid further subsequent letter may be a letter that validly continues from a letter rather than a punctuation mark that in turn continues from the added letter or letters stored in the added letters set 960. It is also envisaged that the valid further subsequent letter may be a letter that validly continues from more than one letter or punctuation mark in another alternative embodiment.

Another one of the AutomaticSystems functionalities is AutomaticSpaceInsertion. Upon the processor 80 receiving a user input corresponding to one of the punctuation keys of the keyboard 280, the processor 80 determines whether or not the punctuation mark associated with the punctuation key corresponding to the user input corresponds to one of a set of terminating punctuation mark such as a full stop, question mark, an exclamation mark or a comma. Upon a determination by the processor 80 that the punctuation mark associated with the punctuation key corresponding to the user input corresponds to one of a set of terminating punctuation mark, the processor 80 adds a space character after adding the punctuation mark associated with the punctuation key corresponding to the user input.

LetterSubstitution

Figure 7:
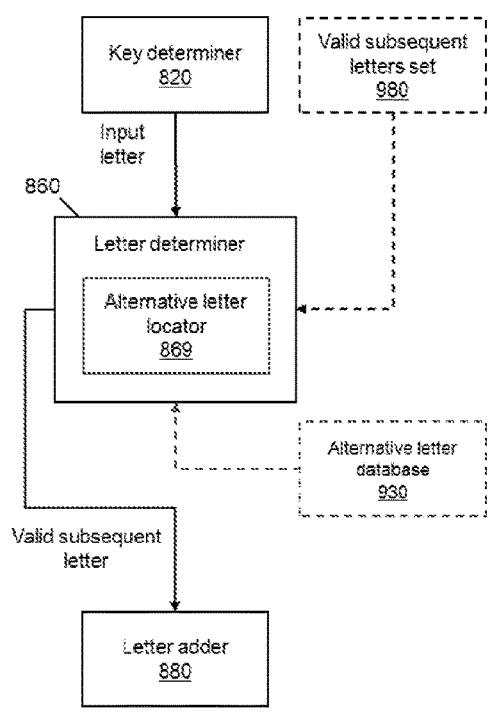
FIG. 7 is a functional block diagram of the modules of the controller implementing the LetterSubstitution functionality.

Another one of the functionalities implemented by the smartphone 10 is LetterSubstitution. FIG. 7 is a functional block diagram illustrating the LetterSubstitution functionality in greater detail. Upon a determination by the letter determiner 860 that the input letter is not a valid subsequent letter, the alternative letter locator 869 of the letter determiner 860 locates one or more alternative letters from the alternative letter database 930 of the memory 90 based on the input letter. Upon locating the alternative letters, the letter determiner 860 determines whether or not each one of the alternative letters is a valid subsequent letter continuing from the sequence of letters stored in the memory based on the set of ValidWords of the valid words set 990 stored in the memory 90. Upon a determination by the letter determiner 860 that one of the alternative letters is a valid subsequent letter, the letter determiner 860 outputs the alternative letter to the letter adder 880.

KeyPreviewPopup

Another one of the functionalities implemented by the smartphone 10 is KeyPreviewPopup. In operation, the display controller 890 controls the touchscreen 20 to display a popup display of a character before adding the character is added to the added letters sets 960. The popup display may be a letter corresponding ValidLetterKey, a letter corresponding to an InvalidLetterKey, or a punctuation mark corresponding to a punctuation key. Also, the display controller 890 is additionally configured to modify the popup display—for example, by modifying the colour of the letter in the popup display—to indicate that the letter is a valid subsequent letter, that there is only one ValidWord in the valid words set 990, or that the ComposingWord is a AutoCorrectableWord or a AutoCompletableWord.

PopUpMiniKeyboard

If the key is a key displayed with an indicator tab 250, the display controller 890 displays a popup mini keyboard comprising one or more alternative letters associated with the input letter upon the user holding the key. The alternative letters are located from the alternative letter database 930 by the letter determiner 860 via the LetterSubstition functionality.

PointofDeviation

Figure 8:
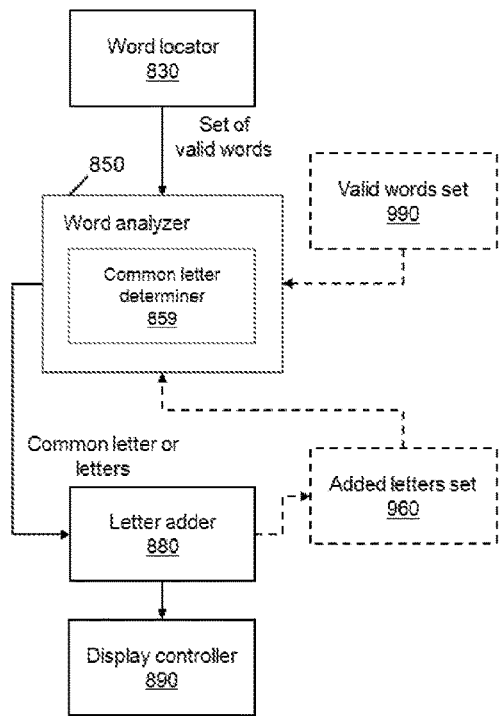
FIG. 8 is a functional block diagram of the modules of the controller implementing the PointofDeviation functionality.

Another one of the functionalities implemented by the smartphone 10 is PointofDeviation. FIG. 8 is a functional block diagram illustrating the PointofDeviation functionality in greater detail.

The common letter determiner 859 of the word analyzer 850 is arranged to determine whether or not each ValidWord of the valid words set 990 comprises a sequence of one or more common subsequent valid letters that (i) are common to all the ValidWords, and (ii) validly continues from the ComposingWord.

In this implementation, upon a determination by the common letter determiner 859 that each ValidWord of the valid words set 990 comprises a sequence of one or more common subsequent valid letters that (i) are common to all the ValidWords, and (ii) validly continues from the ComposingWord, the display controller 890 prompt the user about whether or not to add the common letters. Specifically, the display controller 890 controls the touchscreen 20 to display a contextual "auto-fill" button 242 in the ValidWordsPanel 230 of the touchscreen 20 (see for example, FIGS. 20 and 29) to enable the user to add the common letter or letters if the user wishes to do so.

ComputationLinguistics

Another one of the functionalities implemented by the smartphone 10 is ComputationLinguistics where each of the possible words stored in the words database 920 is categorized into one a plurality of word categories such as (verbs, nouns or adjectives) and the word locator 830 is configured to analyze the computational linguistics of the sentence of which the ComposingWord is a part of. Specifically, in addition to the letter or letters of the Composing Word, the word locator 830 locates the set of ValidWords from the possible words stored in the words database 920 based on the word category of a previous word. For instance, when a user types "The cat is", the next word that is going to be typed is most likely going to be a noun and so the word locator 830 can be optimized to locate only ValidWords that are nouns.

Advantageously, ComputationLinguistics optimizes the smartphone 10 to take in account the part of speech of the next or current word being typed (for example, whether the next or current word is a verb or noun), by reducing the number of words of the word database 920 the word locator 830 have to consider.

EditingWords

Another one of the functionalities implemented by the smartphone 10 is EditingWords where the processor 80 is configured to enable a user to modify a part of the ComposingWord separated from the other parts of the ComposingWord by a cursor. Herein, the term WordStem refers to the letter or letters of the ComposingWord before the Cursor; and the term WordTail refers to the letter or letters of the ComposingWord after the cursor. (That is, the WordStem and the WordTail combine to form the Composing Word).

In operation, the word locator 830 locates the set of ValidWords using only the WordStem instead of the entire ComposingWord. (That is, the letters in the WordTail are not used to locate ValidWords). Thus, the other functionalities (such as the KeyShading functionality) operates at the point of the cursor, and represent the next possible letter for the WordStem (that is, in relation to the cursor position within the ComposingWord).

Additional Functionalities

Functionalities in addition to those described above may be implemented by the smartphone 10. For example, with respect to the KeyPreviewPopup functionality, the display controller 890 may additionally be configured to display to the user a pop-up preview of a ClosestValidLetterKey instead of the letter associated with the key corresponding to the user input.

It is envisaged that in an alternative embodiment, one or more of the above mentioned functionalities may not be implemented. For example, in an alternative embodiment, the smartphone 10 may not be configured to implement the KeyPreviewPopup functionality. Also, it is envisaged that in an alternative embodiment, one or more of the modules of the processor 80 or the components of the memory 90 may not be implemented. For example, in an alternative embodiment, the memory 90 may not include an alternative letter database 930. Also, the modules of the processor 80 may be implemented in a manner that is described above. For example, rather than outputting the input letter to either the letter determiner 860 or the letter adder 880, the key determiner 820 may output merely a flag or a command to indicate to the letter determiner 860 or the letter adder 880 that the user input received by the processor 80 corresponds to a key associated with a letter.

It is envisaged that the smartphone 10 may alternatively be configured to assemble words than are not based on Latin alphabetic letters. For example, the device may be configured to assemble Chinese characters instead of or in addition to English words. Also, the smartphone 10 is configured to assemble words according to the Standard English word entry convention where the letters forming a word are input sequentially from the first letter of the word to the last letter of the word. However, persons skilled in the art will appreciate that the smartphone 10 may alternatively or additionally be configured to assemble words according to another word entry convention. For example, in an alternative embodiment where the smartphone is configured to assemble Chinese characters, the smartphone may be configured to assemble words according to different character stroke entry conventions where the character stroke of characters are entered in different sequences.

It is envisaged that the keyboard 280 in an alternative embodiment may be a physical keyboard instead of a virtual keyboard implemented by a touchscreen. For example, a physical keyboard comprising LEDs arranged to highlight each key of the keyboard may be used to implement the KeyShading functionality and/or a physical keyboard comprising a mini-display arranged to display alternative letters for each key of the keyboard may be used to implement the PopupPreview functionality. Also, persons skilled in the art will appreciate that a user may input a user input via different ways other than directly pressing a key of the keyboard. For example, the user input may be input alternatively via multi-touch gestures on a touchscreen, physical gestures (such as tilting a smartphone etc), voice inputs. Also, alternative or additional user input devices (such as a digitiser pen or stylus, a mouse, and/or a game controller comprising one or more buttons, single or dual directional control pads or thumbsticks) may be used in other embodiments. The above functionalities may be implemented differently in embodiments where there is an additional or alternative user input device. For example, in an embodiment where a mouse is used as a user input device, the pop up previews may be displayed when the mouse cursor "hovers" above the display of a key of keyboard device. In another example, in an embodiment where a touch sensitive keyboard is used, a pop up preview may be displayed when a user touches a key of the keyboard without pressing the key.

Also, it is envisaged that the keyboard in an alternative embodiment may be displayed in a different layout to the QWERTY layout. For example, it is envisaged that the keyboard may be displayed in a "Chord" layout or a "Radial" layout. Persons skilled in the art will also appreciate that there are a plurality of QWERTY layout variants and that the keyboard layout may be one of the plurality of QWERTY layout variants. Persons skilled in the art will also appreciate that the keyboard may be in a layout that is designed for a non-English language, and that the keys of the keyboard may not correspond to English alphabet. For example, the keys of the keyboard may correspond to a character stroke.

Figure 9:
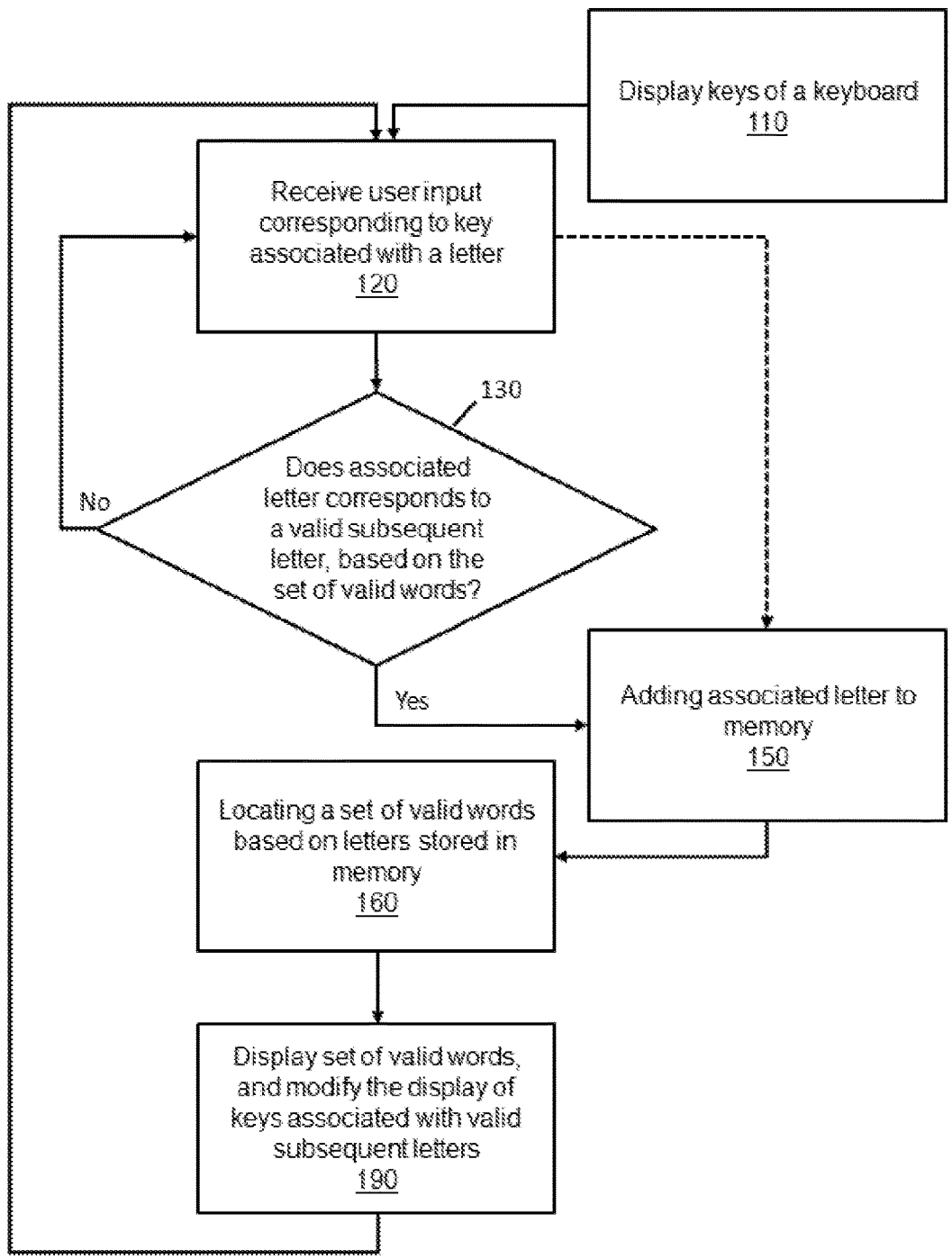
FIG. 9 is a flowchart illustrating the KeyShading functionality.

FIG. 9 is a flowchart illustrating the KeyShading functionality for assisting a user to assemble a word. At step 110, the display controller 890 implemented by the processor 80 of the controller 30 of the smartphone 10 controls the touchscreen 20 of the smartphone 10 to display the keys of the keyboard 280 to the user of the smartphone 10. At step 120, the processor 80 receives, from the user, a user input to assemble a word, the user input corresponding to a key associated with a letter after the user types the letter using the smartphone 10 by pressing the key. If the associated letter is the first letter after a terminating character (for example, a space or a terminating punctuation mark such as a em-dash) received by the processor 80, the letter adder 880 implemented by the processor 80 adds the associated letter to the added letters set 960 stored in the memory 90 of the controller 30. That is, the associated letter is added to the added letters set 960 if the letter is the first letter of the word to be assembled. Otherwise, if the associated letter is a subsequent letter of the word to be assembled, at step 130, the letter determiner 860 implemented by the processor 80 determines whether the associated letter is a valid subsequent letter that validly continues from the letter or letters stored in the added letters set 960. If the letter determiner 860 determines that the associated letter is a valid subsequent letter, the letter added 880 adds the associated letter to the added letters set 960. At step 160, the word locator 830 implemented by the processor 80 locates a set of ValidWords—that is, words that comprises a sequence of letters corresponding to the sequence of letters added to the added letters set 960—from the words of the word database 920 stored in the memory 90, and stores the set of ValidWords in the valid words set 990 of the memory 90. At step 190, the display controller 890 controls the touchscreen 20 to display one or more of the located ValidWords in the ValidWordsPanel 230, and modifies the respective keys associated with valid subsequent letters determined by the valid subsequent letters determiner 858 of the word analyzer 850 implemented by the processor 80. The smartphone 10 then awaits the next user input by the user.

Figure 10:
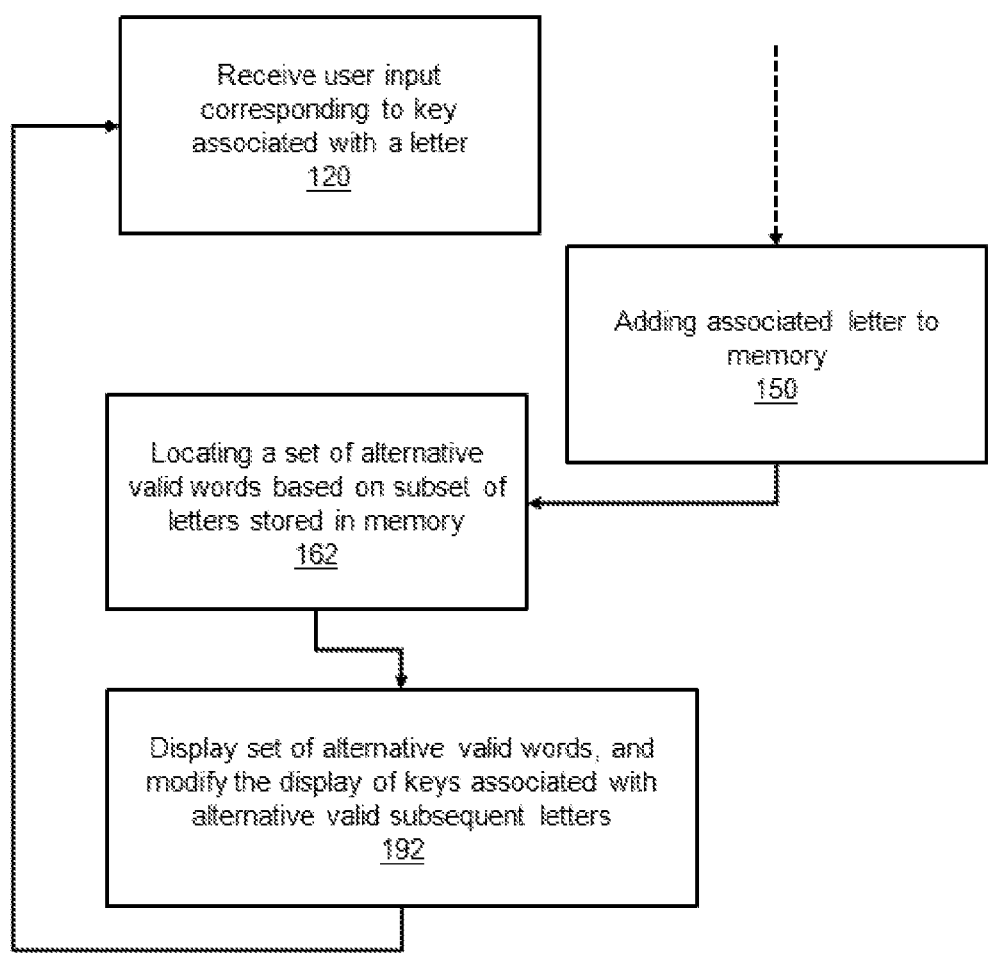
FIG. 10 is an extension of the flowchart of FIG. 9, which additionally illustrates the PostKeyCorrection functionality.

FIG. 10 is an extension of the flowchart of FIG. 9, which additionally illustrates the PostKeyCorrection functionality. After the associated letter is added to the added letters set 960 at step 150, at step 162, the word locator 830 additionally locates a set of ValidWords that comprises a sequence of letters corresponding to a subset of the sequence of letters added to the added letters set 960 from the words of the word database 920, and stores the set of ValidWords in the valid words set 990 of the memory 90. That is, in addition to the ValidWords comprising a sequence of letters corresponding to the sequence of added letters, the word locator 830 locates ValidWords that comprise only sequence of letters corresponding to a subset of the sequence of added letters. By locating such additional ValidWords, the smartphone 10 assumes that one or more of the added letters are incorrectly added. At step 192, the display controller 890 controls the touchscreen 20 to display one or more of the located ValidWords in the ValidWordsPanel 230, and modifies the respective keys associated with alternative valid subsequent letters determined by the valid subsequent letters determiner 858 to be letters of the AdditionalValidWords that validly continues from the added letters. The smartphone 10 then awaits the next user input by the user.

Figure 11:
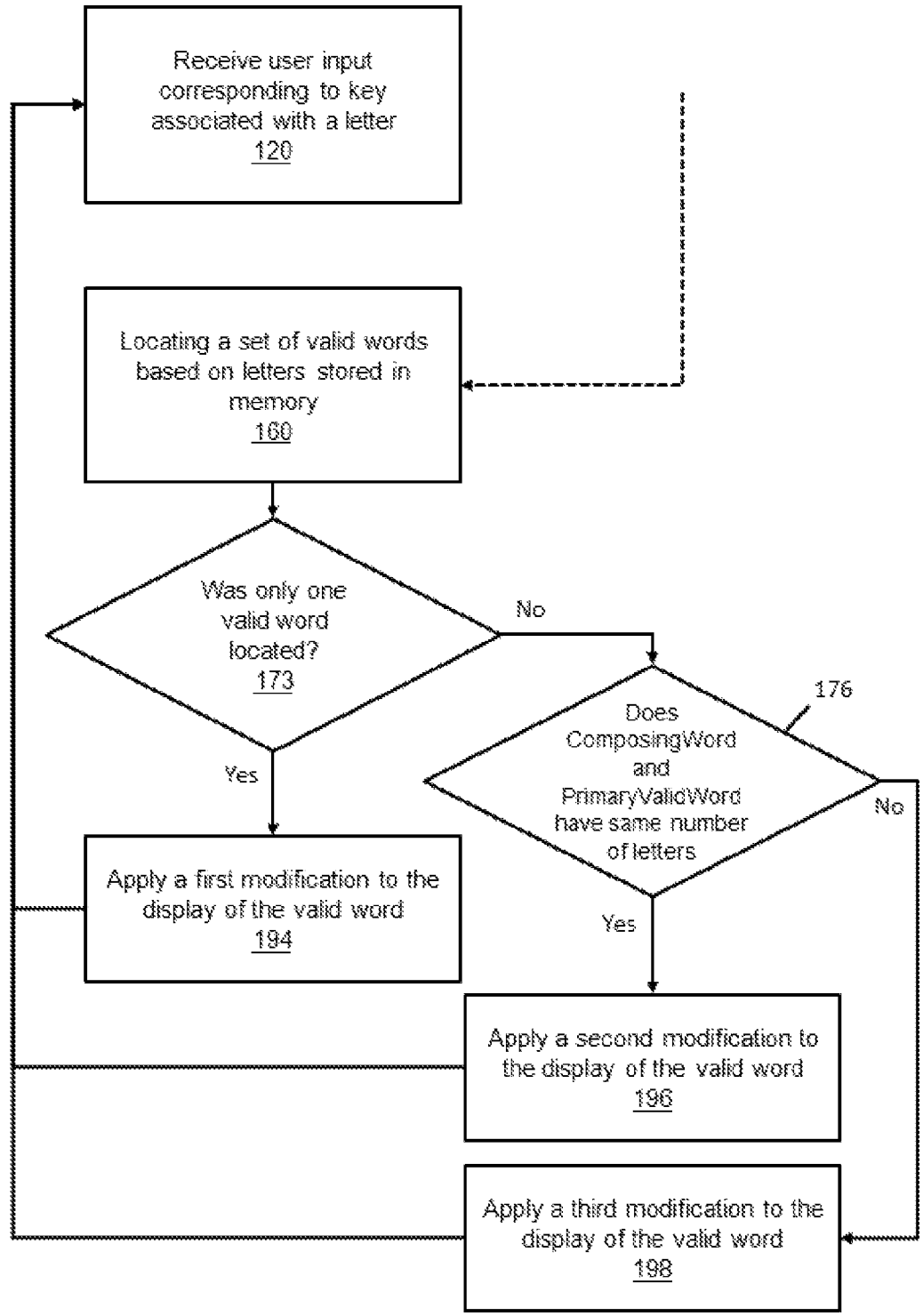
FIG. 11 is an extension of the flowchart of FIG. 9, which additionally illustrates the ComposingMode functionality.

FIG. 11 is an extension of the flowchart of FIG. 9, which additionally illustrates the ComposingMode functionality. After the set of ValidWords are located by the word locator 830 at step 160, at step 173, the valid word set size determiner 853 of the word analyzer 850 determines whether or not the set of ValidWords stored in the valid words set 990 consists of only one ValidWord. At step 194, if the valid word set size determiner 853 determines that the valid words set 990 consists of only one ValidWord, the display controller 890 controls the touchscreen 20 to apply a first modification to the display of the ValidWord. Specifically, the display controller 890 controls the touchscreen 20 to modify the colour of the ValidWord to orange to indicate that the ComposingWord is a AutoCompletableWord. At step 176, if the valid word set size determiner 853 determines that the valid words set 990 consists of not only one ValidWord, the letter number comparator 856 of the word analyzer 850 determines whether or not the ComposingWord (that is, the letters stored in the added letters set 960) has the same number of letters as the PrimaryValidWord. At step 196, if the letter number comparator 856 determines that the ComposingWord has the same number of letters as the PrimaryValidWord, the display controller 890 controls the touchscreen 20 to apply a second modification to the display of the ValidWord. Specifically, the display controller 890 controls the touchscreen 20 to modify the colour of the ValidWord to blue to indicate that the ComposingWord is a AutoCorrectableWord. At step 198, if the letter number comparator 856 determines that the ComposingWord does not have the same number of letters as the PrimaryValidWord, the display controller 890 controls the touchscreen 20 to apply a third modification to the display of the ValidWord. Specifically, the display controller 890 controls the touchscreen 20 to modify the colour of the ValidWord to green to indicate that the ComposingWord is a PreValidWord. The smartphone 10 then awaits the next user input by the user.

Figure 12:
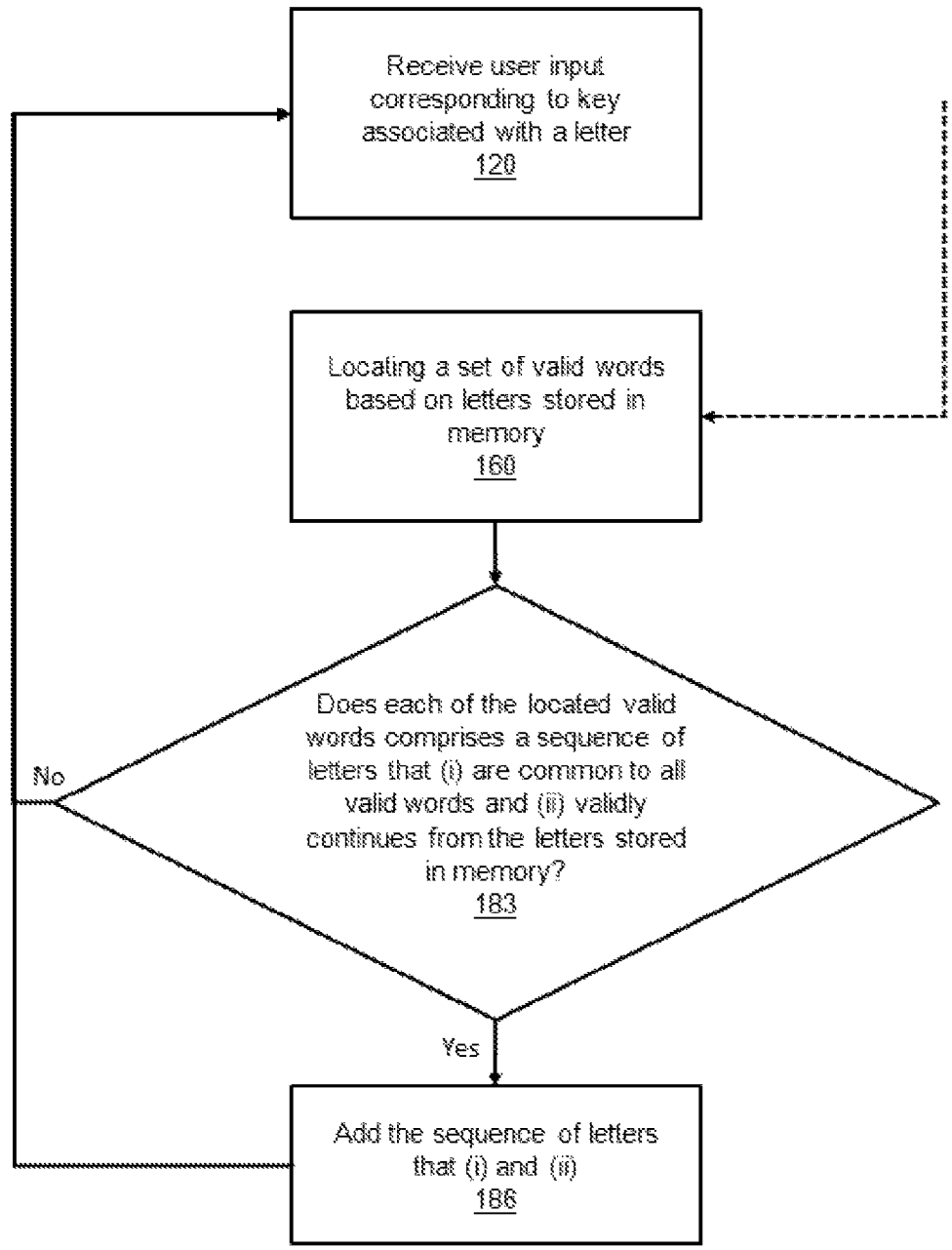
FIG. 12 is an extension of the flowchart of FIG. 9, which additionally illustrates the PointofDeviation functionality.

FIG. 12 is an extension of the flowchart of FIG. 9, which additionally illustrates the PointofDeviation functionality. After the set of ValidWords are located by the word locator 830 at step 160, at step 183, the common letter determiner 859 of the word analyzer 850 determines whether or not each one of the located ValidWords comprises that (i) are common to all of the located ValidWords and (ii) validly continues from the ComposingWord. If the common letter determiner 859 determines that each one of the located ValidWords comprises a sequence of letters that (i) are common to all of the located ValidWords and (ii) validly continues from the ComposingWord, the letter adder 880 adds the sequence of letters to the ComposingWord. The smartphone 10 then awaits the next user input by the user.

Figure 13:
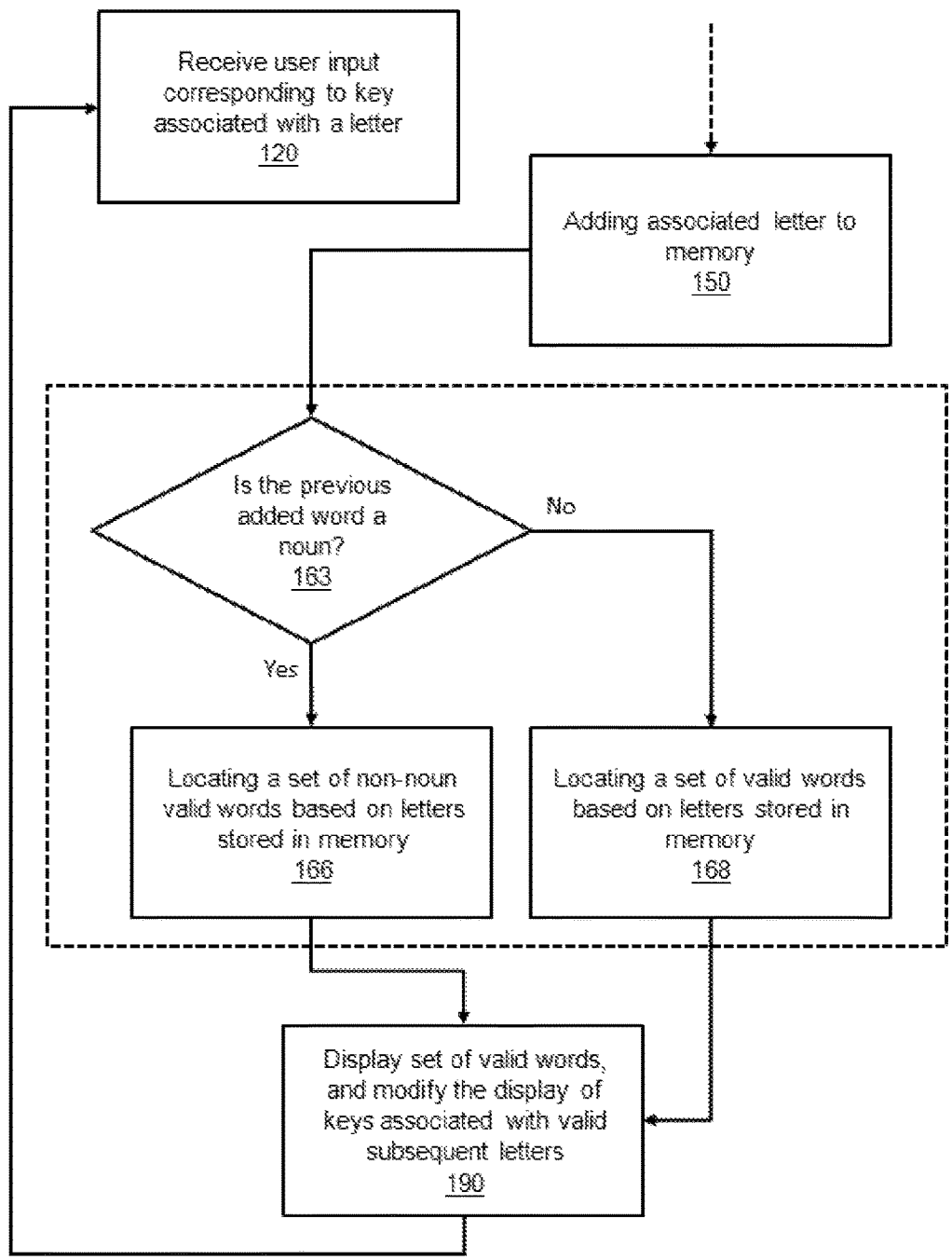
FIG. 13 is an extension of the flowchart of FIG. 9, which additionally illustrates the ComputationLinguistics functionality.

FIG. 13 is an extension of the flowchart of FIG. 9, which additionally illustrates the ComputationLinguistics functionality. After the associated letter is added to the added letters set 960 at step 150, at step 163, the word locator 830 determines whether or not the previous word assembled by the user is a noun. The word locator 830 does this by locating the previous assembled from the words stored in the word database 920, and determining whether or not the located word is a noun. The word locator 830 makes the determination by checking the word category or class of the located word. If the word locator 830 determines that the previous word assembled by the user is a noun, the word locator 830 locates only ValidWords that are non-nouns. Specifically, the word locator 830 locates a set of ValidWords that consist of only ValidWords that are non-nouns and that validly continues from the sequence of letters added to the added letters set 960. If the word locator 830 determines that the previous word assembled by the user is not a noun, at step 168, the word locator 830 locates any ValidWords that validly continues from the sequence of letters stored in the added letters set 960. At step 190, the display controller 890 controls the touchscreen 20 to display one or more of the located ValidWords in the ValidWordsPanel 230, and modifies the respective keys associated with valid subsequent letters determined by the valid subsequent letters determiner 858 of the word analyzer 850 implemented by the processor 80. The smartphone 10 then awaits the next user input by the user. In this embodiment, the word locator 830 determines only whether or not a previous word is a noun. However, it is envisaged that the word locator 830 may determine whether or not a word or words other the previous word are nouns in an alternative embodiment. Also, it is envisaged that the word locator 830 may locate ValidWords based on a determination other than whether or not a previous word or words is a noun. For example, the word locator 830 may locate only ValidWords that are nouns upon a determination that the previous word is an adjective.

Figure 14:
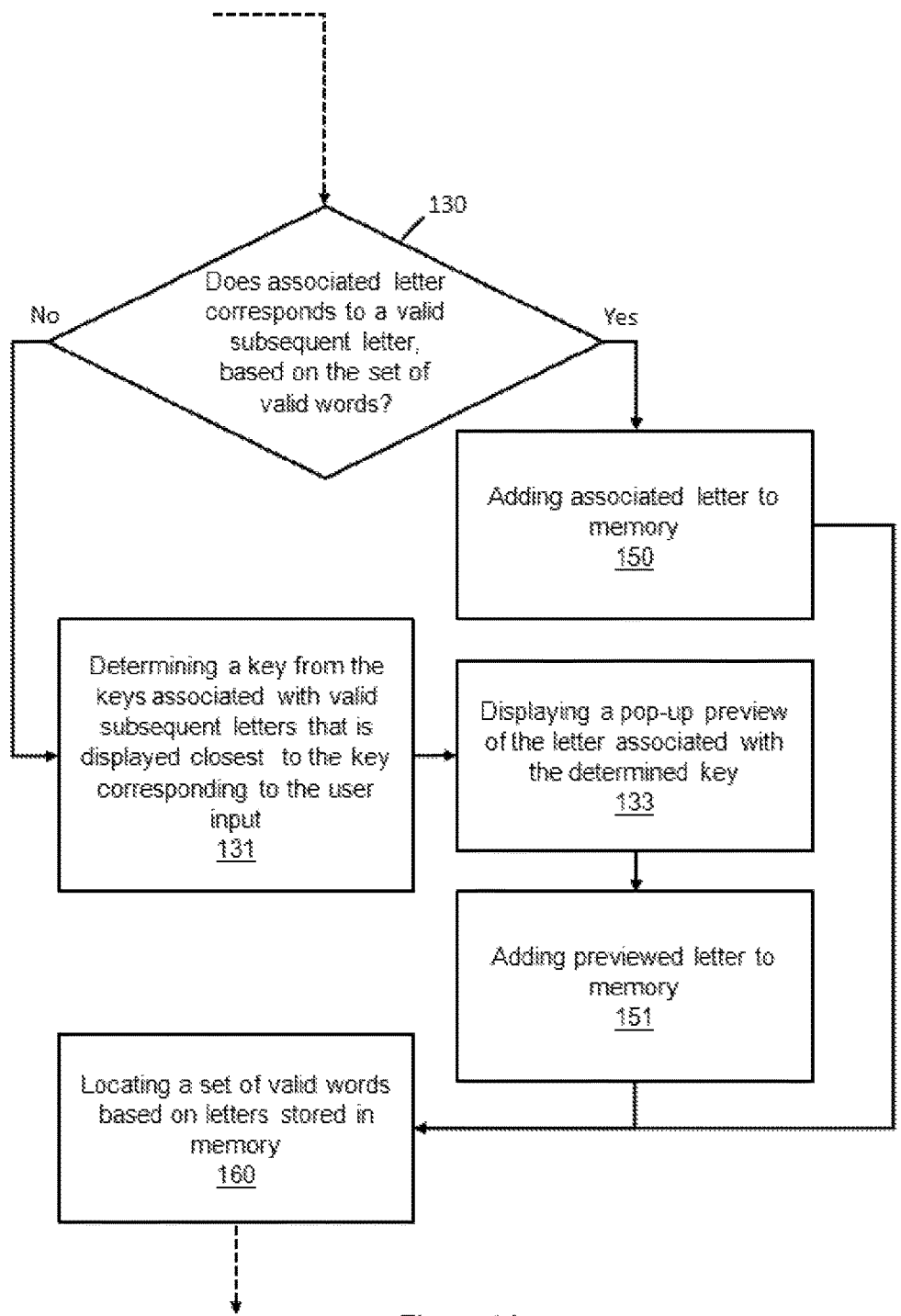
FIG. 14 is an extension of the flowchart of FIG. 9, which additionally illustrates the PreKeyCorrection functionality and the PopUpPreview functionality.

FIG. 14 is an extension of the flowchart of FIG. 9, which additionally illustrates the PreKeyCorrection functionality and the PopUpPreview functionality. After the letter determiner 860 determines that the associated letter (that is, the letter associated with the key corresponding to the user input) is not a valid subsequent letter, at step 131, the key position determiner 863 of the letter determiner 860 determines the display position of the key associated with each one of the valid subsequent letters determined by the letter determiner 860, and the closest key determiner 866 of the letter determiner 860 determines one of the keys associated with the valid subsequent letters as a valid subsequent letter key that is displayed closest to the key corresponding to the user input. At step 133, the display controller 890 controls the touchscreen 20 to display a pop up preview of the letter associated with the valid subsequent letter key that is displayed closest to the key corresponding to the user input. At step 151, the letter added 880 adds the previewed letter to the added letters set 960. The word locator 160 then locates a new set of ValidWords based on the sequence of letters of the added letters set 960 (which now includes the previewed letter).

Figure 15:
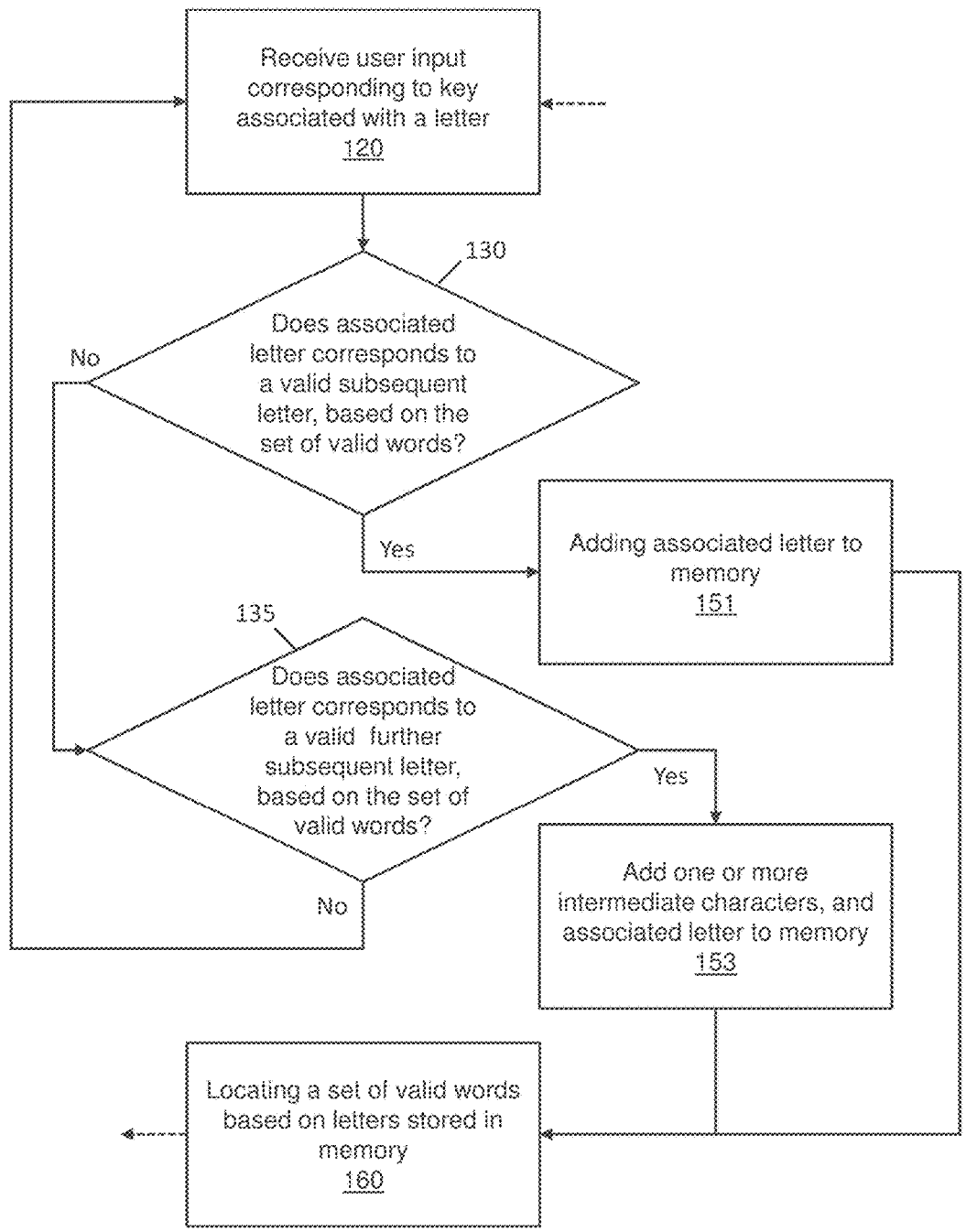
FIG. 15 is an extension of the flowchart of FIG. 9, which additionally illustrates one of the AutomaticSystems functionalities.

FIG. 15 is an extension of the flowchart of FIG. 9, which additionally illustrates one of the AutomaticSystems functionalities. After the letter determiner 860 determines that the associated letter is not a valid subsequent letter, at step 135, the letter determiner 860 determines, based on the ValidWords located by the word locator 830, whether or not the associated letter is a valid further subsequent letter that continues from one or more intermediate characters (for example, a non-alphabetic character such as a non-terminating punctuation mark) which in turn continues from the sequence of letters of the added letters set 960. If the letter determiner 860 determines that the associated letter is a valid further subsequent letter, at step 153, the letter determiner 860 adds the one or more intermediate characters followed by the associated letter to the added letters set 960. The word locator 160 then locates a new set of ValidWords based on the sequence of letters of the added letters set 960 (which now includes the one or more intermediate characters followed by the associated letter).

Figure 16:
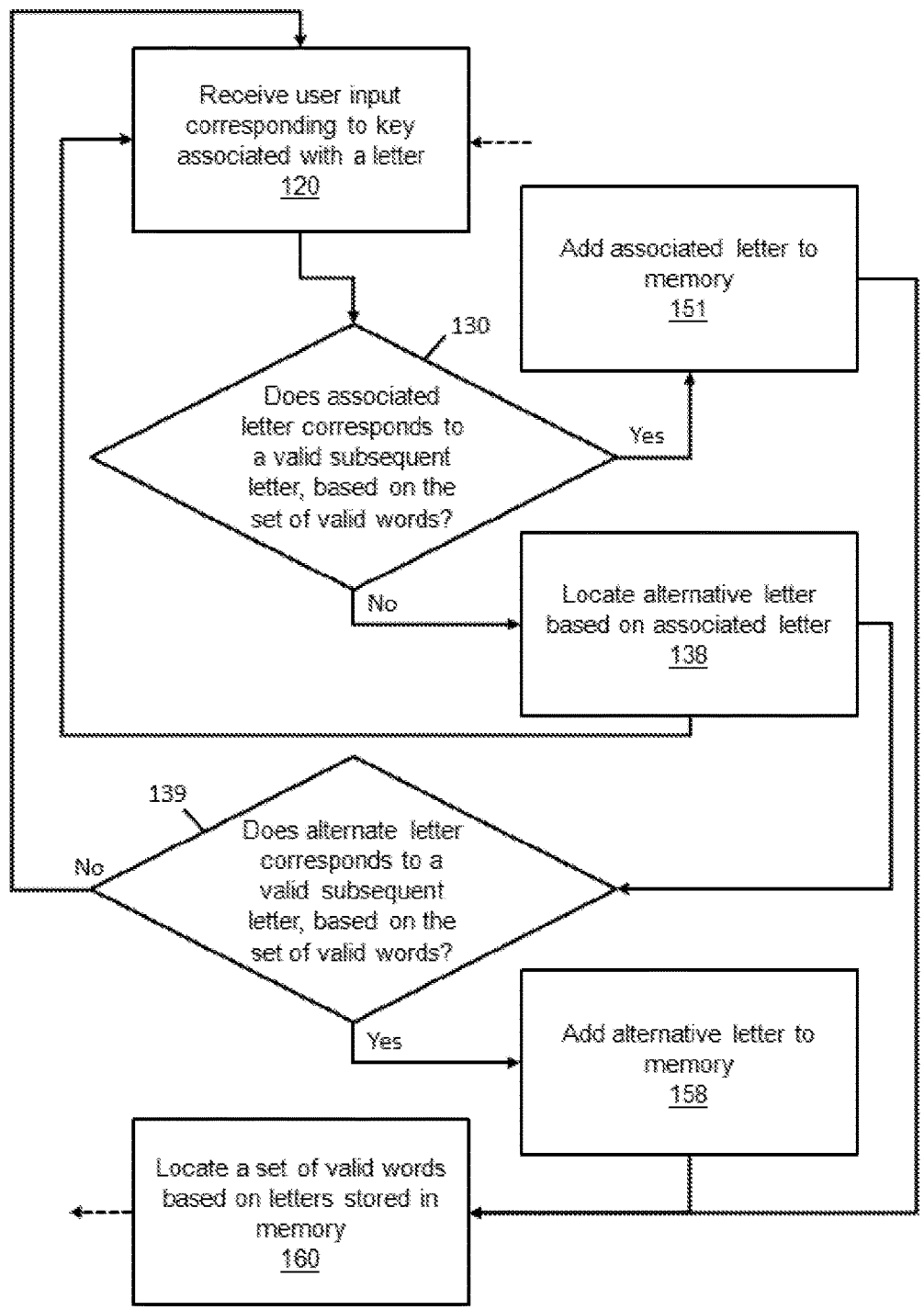
FIG. 16 is an extension of the flowchart of FIG. 9, which additionally illustrates another one of the AutomaticSystems functionalities.

FIG. 16 is an extension of the flowchart of FIG. 9, which additionally illustrates another one of the AutomaticSystems functionalities. After the letter determiner 860 determines that the associated letter is not a valid subsequent letter, at step 138, the alternative letter locator 869 of the letter determiner 860 locates alternative letter or letters that are associated with the associated letter from the plurality of alternative letters of the alternative letter database 930 stored in the memory 90. If no alternative letter or letters are located by the alternative letter locator 869, the smartphone 10 awaits the next user input by the user. Otherwise, if an alternative letter or alternative letters are located by the alternative letter locator 869, at step 139, the letter determiner 860 determines whether one of the alternative letters correspond to a valid subsequent letter that validly continues from the sequence of letters of the added letters set 960. If the letter determiner 860 determines that one of the alternative letters correspond to a valid subsequent letter, the letter adder 880 adds the alternative letter to the added letters set 960 at step 158. The word locator 160 then locates a new set of ValidWords based on the sequence of letters of the added letters set 960 (which now includes the alternative letter).

Figure 17:
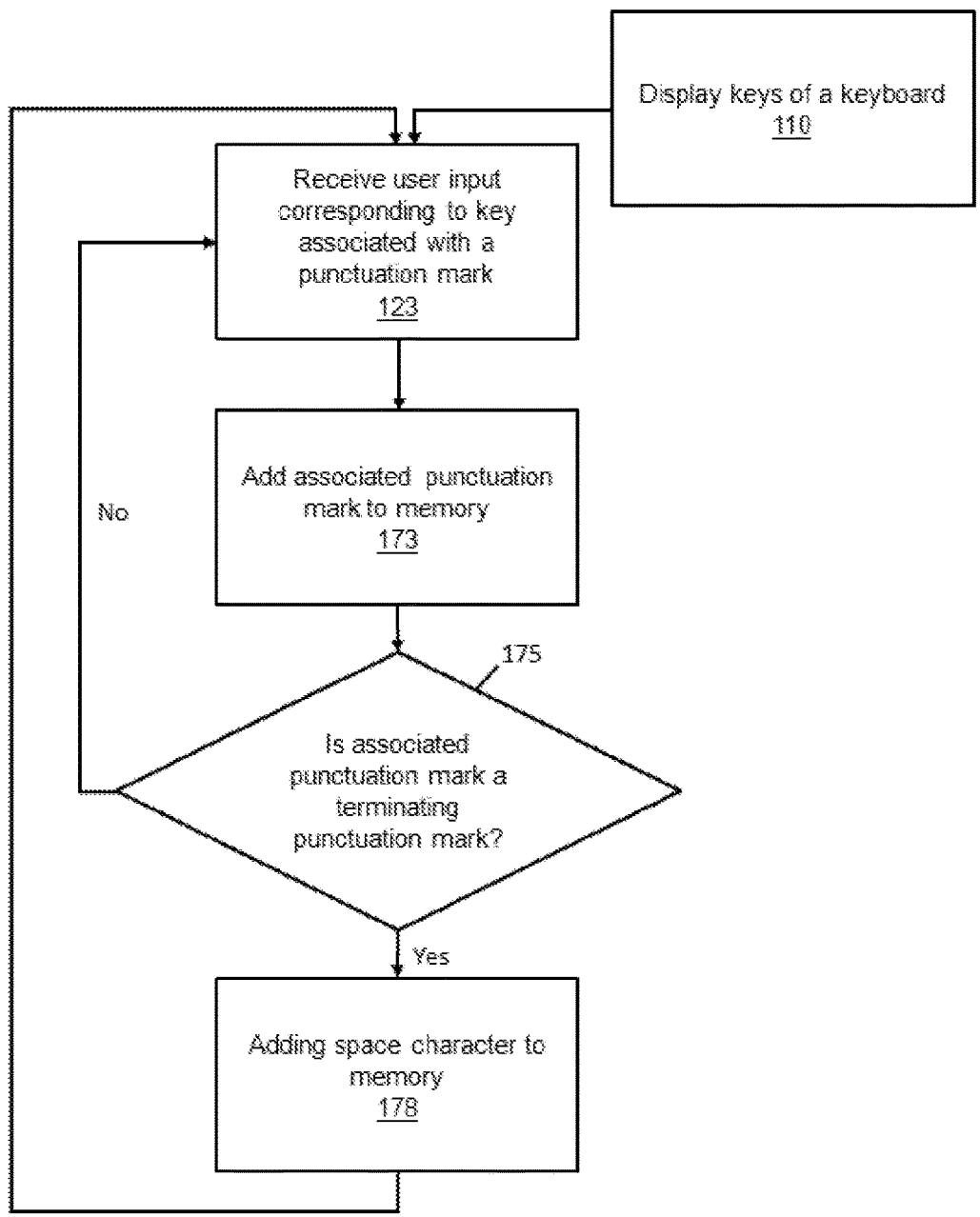
FIG. 17 is an extension of the flowchart of FIG. 9, which additionally illustrates yet another one of the AutomaticSystems functionalities.

FIG. 17 is an extension of the flowchart of FIG. 9, which additionally illustrates yet another one of the AutomaticSystems functionalities. After the keys of the keyboard 280 are displayed on the touchscreen 20 to the user, at step 123, the processor 80 receives, from the user, a user input to assemble text, the user input corresponding to a key associated with a punctuation mark. At step 173, the processor 80 adds the associated punctuation mark to the text to be assembled by the user stored in the memory 90. At step 175, the processor 80 determines whether or not the associated punctuation mark is a terminating punctuating mark. If the processor 80 determines that the associated punctuation mark is a terminating punctuating mark, the processor 178 adds a space character to the text to be assembled by the user stored in the memory 90.

EXAMPLES

Figure 18A:
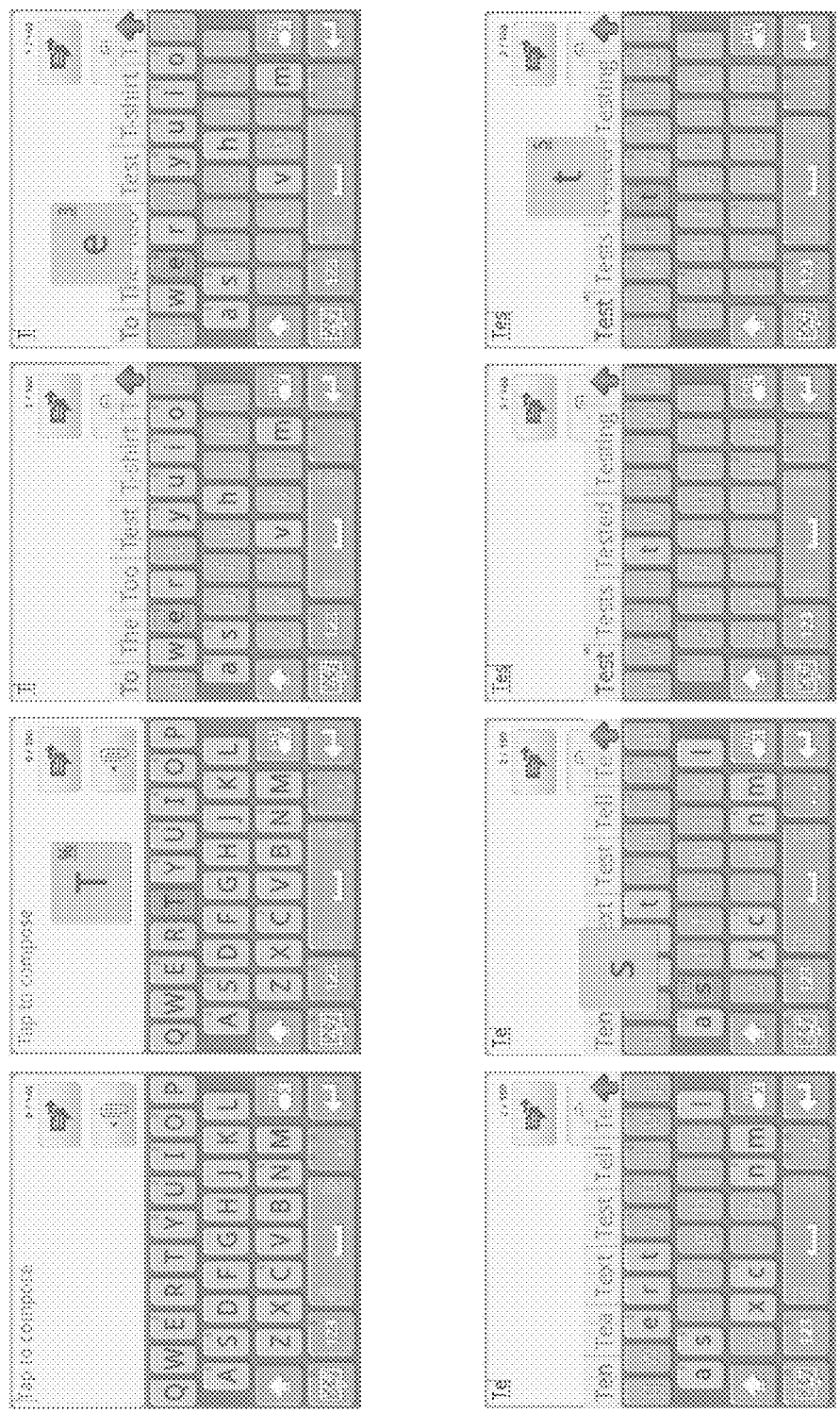
FIG. 18A comprises a series of screenshots illustrating the KeyShading functionality and the KeyPreviewPopup functionality.
Figure 18B:
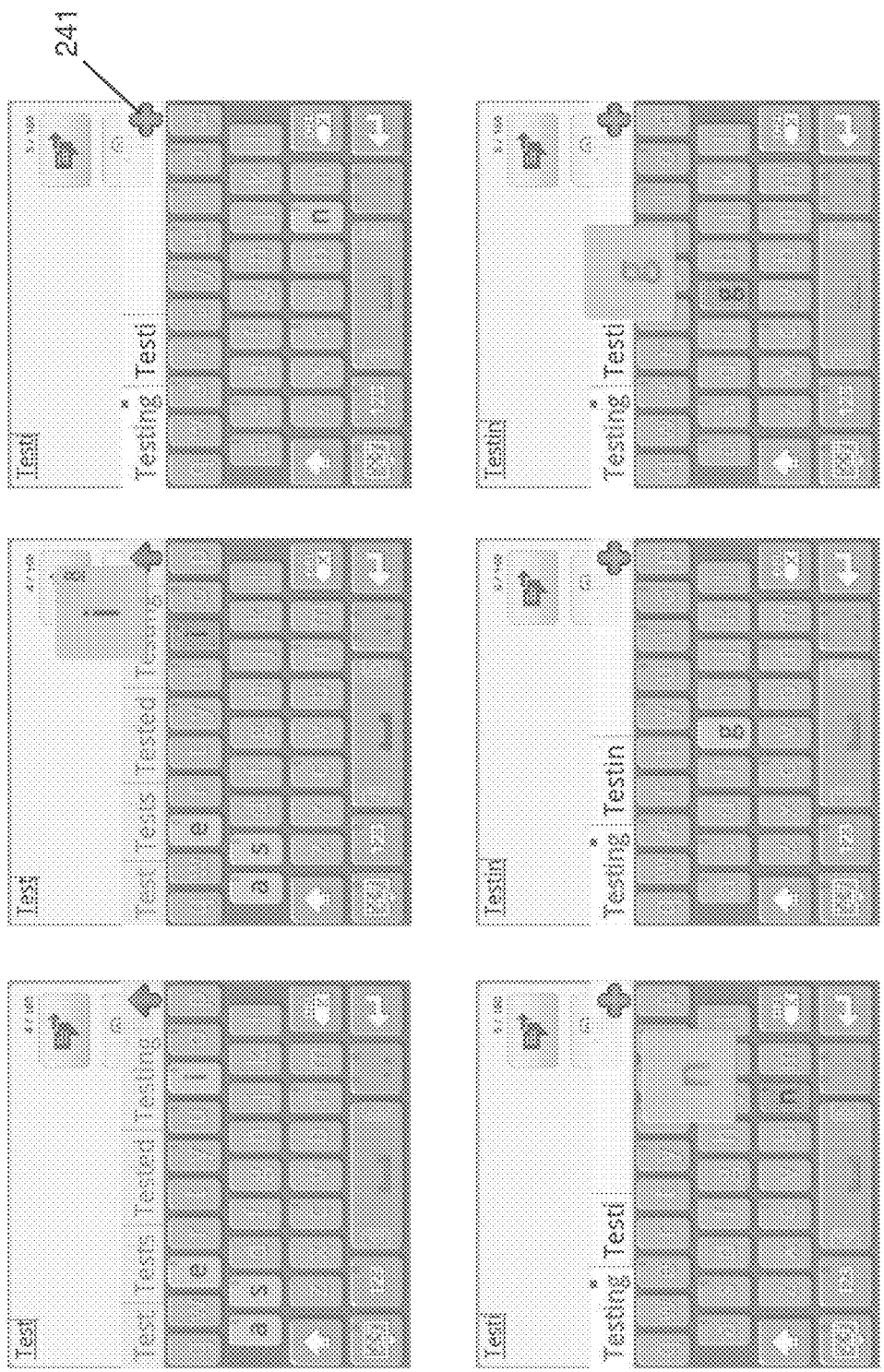
FIG. 18B comprises a further series of screenshots illustrating the KeyShading functionality and the KeyPreviewPopup functionality.
Figure 18C:
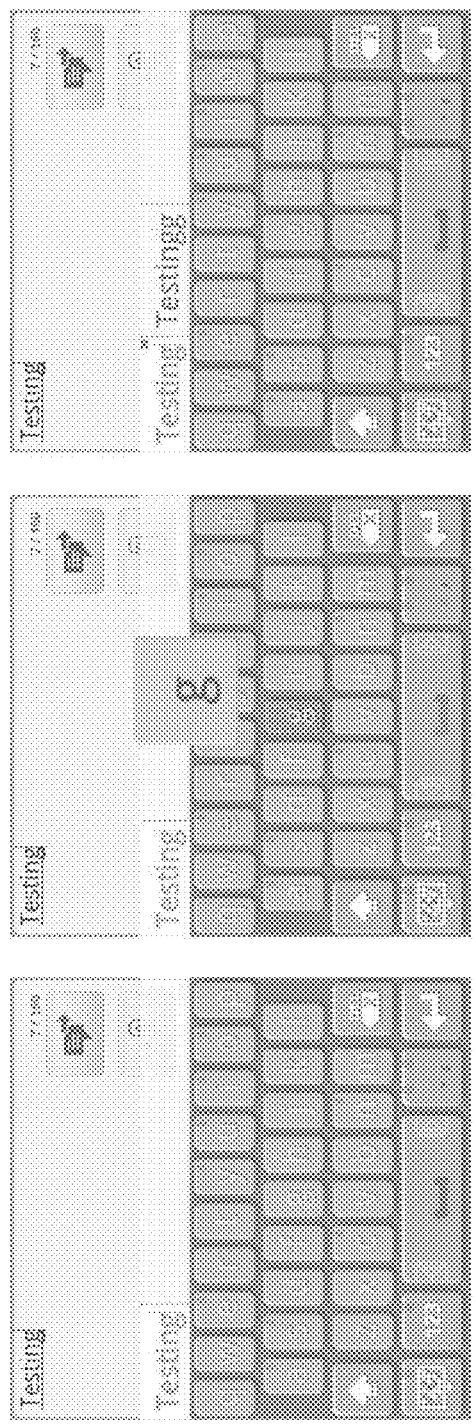
FIG. 18C comprises yet another series of screenshots illustrating the KeyShading functionality and the KeyPreviewPopup functionality.

FIG. 18A to 18C comprise a series of screenshots illustrating the KeyShading functionality. The screenshots also illustrate some aspects of the KeyPreviewPopup functionality. This series of screen shots illustrates the process of assembling a word using the smartphone 10.

Referring to FIG. 18A, the shaded keys (that is, the keys that are lightly shaded with a blue background via KeyShading) are valid subsequent letters (that is, keys corresponding to letters which represent the next letter in one or more of the ValidWords). For example, three of the ValidWords are "To", "T-Shirt", "The" and "Too". After the letter "T" is input by the user, the word "To" and "Too" both share "o" as the next valid letter, hence the letter "o" is shaded. By the same process, the key/letter "h" is valid as it validly continues from "T" in the word "The". In the example, this process repeats itself for each letter entered, for each distinct word.

The ValidWord, "T-shirt" represents a deviation of the process, where the hyphen (non-alphabetic) character, is skipped, and the next alphabetic letter, in this example "s", is considered the next valid subsequent letter (for the given word). As indicated in the figure, the letter "s" is displayed as a valid subsequent letter.

As indicated above, the screenshots of FIG. 18A also illustrates the KeyPreviewPopup functionality. For example, in the figure, a pop up preview of a letter is displayed on the touchscreen 20 when a user presses the touchscreen 20 at the position of the touchscreen 20 corresponding to the key associated with the letter. The key is displayed in white colour to indicate that the key corresponds to a valid subsequent letter.

Referring to FIG. 18B, the pop up previews of the letters "n" and "g" are in orange colour to indicate that there is only one ValidWord in the valid words set 990 and that the word to be assembled can be automatically completed. The figure also shows an "Add" button 241. Pressing this "Add" button adds the Composing Word "Testi" as a new word to the memory.

Referring to FIG. 18C, the final three screenshots illustrate that no more valid subsequent letters can be added to the currently composing word. The last screenshot illustrates that pressing the "g" key does not result in a key press being registered, and the pop up preview of the "g" key is in red to indicate that the key/letter is invalid. Also, in the figure, "Testingg" is displayed in the ValidWordsPanel 230 to indicate the form of the ComposingWord had the "g" key been registered.

In the implementation illustrated in FIGS. 18A to 18C, pressing the spacebar commits the letters assembled (that is, complete the assembly process for the current word), or the user can hold an InvalidLetterKey to add the letter associated with the InvalidLetterKey (which is a letter that is not a valid subsequent letter).

FIGS. 19A to 19E comprise series of screenshots illustrating the PostKeyCorrection functionality. The screenshots also additionally illustrate aspects of the KeyShading functionality and the ComposingMode functionality.

Figure 19A:
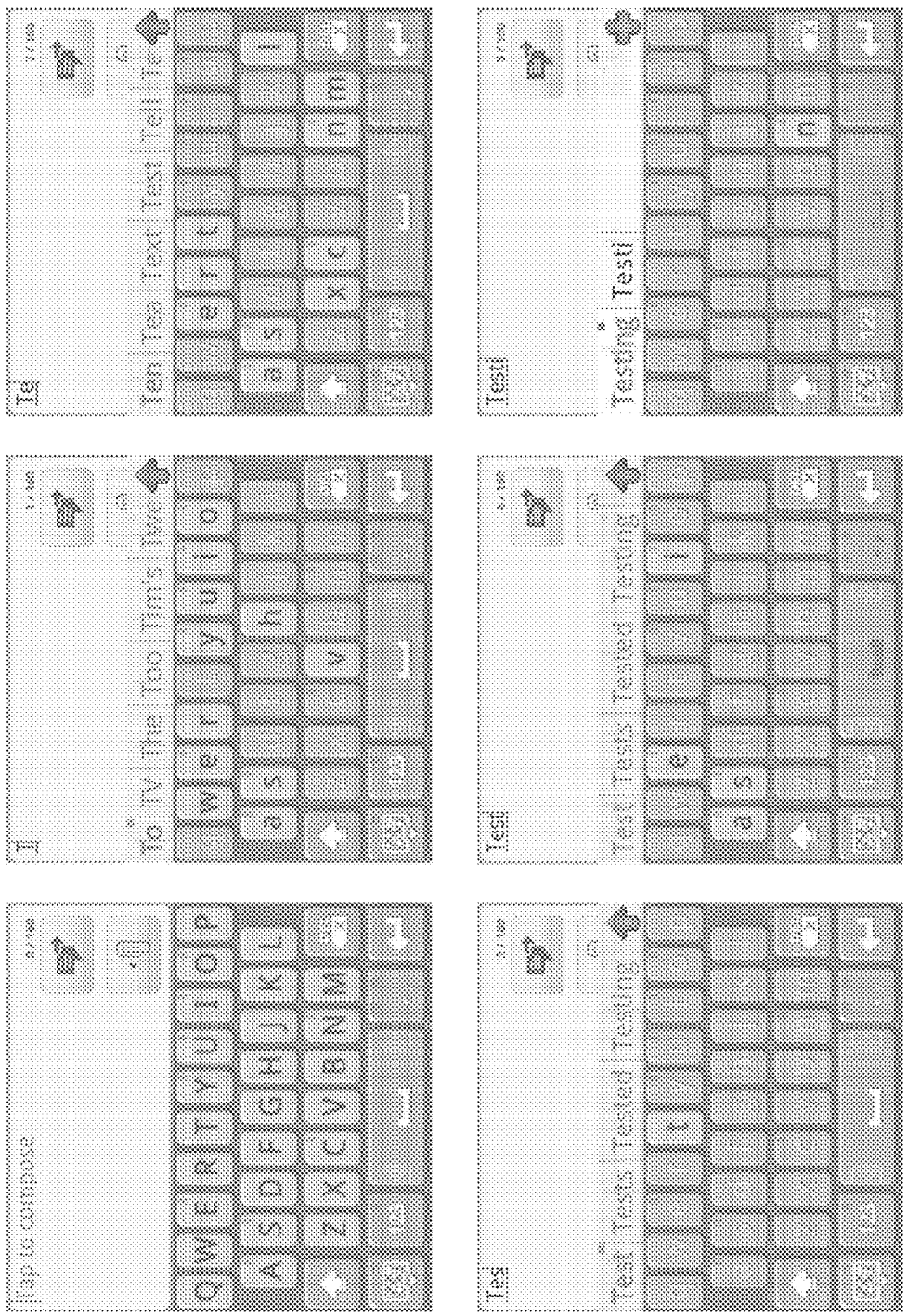
FIG. 19A comprises a series of screenshots illustrating the KeyShading functionality without the KeyPreviewPopup functionality.

In FIG. 19A, the screenshots illustrate ValidWords that are located based on letters corresponding to keys corresponding to user inputs (that is, based on the actual keys pressed by the user), and valid subsequent letters that are determined only from such ValidWords. This represents an optimised implementation of the KeyShading functionality where only ValidWords can be typed and words are assembled using actual key strokes.

Figure 19B:
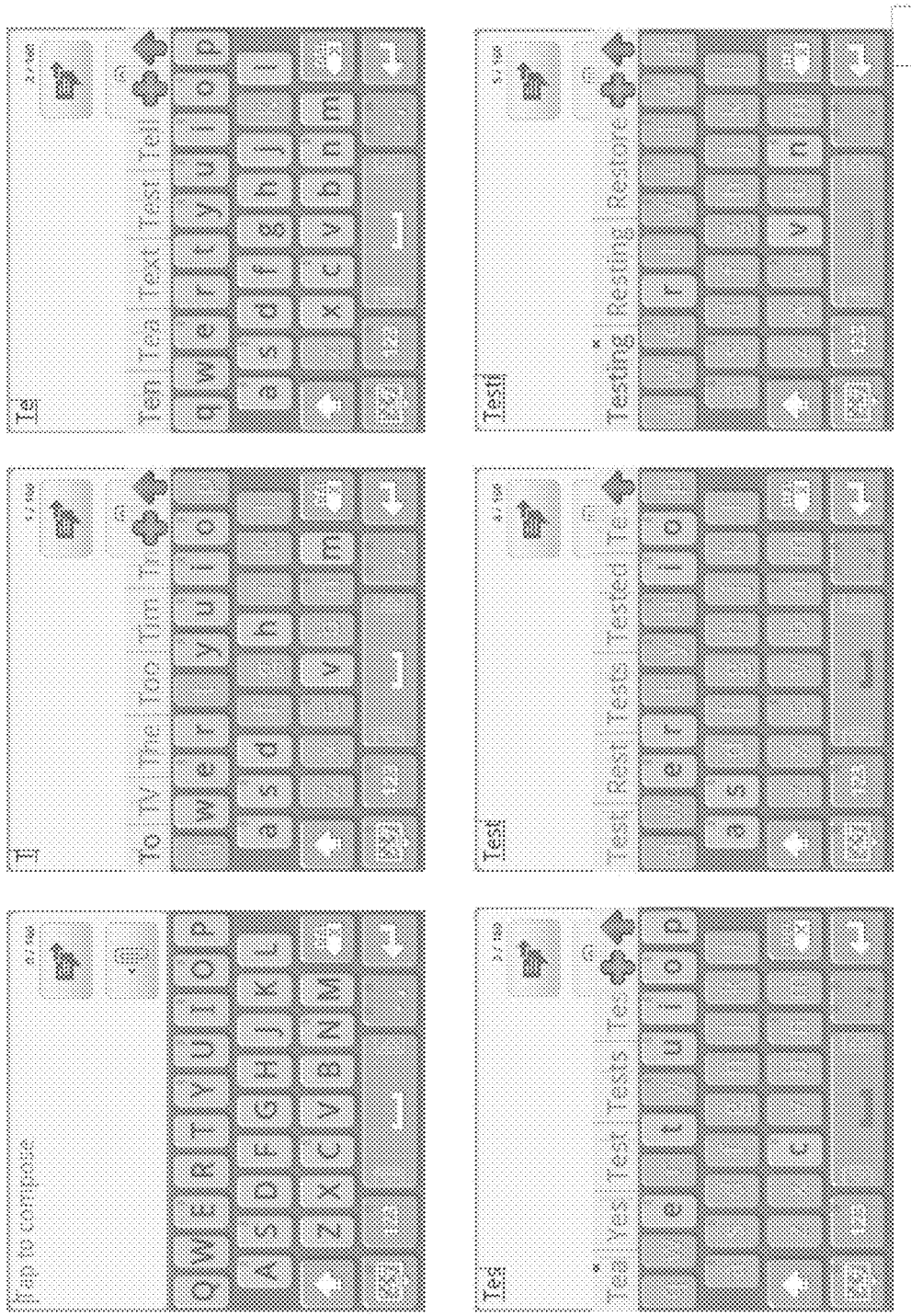
FIG. 19B comprises a series of screenshots illustrating the KeyShading functionality with the PostKeyCorrection functionality.

FIG. 19B comprises a series of screenshots illustrating the PostKeyCorrection feature where additional ValidWords are located based on a subsequence of the added letters (that is, assuming that the added letters contain mistyped letters) in addition to ValidWords located based on the sequence of the added letters. In this implementation, the first two letters of the word currently being composed are used to locate the additional ValidWords based on the proximity of the actual key pressed. Herein, the term QuickFix refers to the implementation of PostKeyCorrection where the first two letters of the word currently being composed are used to locate the additional ValidWords based on the proximity of the actual key pressed. Permutations of keys that are identified as invalid are not used to locate ValidWords. These differences can be seen in the different ValidWord expressed in the previous sequence. For example in the last image of the sequence, we see the word "Resting" is displayed as a ValidWord.

In this implementation, there is an increased amount of valid subsequent letters at each step due to the extra permutations and an increase in the number of ValidWords located. In an alternative implementation, AdditionalValidLetterKeys may be shaded darker (not illustrated), but retain the default functionality of a key corresponding to a valid subsequent letter. Also, the priority of a key may be weighted lower.

In the example illustrated in FIG. 19B, in the event that there is only one ValidWord arising from the letters added by the user but multiple AdditionalValidWords are located because of the PostKeyCorrection functionality, only the ValidWords located based on the letters added by the user are used in the ComposingMode functionality (as shown in FIG. 19B). When no ValidWords arising from the letters added by the user are added, the AdditionalValidWords are used.

Figure 19C:
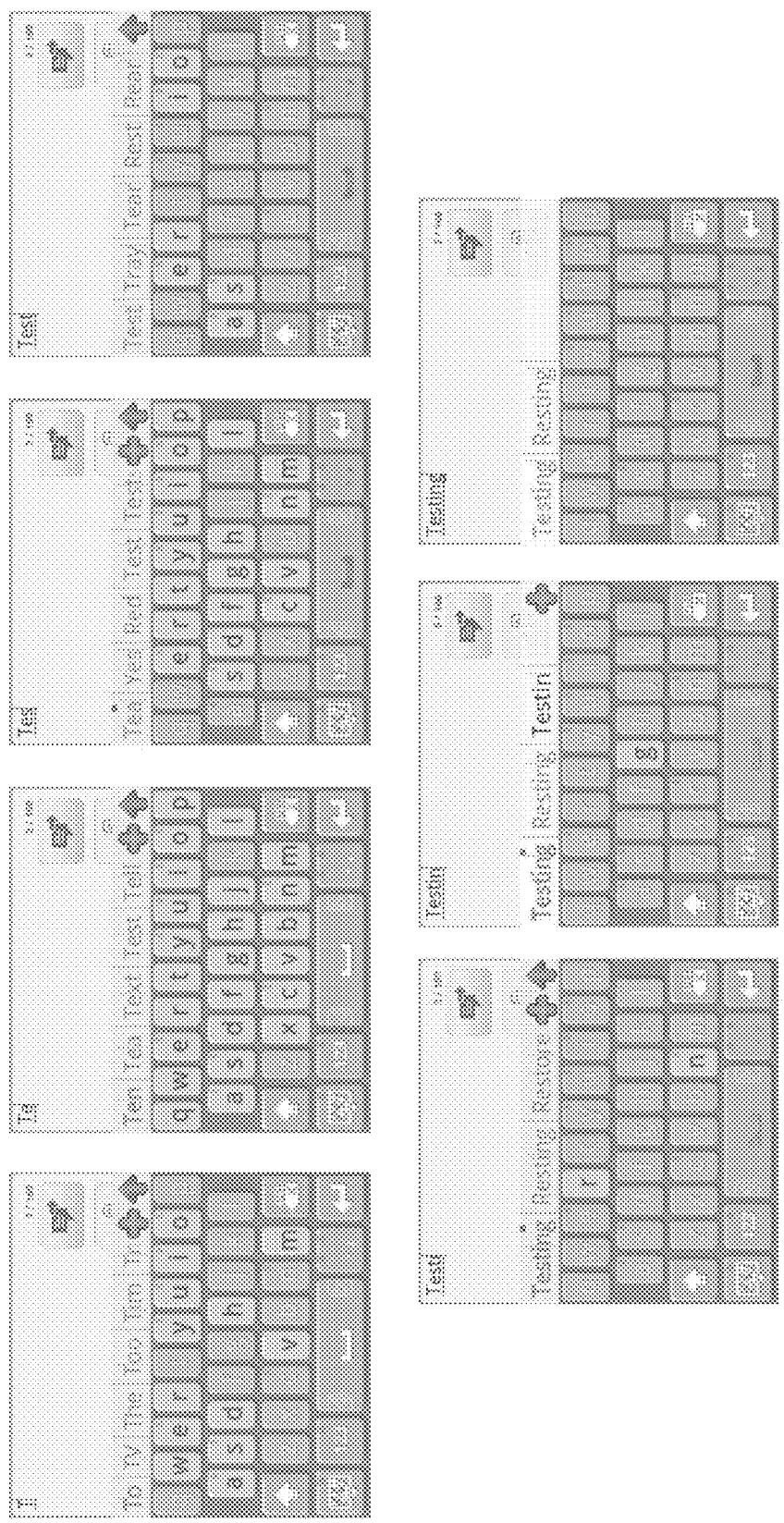
FIG. 19C comprises another series of screenshots illustrating the KeyShading functionality with the PostKeyCorrection functionality.

FIG. 19C illustrates an implementation of the PostKeyCorrection feature where each letter of the ComposingWord is considered a potential mistyped key. Herein, the term MashMode refers to this implementation. As with the previous implementation in FIG. 19B, ValidWords are located based on the proximity of keys for each letter of the word to be assembled. In this example the requirement for accurately typed keys/letters is minimised, and the variation in ValidWords is maximised.

Figure 19D:
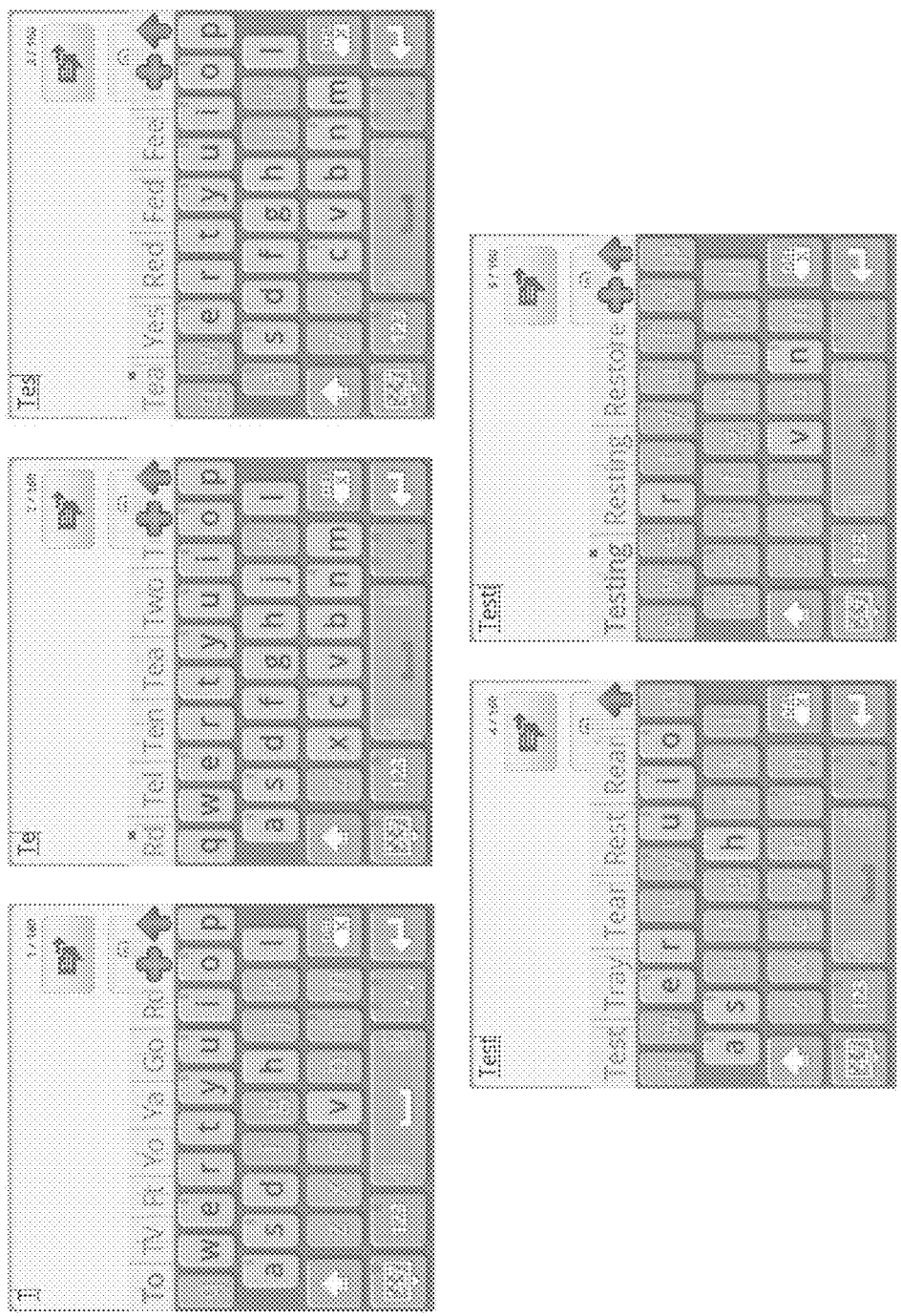
FIG. 19D comprises another series of screenshots illustrating the KeyShading functionality with the PostKeyCorrection functionality.

FIG. 19D illustrates another example where the user has pressed the lower portion of the key "t" key. Based on the location of the "t" key the user pressed and the proximity of the "t" to the "F" and "G" keys, AdditionalValidWords—such as "Ft" and "Go"—are located.

Figure 19E:
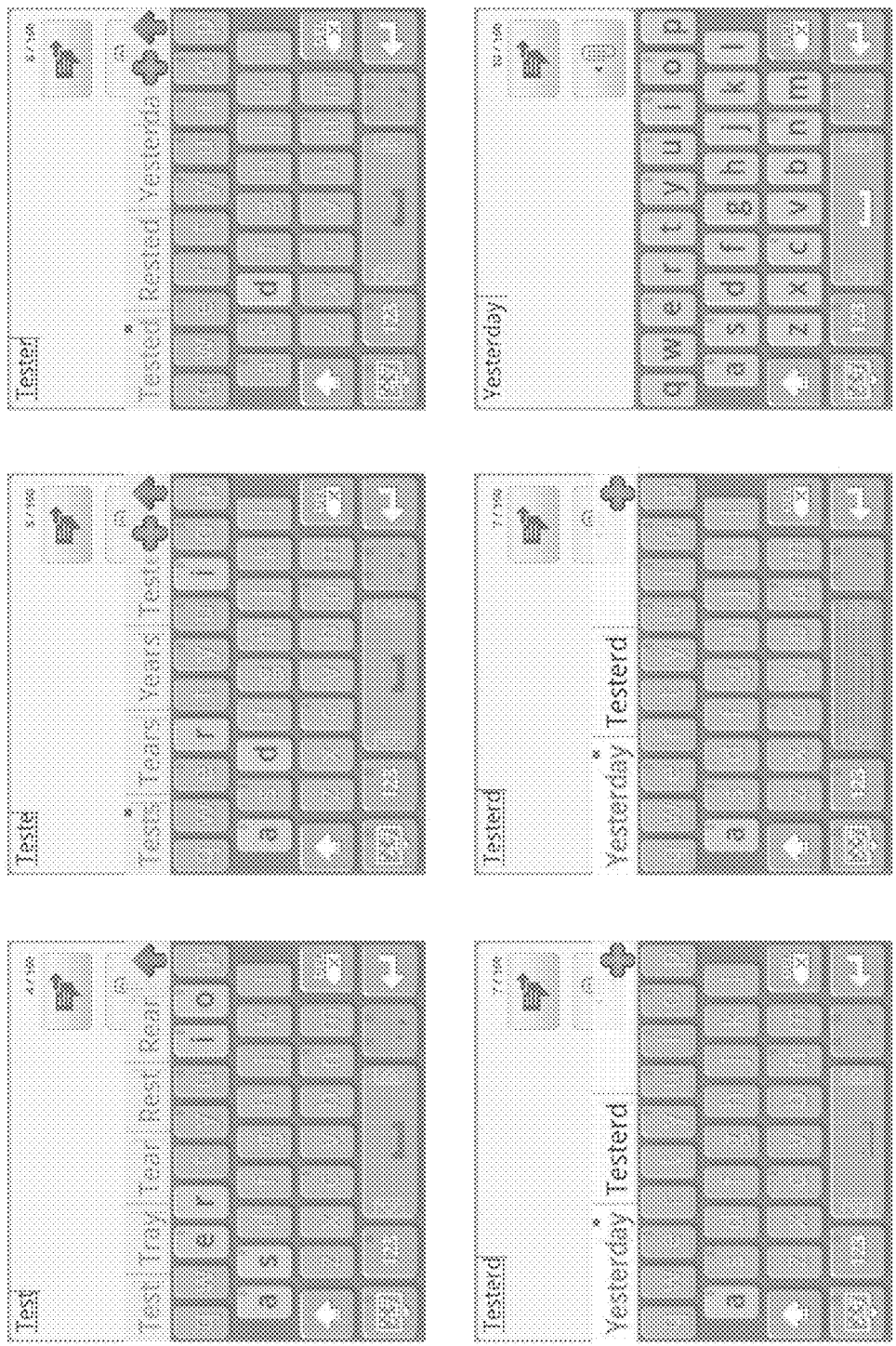
FIG. 19E comprises a further series of screenshots illustrating the KeyShading functionality, the PostKeyCorrection functionality and the ComposingMode functionality.

Referring to FIG. 19E, the input letters return only one ValidWord located via the QuickFix functionality. In this example, the ComposingMode is triggered, and the colour of the ValidWord indicates that the ValidWord may be automatically corrected to correspond to the PrimaryValidWord (that is, an AutoCorrectableWord). Pressing the spacebar, as indicated in the fourth image, automatically corrects the letters displayed in the ComposingWordArea 210 to correspond to the AutoCorrectableWord. In this example, more steps are required to have the desired word presented as the first ValidWord displayed in the ValidWordsPanel 230 of the touchscreen (that is, the PrimaryValidWord). In turn, the requirement for accurately typed keys/letters is minimised, and the variation in ValidWords is maximised.

Figure 19F:
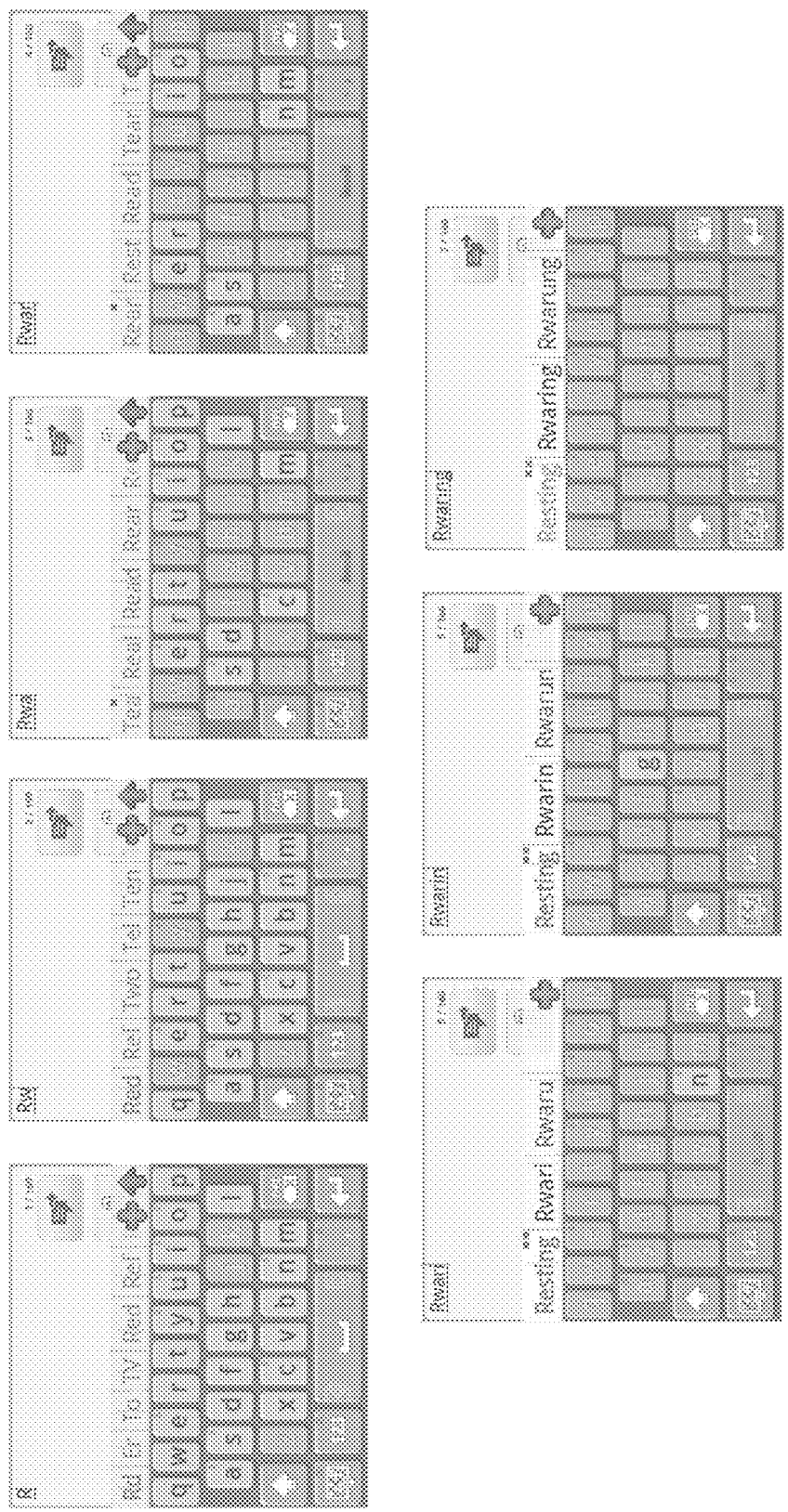
FIG. 19F comprises yet another series of screenshots illustrating the KeyShading functionality and the PostKeyCorrection functionality.

Referring to FIG. 19F, the desired word is "Testing", but every letter of the word is typed inaccurately. This example illustrates the process of locating ValidWords, based on proximity of valid keys/letters. In this example, the letters associated with the keys corresponding to the user inputs received by the smartphone 10 are "Rwarung". However, by considering the proximity of other keys, ValidWords including the desired ValidWord "Testing" are located. In this example, the tolerance is set to approximately 1.8 key widths. The tolerance is set based on the dimensions of the keys of the keyboard, the dimension of a pressing finger, and the dimensions of areas separating the keys of the keyboard. Words previously suggested (for a ComposingWord) may be re-evaluated with a further relaxed tolerance. In turn, words with sufficient popularity have a higher tolerance for key press deviation.

QuickFix and MashMode incur an additional computation cost on the smartphone. Consequentially, it may be beyond the performance envelope of some devices to, in real-time, to implement these functionalities. It is envisaged that these modes can be restricted to the user, to ensure the device remains responsive. For instance, when the user types quickly enough to overwhelm the device, the location of ValidWords and the determination of valid subsequent letters, can be aborted or suspended until the user has paused or slowed typing, allowing sufficient time to locate ValidWords. Where the mode is disabled by the user, the action can still be initiated by user interaction via the "Up Arrow" button 240, as an aspect of the full-screen ValidWordsPanel. The interface is updated as results are found. The user can be notified by System Notifications, containing further details such as percentage complete, and search parameters incorporating Spell Check algorithms. This notification process may be triggered only for very time consuming tasks.

Figure 20A:
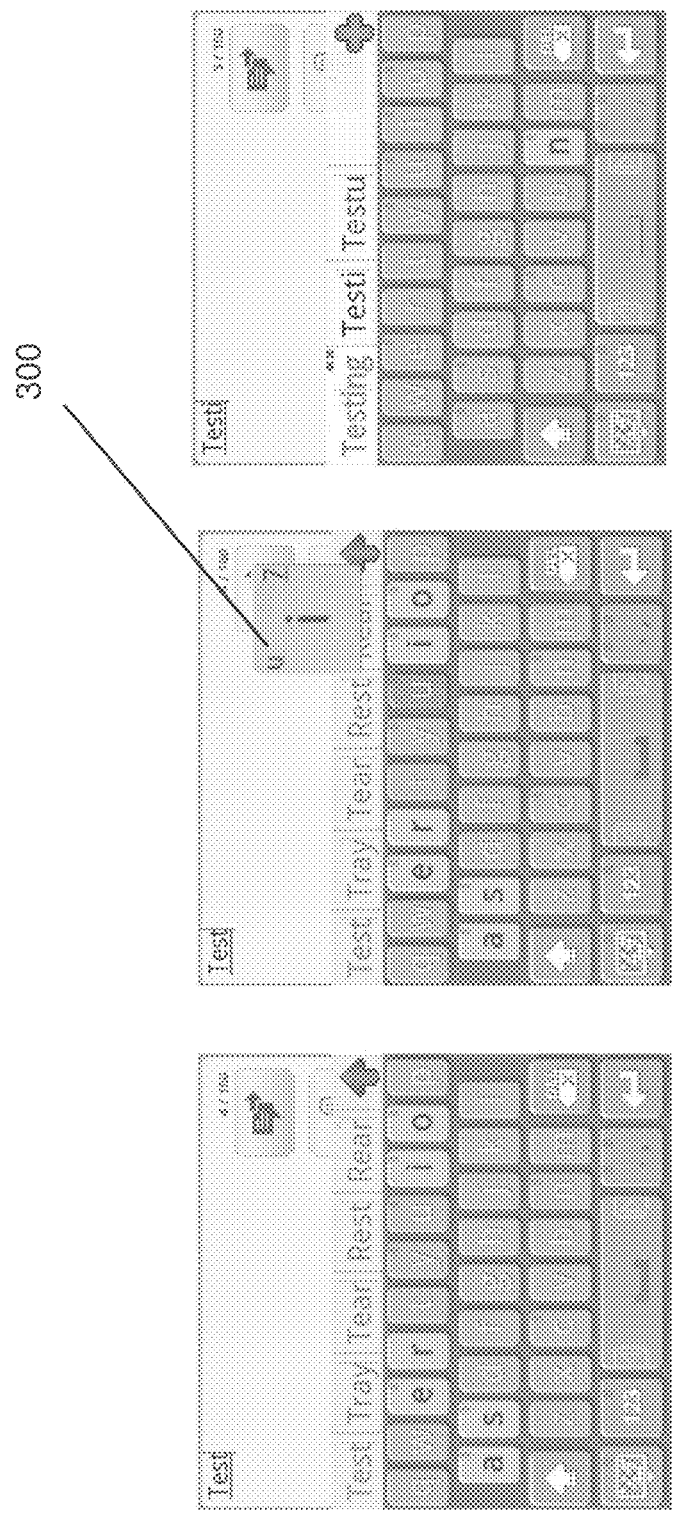
FIG. 20A comprises a series of screenshots illustrating the KeyShading functionality, the PreKeyCorrection functionality, and the KeyPreviewPopup functionality.
Figure 20B:
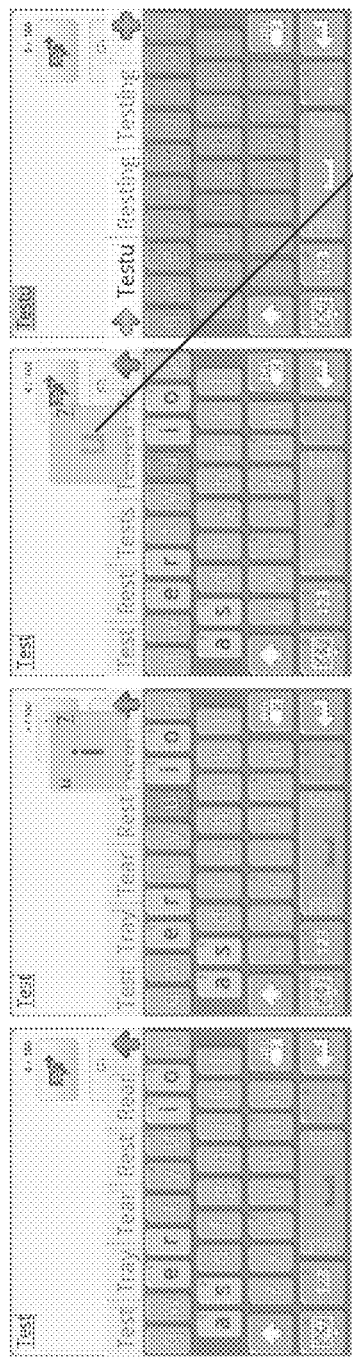
FIG. 20B comprises a series of screenshots illustrating the KeyShading functionality, the PreKeyCorrection functionality, and the PostKeyCorrection functionality.

FIGS. 20A and 20B comprise a series of screenshots illustrating the PreKeyCorrection functionality. Like the other figures, the screenshots also illustrate aspects of some of the other functionalities. Referring to FIG. 20A, a valid subsequent letter is displayed in a pop up preview when a user touches the touchscreen 20 at a position corresponding to a key associated with a letter that is not a valid subsequent letter (that is, an InvalidLetterKey) if the key associated with the valid subsequent letter is within a specified proximity of the key corresponding to the position at which the user touches. This provides the user an opportunity to substitute a mistyped key for the correct key. In this example, the threshold for determining a substitute for a mistype key is derived based on the dimensions of the keyboard, keys of the keyboard, the dimension of a pressing finger, the dimensions of areas separating the keys of the keyboard and the expectation of single dual thumb or all finger usage, accordingly. However, the following factors can additionally or alternatively be taken in account:

Whether the key is associated with a valid subsequent letter determined from a ValidWord located based on all of the letters associated with the keys corresponding to user inputs, or if the key is associated with a valid subsequent letter determined from a ValidWord located based on only some of the letters associated with the keys corresponding to user inputs.

The general popularity of the ValidWord from which the key is determined (that is, it can be dependent on how common the ValidWord is).

A valid key can also be substituted for a letter determined from a ValidWord with greater popularity, where the inaccuracy of the initial valid key is outweighed by the popularity and proximity of the more popular valid word. For example, pressing near the edge of a valid key, where an adjacent key has a sufficiently greater popularity and weighting.

The process of previewing and selecting a valid subsequent letters that is displayed closest to the key corresponding to the input letter (that is, the ClosestValidLetterKey) can be overridden by holding an InvalidLetterKey. The pop up preview of the ClosestValidLetterKey is then replaced with the, now selectable, invalid letter. This allows the user to type words that are not in the dictionary.

When the user releases the key, the previously un-selectable invalid letter is added to the word currently being composed. In this example, the keyboard also subsequently enters a mode where all keys are valid. Herein, the term FreeType refers to this mode. In this example, FreeType mode is indicated by the darkest grey background and the green letter of the keys. FreeType mode allows for any word to be entered (and disables the KeyShading functionality).

Referring to FIG. 20A, the letters added or assembled so far are displayed in the ValidWordsPanel 230 in black. The user may add the word to the word database by pressing the contextual "Add" button (a dialog box will display to the user to select one of the words in the ValidWordsPanel 230 if the user presses the "Add" button) or holding either invalid words displayed on the ValidWordsPanel 230. If a word previously not found in the word database is assembled more than a predefined amount, the word is automatically added to the word database, with preference to an invalid word chosen from the ValidWordsPanel 230.

The screenshots of FIG. 20A illustrate the process of overriding InvalidLetterKey presses and substituting the ClosestValidLetterKey. Specifically, upon the user pressing the InvalidLetterKey "u", and the key/letter "i" is determined as the ClosestValidLetterKey and is displayed in the pop up preview instead of key/letter "u". When the user release the key/letter "u", the "i" letter is committed.

Note that in the pop up preview, the red letter 300 indicates that the preview is a preview of a ClosestValidLetterKey rather than the key actually pressed by the user.

FIG. 20B comprises a series of screenshots where the user holds the invalid "u" key. As illustrated, the pop up preview changes from the ClosestValidLetterKey "i" to the InvalidLetterKey "u" when the user holds the invalid "u" key. When the user releases the key, the "u" letter is committed, and the FreeType mode is triggered. Also, the letter displayed in the pop up preview is coloured green to indicate that FreeType mode may be triggered upon the user committing the InvalidLetterKey.

In FIG. 20B, some of the keys are associated with letters that are accessible via an indicator tab which indicates to the user that a popup-mini-keyboard may be accessed by holding the key. Also, double-pressing some keys in quick succession (that is, a double press action) may invoke the display of the letters that are accessible via the indicator tab. For example, with respect to the punctuation key, a single press of the key results in a full-stop, but a double press results in a comer.

Figure 21A:
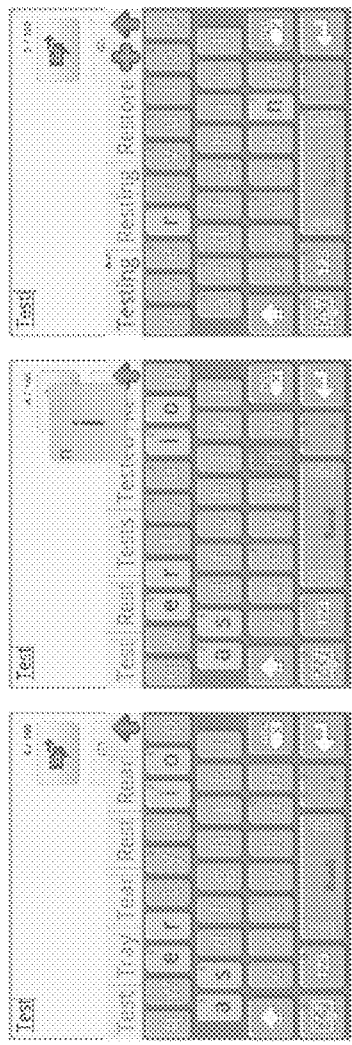
FIGS. 21A to 21C each comprises a series of screenshots illustrating the KeyShading functionality, the PreKeyCorrection functionality, and the PostKeyCorrection functionality.
Figure 21B:
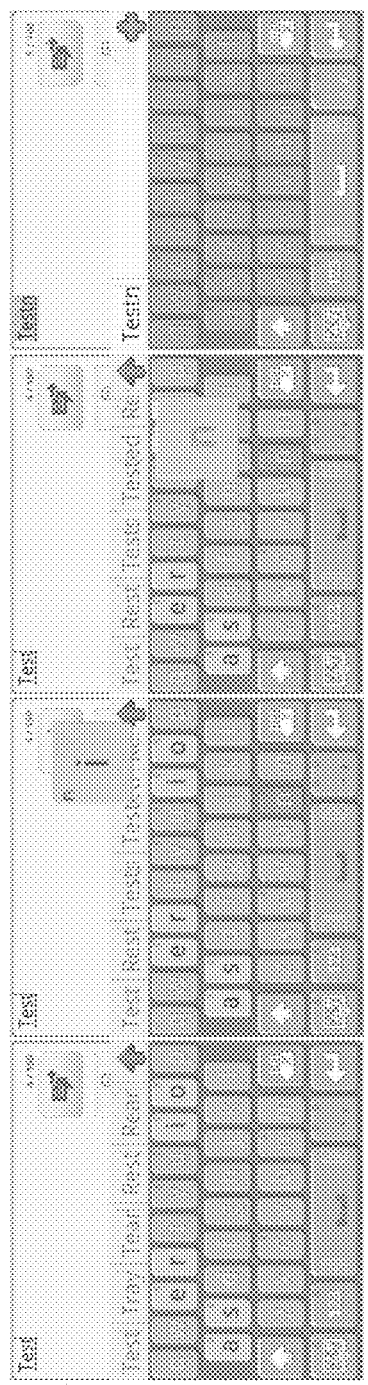
Figure 21C:
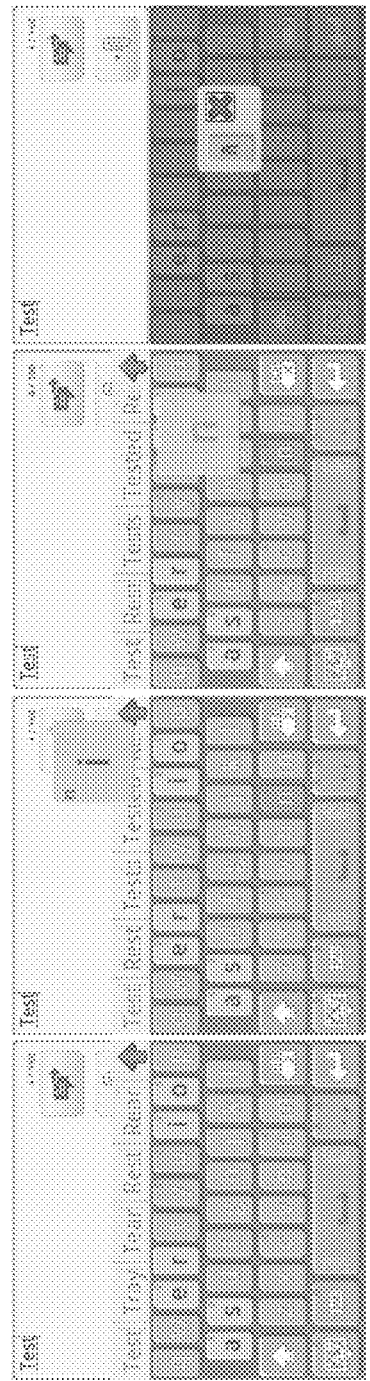

FIGS. 21A to 21C comprises a further series of screenshots illustrating the PreKeyCorrection functionality. FIG. 21A illustrates the case when a user press and release an InvalidLetterKey. FIG. 21B illustrates the case when a user press and holds an InvalidLetterKey. FIG. 21C illustrates the case when a user press and holds the InvalidLetterKey displaying the popupKeyboard indicator tab 250 for a longer period of time.

FIGS. 22A to 22I illustrate the ContextualKey functionality by having the user press, hold, or long hold the spacebar. Note that the KeyPreviewPopup functionality is disabled in some of the screen shots.

FIG. 22A illustrates the case when the ComposingWord is a PreValidWord. As illustrated, the PrimaryValidWord is coloured in green, and pressing the spacebar commits the letters of the ComposingWord assembled by the user.

FIG. 22B illustrates the case when the ComposingWord is a AutoCorrectableWord. As illustrated, the PrimaryValidWord is coloured in blue, and pressing the spacebar commits the letters of the ComposingWord assembled by the user.

FIG. 22C also illustrates the case when the ComposingWord is a AutoCorrectableWord. As illustrated, pressing the spacebar corrects the letters of the ComposingWord assembled by the user if there are any capitalization inconsistencies.

FIG. 22D illustrates the case when the ComposingWord is a AutoCompletableWord. As illustrated, the PrimaryValidWord is coloured in orange, and pressing the spacebar automatically completes the ComposingWord to the PrimaryValidWord.

Figure 22E:
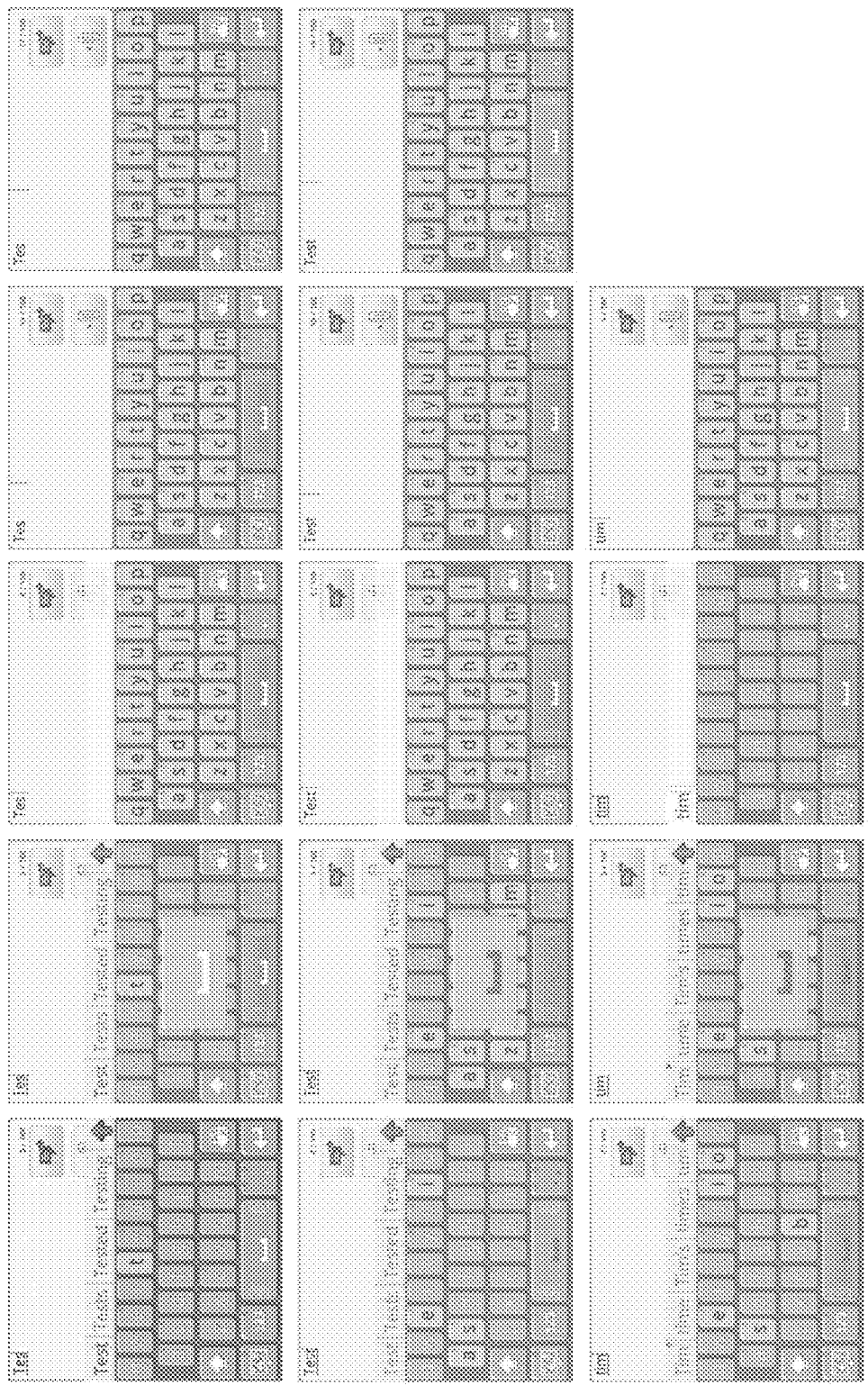

FIG. 22E illustrates the case when the user holds the spacebar. In the first row of screenshots, when the ComposingWord is a PreValidWord, holding the spacebar rapidly inserts spaces (referred to as the RapidSpace action). In the second row of screenshots, when the ComposingWord is a AutoCorrectableWord, holding the spacebar also triggers the RapidSpace action. Note that the RapidSpace action is triggered after the ComposingWord is committed. In another words, the RapidSpace action is expressed when the current ComposingWord has zero letters, that is, after a word has been committed. In this example, the ComposingWord is a AutoCorrectableWord but there are no letters to be corrected. The third row of screenshots illustrates the case when the ComposingWord is a AutoCorrectableWord (in this instance an automatic Capitalisation from "tim" to "Tim") and there is a letter correction. In this example, holding the spacebar will trigger the RetainUncorrection action, replacing the suggested words in the ValidWordsPanel 230 with the ComposingWord (referred to as a UnCorrected-ComposingWord), rather than the RapidSpace action. This alternate action is indicated to the user by displaying "tim" in black in the second last screenshot, and the tab indicator above the PrimaryValidWord ("Tim") in the ValidWordsPanel 230.

Figure 22F:
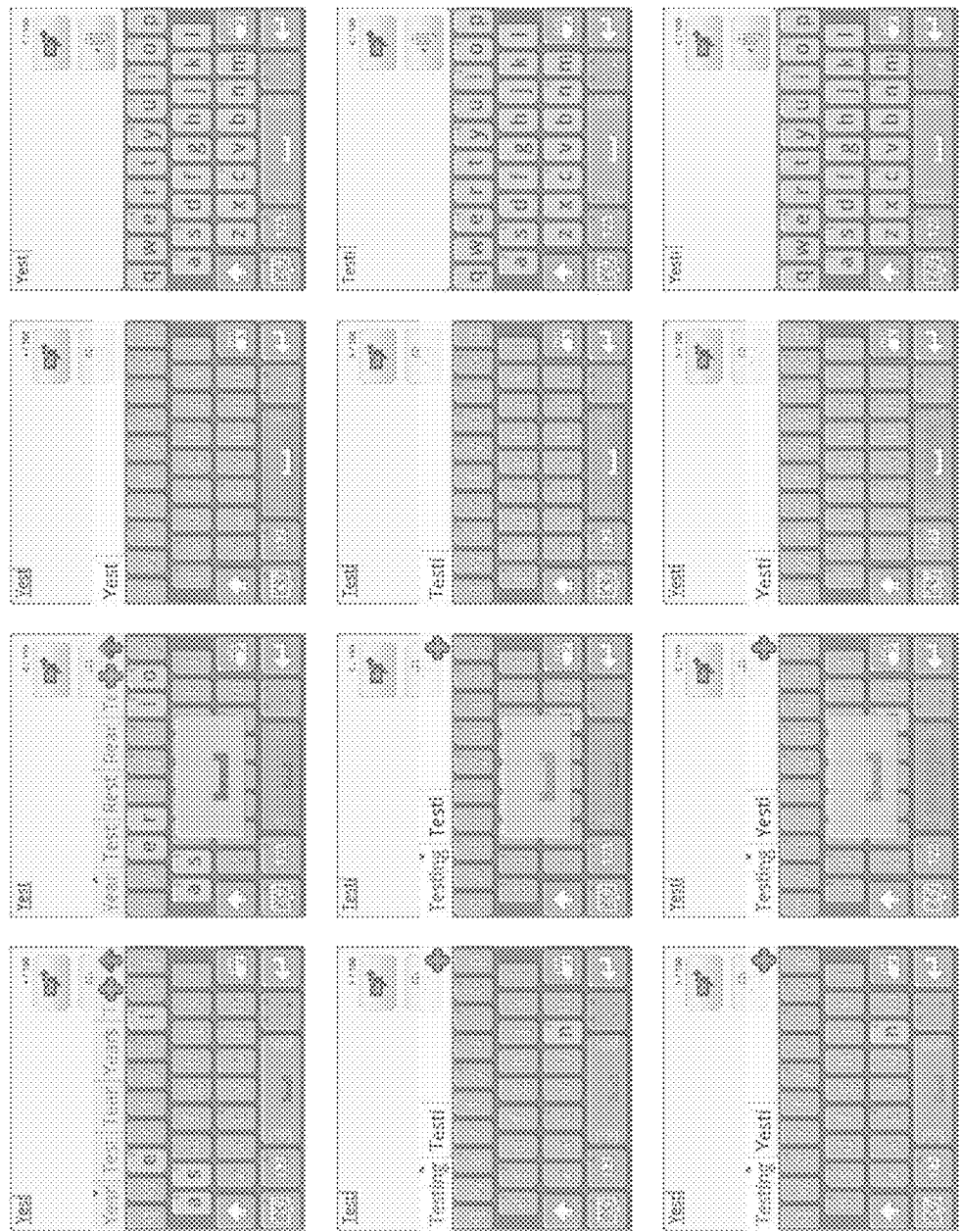

FIG. 22F continues to illustrates the case when the user holds the spacebar. The first row of screenshots illustrates the case when the ComposingWord is a AutoCorrectableWord (which is derived from a QuickFix or MashMode permutation) and there is a letter correction or corrections, holding the spacebar will trigger the alternative RetainUncorrection action, replacing the PrimaryValidWord with the letters assembled. This alternate action is indicated to the user by displaying "Yest" in black, and the tab indicator above the PrimaryValidWord ("Yest") in the ValidWordsPanel 230.

The second and third rows of screenshots illustrate the case when the ComposingWord is a AutoCompletableWord. The screenshots illustrate an alternative action for the spacebar. When the ComposingWord is a AutoCompletableWord, holding the spacebar triggers an action where the letters assembled are committed, overriding the default key press-release action. This allows the user to insert new and unrecognised words, and avoid the ContextualKey functionality to automatically complete the ComposingWord. As illustrated in the second row of the figure, the unknown word of "testi" is committed, where the usual press-release action of the spacebar would insert the whole word "testing".

The third row illustrates the same user action in the case when the ComposingWord is both a AutoCompletableWord and a AutoCorrectable word. As illustrated in the figure, the unknown word of "Yesti" is committed, where the usual press-release action of the spacebar would insert and auto-correct the whole word "testing". The word "Yesti" is displayed in black in the ValidWordsPanel 230.

Figure 22G:

FIG. 22G continues to illustrates the case when the user holds the spacebar. The first row of screenshots illustrate the case when the ComposingWord is a AutoCompletableWord and is comprised of letter or letters derived from PreKeyCorrections. As illustrated the in the figure, the unknown word of "testu" is committed, where the letter "u" is corrected to the letter "i", where the letters assembled are "testi". As illustrated, "testi" is displayed in black and a tab indicator is displayed above it in the ValidWordsPanel 230. Holding the spacebar triggers an alternate action where the letters-assembled are committed, overriding the default key press-release action. The second row illustrates the same user action in the case when the ComposingWord is a AutoCorrectableWord (comprising corrections derived from PreKeyCorrections), holding the spacebar will trigger the alternative RetainUncorrection action, replacing the PrimaryValidWord with the ComposingWord. The third row illustrates the same user action in the case when the ComposingWord is a AutoCorrectableWord (comprising corrections derived both from PreKeyCorrections and QuickFix or MashMode permutation). As illustrated, "yesting" is committed (where the usual press-release action of the spacebar would insert the whole word "testing").

Figure 22H:

FIG. 22H comprises further screenshots illustrating the case when the user continues to hold the spacebar (the long hold action) and ComposingWord is a AutoCorrectableWord comprising corrections derived from both PreKeyCorrections and PostKeyCorrection. As displayed in the ValidWordsPanel 230, "Yesting" and the first tab indicator displayed above the PrimarySugestion 231 indicate to the user the availability of the alternate hold spacebar action illustrated in the previous figures. Also note the display of "Yestinf" and the second tab indicator above the PrimaryValidWord. Where both actions are available to the user, the alternative action for the spacebar hold is extended to trigger an additional long-hold action where the ComposingWord is committed, overriding the default and hold-key action. This allows the user to insert new and unrecognised words, and avoid the ContextualKey functionality to automatically complete the ComposingWord and the PreKeyCorrection operating on the ComposingWord when adding unrecognised words. As illustrated in the figure, the unknown word "yestinf" is committed by the long-hold action, where the usual press-release action of the spacebar would insert the whole word "testing", and the and press-hold-release would insert the whole word "yesting".

Figure 22I:
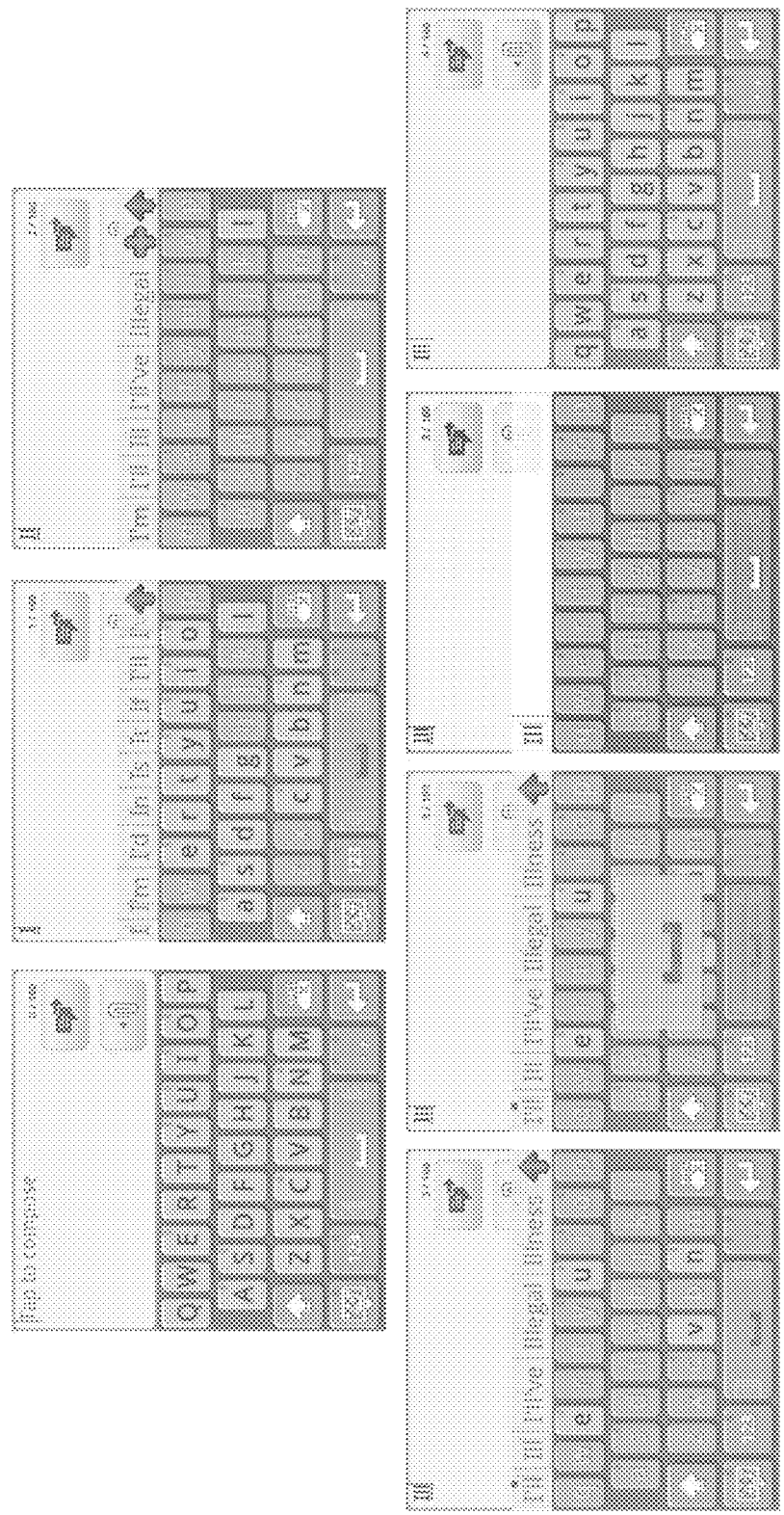

FIG. 22I illustrates a special case of the hold spacebar functionality where the user has typed a word that is valid, but another word with higher priority is displayed as the PrimaryValidWord. As illustrated in the figure, the word "I'll" is the PrimaryValidWord. Holding the spacebar will trigger the action where the assembled letters is the PrimaryValidWord, but the word "ill" is committed when the spacebar is released, where the usual press-release action of the spacebar would insert the whole word "I'll".

Figure 23C:
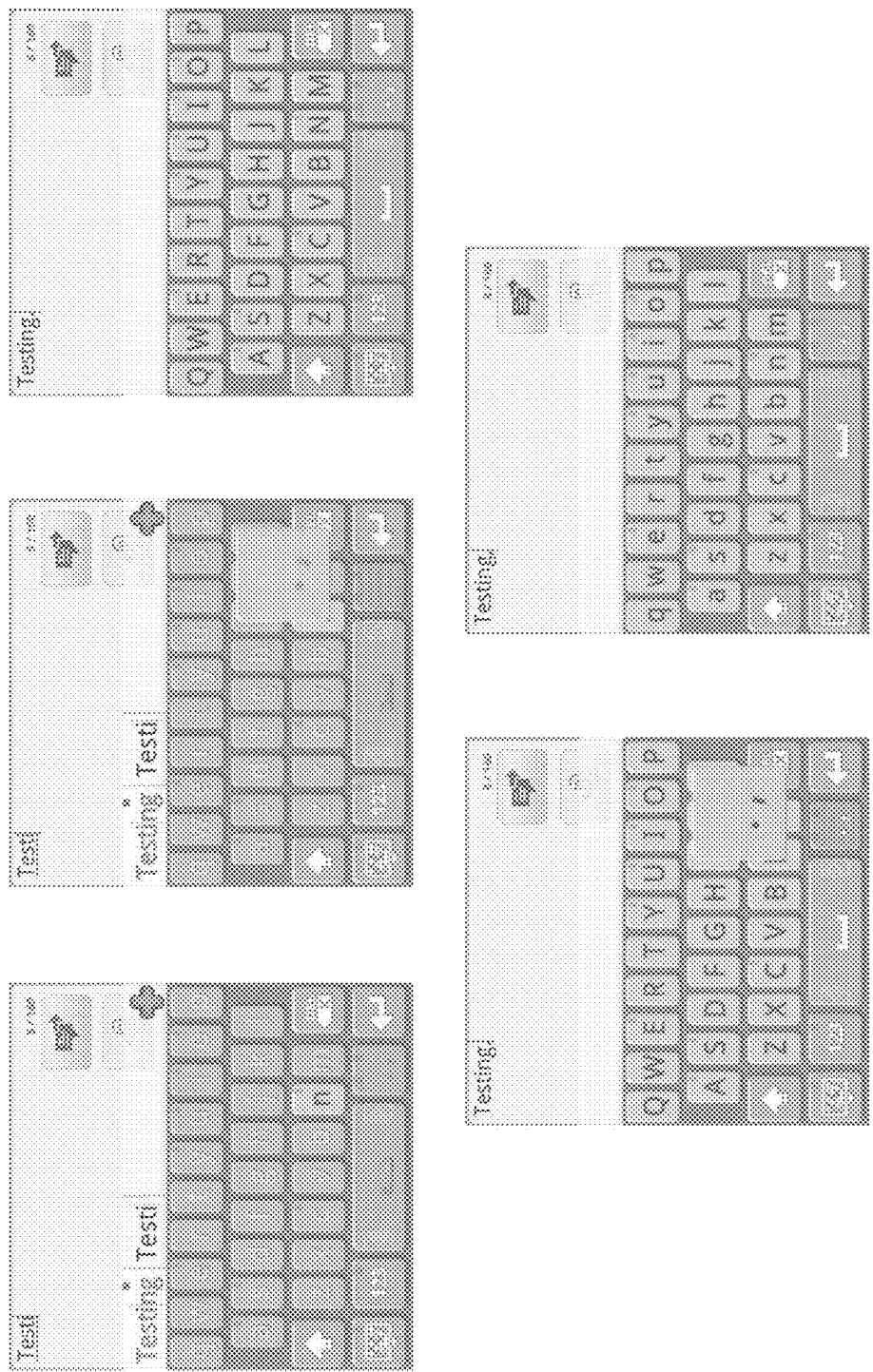

FIGS. 23A to 23C illustrate the effect of pressing, holding, or double pressing a punctuation mark key. Note that in some of the screen shots, the KeyPreviewPopup functionality is disabled to simplify the diagrams.

FIG. 23A illustrates the case when the ComposingWord is a AutoCompletableWord. As illustrated, the user has the option of pressing spacebar or the punctuation key to automatically complete the ComposingWord to the PrimaryValidWord. Although not illustrated, note that selecting a sentence terminating punctuation mark (such as the full-stop) will indicate a space is required after the full-stop. This action will be triggered when the next key is struck. Also, the figure illustrates that inputting the sentence terminating punctuation mark will trigger the keyboard to display change the keys of the keyboard from being lower-case letter keys to upper-case or capital letter keys. In this respect, it is envisaged that the smartphone 10 can be configured not to change the keys from lower-case to upper-case when the committed valid word contains the full-stop character (for example, with respect to the word "Dr.").

FIG. 23B illustrates the case when the user holds the punctuation key. As illustrated, this triggers the smartphone to display a popup-mini-keyboard.

FIG. 23C illustrates the case when the user double-presses the punctuation key. As illustrated, this triggers the smartphone to substitute the full-stop with a corner.

FIGS. 24A and 24B comprise screenshots illustrating that a user can, at any point, select a ValidWord from the ValidWordsPanel 230 to automatically correct the ComposingWord if the ComposingWord is a AutoCorrectableWord, or to complete, or correct and complete the ComposingWord if the ComposingWord is a AutoCompletableWord. The action of pressing the word results in the pressed-word being committed as the typed word. That is, the typed letter replaces the word selected, and commits any alterations to the remaining letters. A space is inserted after the word. Also, the smartphone 10 substitutes the space after "Testing" with a punctuation mark upon receiving a user input corresponding to the punctuation mark.

FIG. 24B illustrates the EditingWords functionality where the cursor has been moved by the user to a position that is considered to be, within the boundaries of a whole word. As illustrated, the letters "ng" in the ComposingWord after the cursor (that is, the WordTail) are replaced with "ny" upon a user selecting a ValidWord from the ValidWordsPanel 230. Pressing delete after this action will restore the original word, and cursor position.

Figure 25:
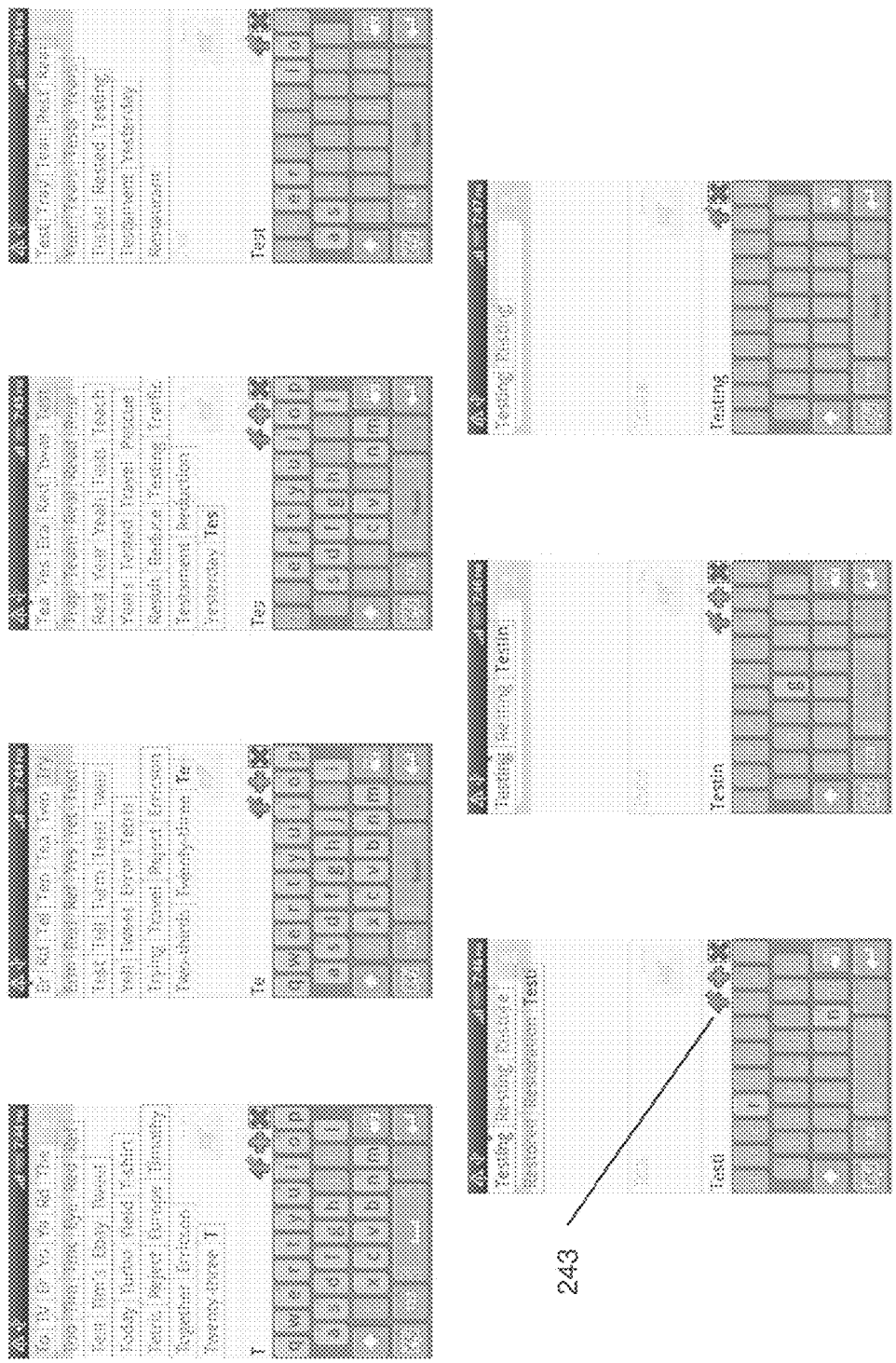
FIG. 25 illustrates an alternative full-screen mode of the ValidWordsPanel.

FIG. 25 illustrates an alternative full-screen mode of the ValidWordsPanel 230. This full-screen mode is triggered by the "Up Arrow" button displayed on the right edge of the compact ValidWordsPanel. This "Up Arrow" button is displayed when the width of the words contained in the ValidWordsPanel is greater than the width available on screen. Pressing the "Up Arrow" button results in the ValidWordsPanel toggling to full-screen mode, where the ValidWordsPanel expands to the remaining screen area not taken up by the keyboard. This enables the touchscreen 20 to increase the amount of ValidWords that can be displayed. This also provides a greater variety of word with regards to correction tolerance. Also, spellchecking can be triggered by pressing the "More Plus" button 243 when in full-screen mode. The "More Plus" button 243 is displayed when the users pauses while composing a word. It is envisaged that when part of speech (POS) filtering (that is, the ComputationLinguistics functionality) is in effect, suggested words may be grouped on tabs for each POS (this may include an "all" tab).

FIGS. 26A to 26C comprises series of screenshots illustrating the EditingWords functionality.

FIG. 26A illustrates the case when the ComposingWord is a PreValidWord. As illustrated, pressing the spacebar inserts a space between the WordStem and the WordTail.

FIG. 26B illustrates the case when the ComposingWord is a AutoCorrectableWord. As illustrated, pressing the spacebar removes the WordTail. Note that this action of removing the WordTail is indicated to the user by underlining the words in the ValidWordsPanel 230 and the grey shading of the WordStem in the ComposingWordArea 210.

FIG. 26C illustrates the case when the ComposingWord is a AutoCompletableWord. As illustrated, pressing the spacebar removes the WordTail and inserts the PrimaryValidWord. In this case, the resulting word is the same.

Figure 26D:
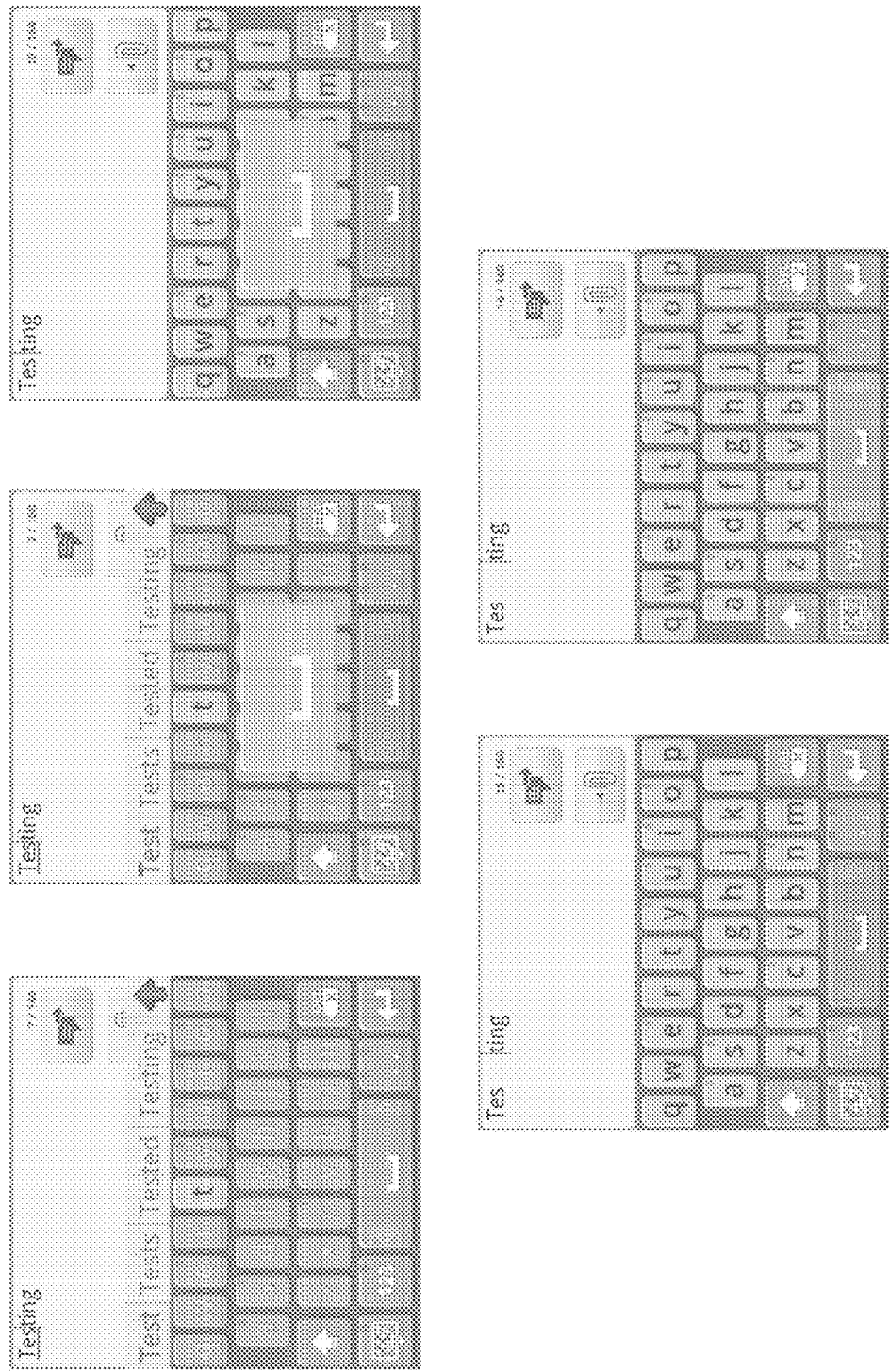

FIG. 26D illustrate the case when the ComposingWord is a PreValidWord. As illustrated, holding the spacebar rapidly inserts spaces between the WordStem and the WordTail until the user releases the key.

FIG. 26E illustrates when the ComposingWord is a AutoCompletableWord. As illustrated, holding the spacebar inserts a space but, in contrast to FIG. 26B, does not remove the WordTail.

FIG. 26F illustrates the case when the ComposingWord is a AutoCompletableWord. As illustrated, holding the spacebar commits the letters assembled so far by the user, overriding the ContextualKey functionality to automatically complete the ComposingWord. In addition, it removes the WordTail. This is indicated to the user by replacing the words in the ValidWordsPanel with an underlined black-coloured version of the letters assembled so far, and continuing to shade (in grey) the WordStem portion of the ComposingWord.

FIG. 26G illustrate the case when the ComposingWord is a AutoCompletableWord. As illustrated, long holding the spacebar removes the underline from the words in the ValidWordsPanel 230 and the grey shading of the WordStem portion of the ComposingWord. This result in the same expected action of inserting the letters assembled so far by the user while retaining the WordTail. Note that FIGS. 26E and 26G both underline the words in the ValidWordsPanel 230 and the grey shading of the WordStem portion of the ComposingWord to indicate the removal, or retention of WordTails.

Figure 27:
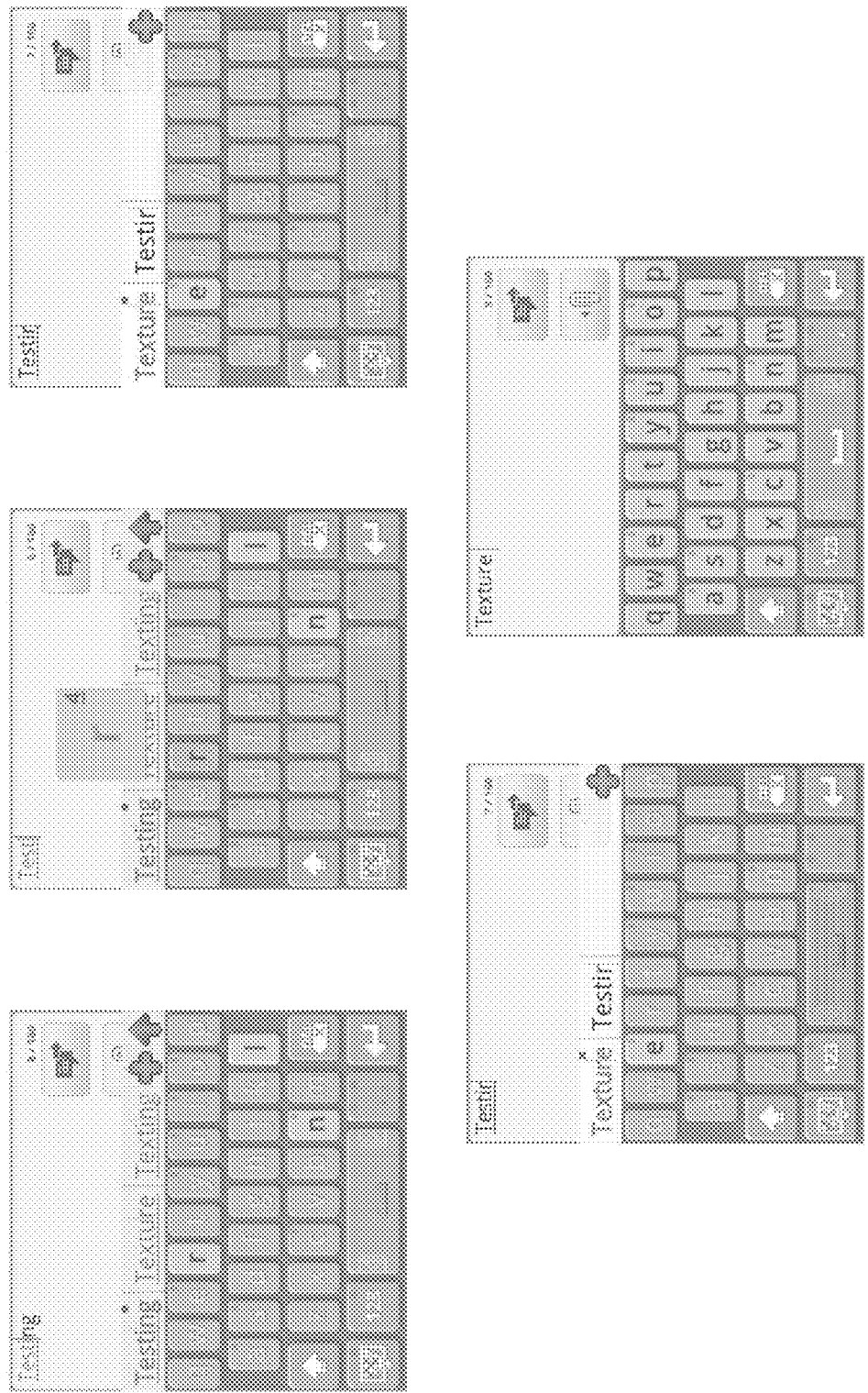
FIG. 27 comprises a series of screenshots illustrating the EditingWords functionality.

FIG. 27 comprises a further series of screenshots illustrating the Editing Words functionality. As illustrated, when editing a word with a WordTail, selecting a letter key removes the WordTail, at the point of the cursor, and insert the desired letter.

As illustrated in the first row of the screenshots, pressing the "y" key removes the WordTail "g"; releasing inserts the letter "y". As illustrated in the second row of the screenshots, there is only one ValidWord—"Texture"—pressing the spacebar corrects "Testir" to "Texture".

Figure 28A:
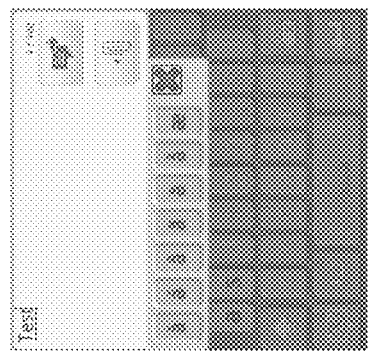
FIGS. 28A and 28B each comprises a series of screenshots illustrating the KeyPreviewPopup functionality.
Figure 28A:
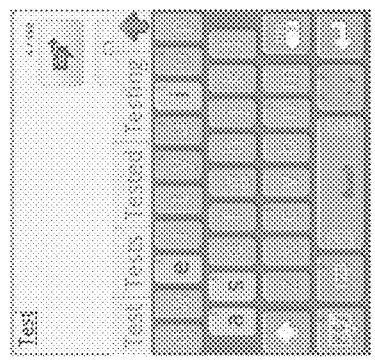
Figure 28B:
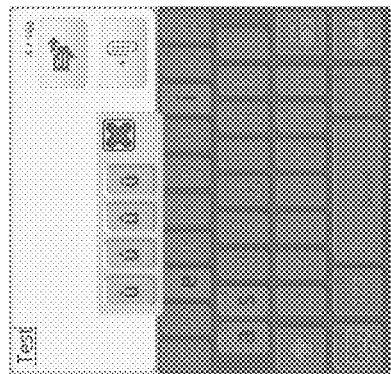
Figure 28B:
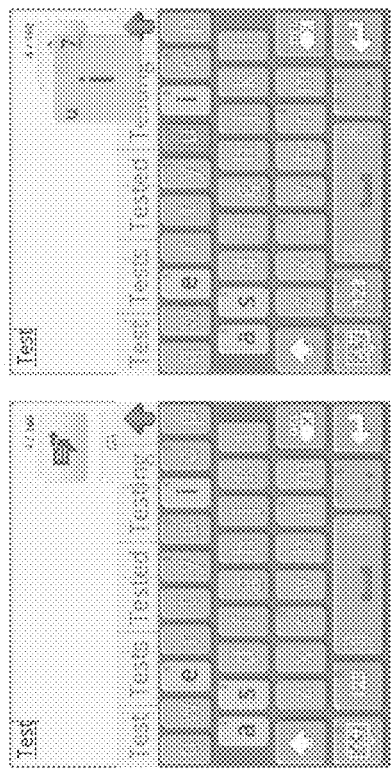

FIGS. 28A and 28B illustrate that holding a valid key with an indicator tab 250 displayed at the top-right edge of the key results in a popup-mini-keyboard being displayed, and holding an InvalidLetterKey with an indicator tab results in overriding the PostKeyCorrection functionality. As illustrated, holding the InvalidLetterKey triggers a popup-mini-keyboard to be displayed.

Figure 29:
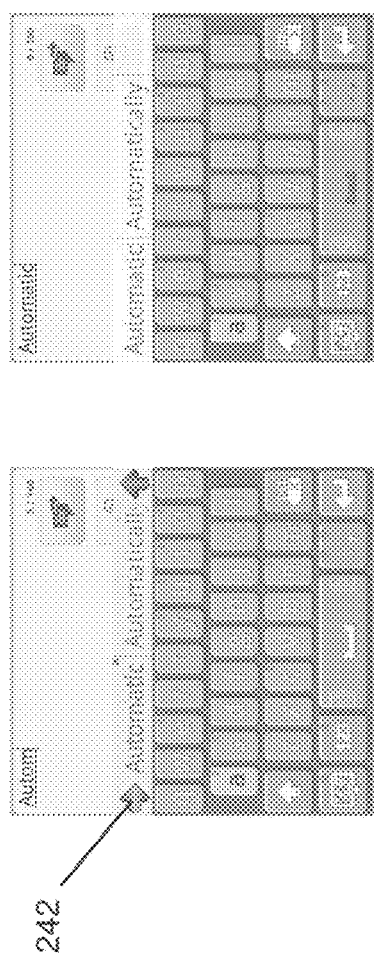
FIG. 29 comprises a series of screenshots illustrating the AutomaticSystems functionality.

FIG. 29 comprises a series of screenshots illustrating the PointofDeviation functionality. In the figure, the "Auto-Fill" Button 242 appears on the left edge of the ValidWordsPanel 230. It is displayed contextually, to inform that user that all of the ValidWords share more than one common letter beyond the point of the cursor, (that is, the WordStem). In this example, both words, "Automatic" and "Automatically", share the common letters "atic". When the user presses the "Auto-Fill" button, the common letters are inserted.

FIGS. 30A to 30G illustrate the AutomaticSystems functionality.

Figure 30A:
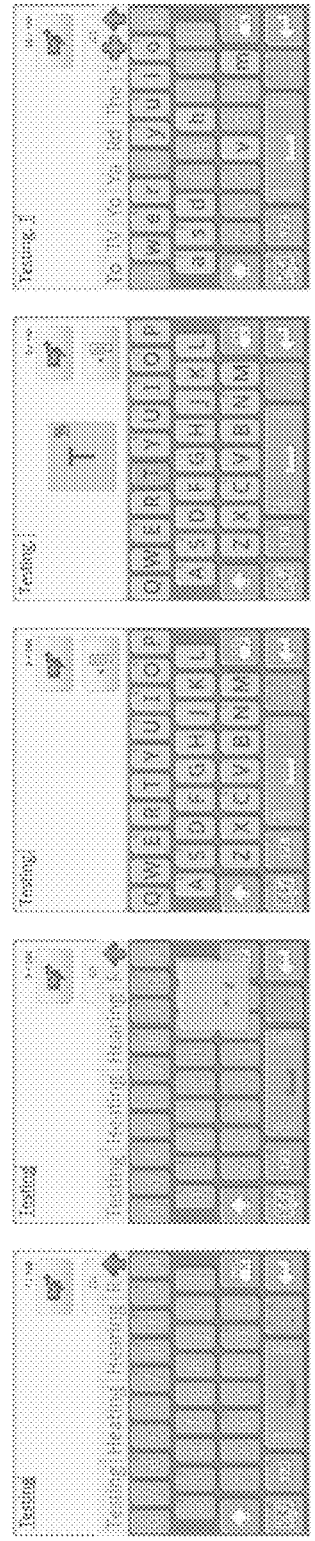

FIG. 30A illustrates that after the user has entered a punctuation mark that requires a space to precede it, a space is automatically inserted before the next letter.

Figure 30B:
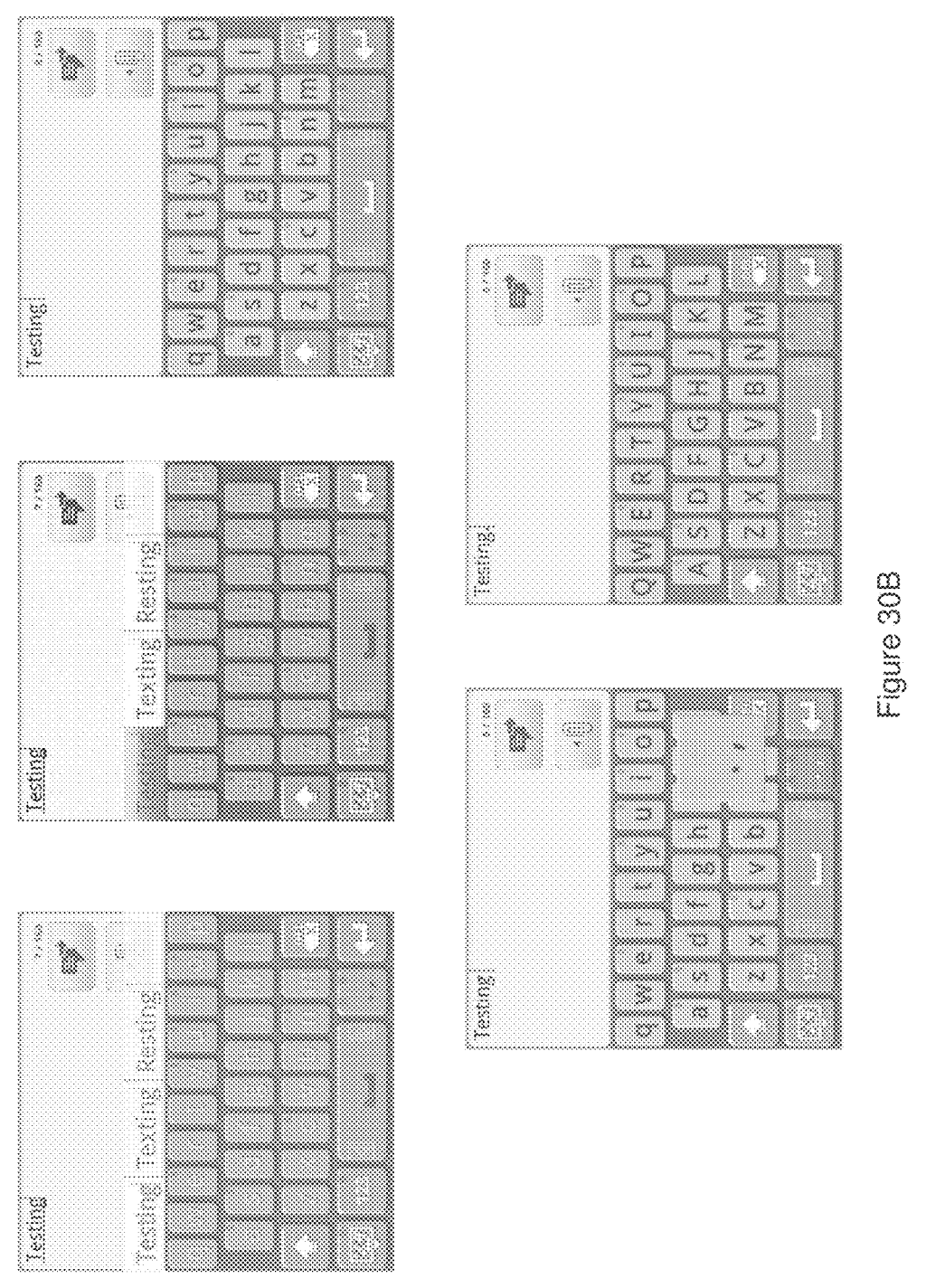

FIG. 30B illustrates that an automatically inserted space is removed after the user selects a word from the ValidWordsPanel and commits a punctuation mark.

Figure 30C:
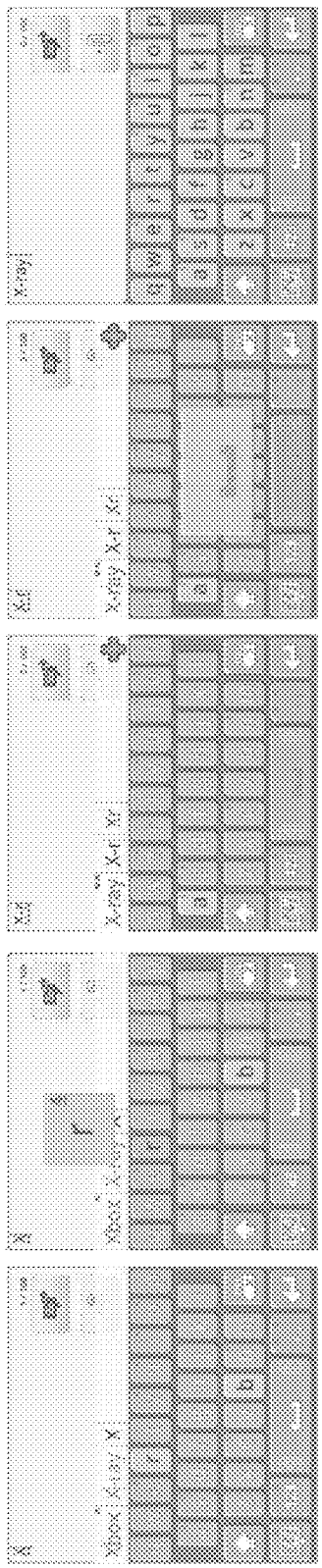
Figure 30D:
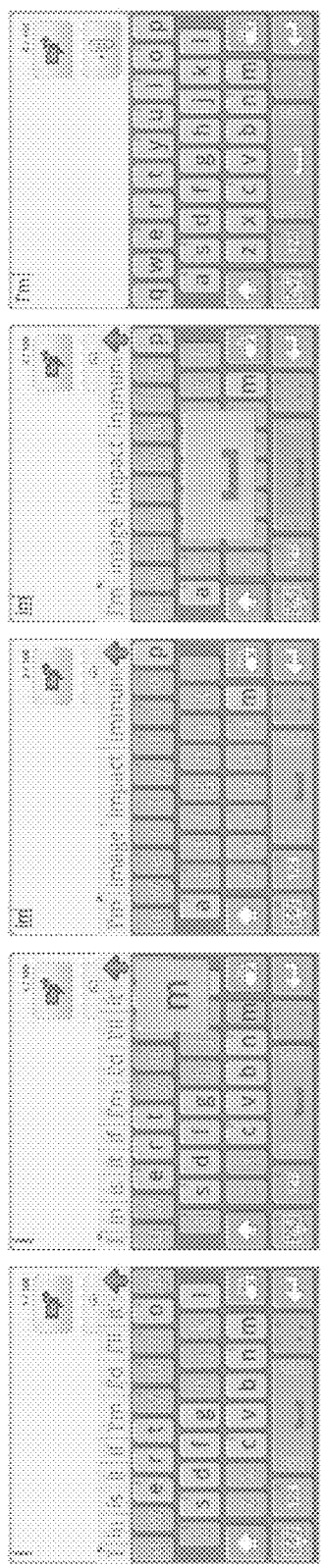

FIGS. 30C and 30D illustrate that when a non-letter character is the next character to be typed in one of the ValidWords, the letter after the non-letter character is substituted for its preceding (non-letter) character. This occurs where there are no other ValidWords with the same letter as the substituted character.

In FIG. 30C, the "r" key is displayed as valid. As illustrated, pressing the "r" key results in the non-letter character being inserted before the letter "r", resulting in a letter and a non-letter character being inserted in one key press.

FIG. 30D illustrates that a non-letter character can be substituted for the next letter. As illustrated, pressing the "m" key results in the letters "'m" being inserted. The examples in FIGS. 30C and 30D differ in that the latter has a valid permutation of the word where adding the punctuation immediately (to the assembled letters) would conflict with another valid permutation of the word (that is, "im" could also be "image" in FIG. 30D but the only ValidWord for "xr" in FIG. 30C is "x-ray").

Figure 30E:
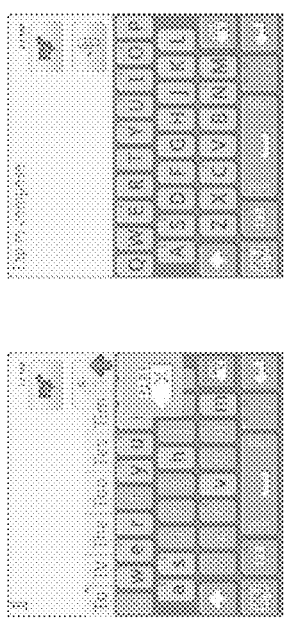

FIG. 30E illustrates that when the user deletes the first letter of a word that is capitalised, the keyboard displays the "capitalised" versions of the keys. This action will not be triggered if the user immediately repeats the add-letter, delete sequence of action.

Figure 30F:
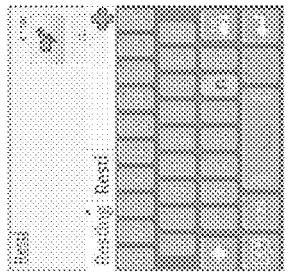
Figure 30F:
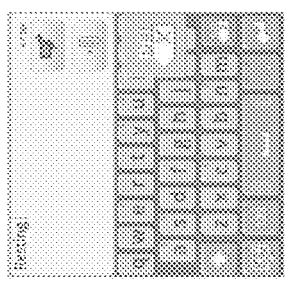
Figure 30F:
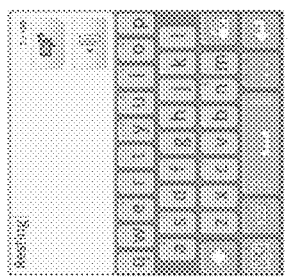
Figure 30G:
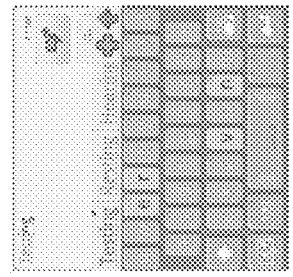
Figure 30G:
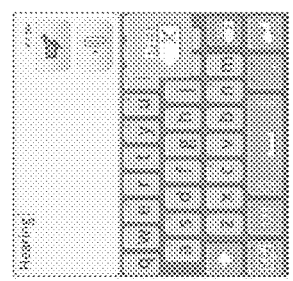
Figure 30G:
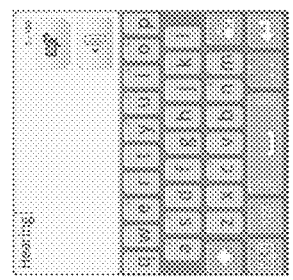

FIGS. 30F and 30G illustrate that when the user presses the delete key after performing any automatic or word modifying action, any modification to the original word are restored. This action will not be triggered if the user immediately repeats the sequence of actions. For example, with respect to a word "testing" that is assembled after the letters "ing" are automatically added, a first delete action will remove the letters "ing". However, selecting the word again and performing a second delete action will remove only the letter "g".

FIG. 30F illustrates in the case where the committed ComposingWord was originally an AutoCompletableWord. FIG. 30G illustrates the case where the committed ComposingWord was originally an AutoCompletableWord and AutoCorrectable, with a WordTail; performing the delete action restores the original word, and cursor position. In this case the committed word of "Hearing" is restored to "Testing". The cursor is also returned to a position after the fifth letter, restoring the WordTail state.

Figure 31A:
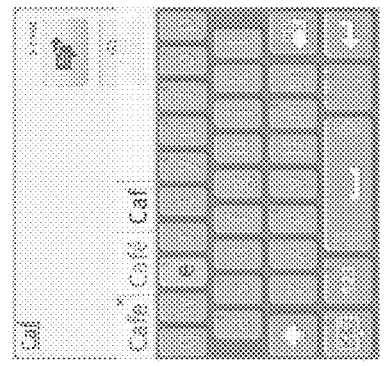
FIG. 31A to 31B each comprises a series of screenshots illustrating the KeyPreviewPopup functionality.
Figure 31A:
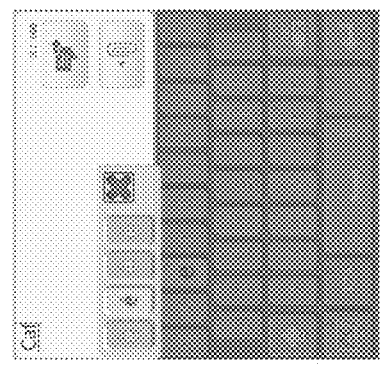
Figure 31A:
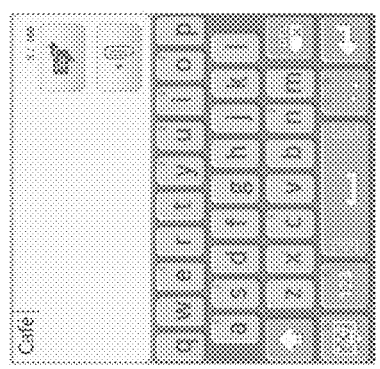

FIG. 31A comprises a series of screenshots illustrating that a key of a popup-mini-keyboard may be shaded via the KeyShading functionality when appropriate.

Figure 31B:
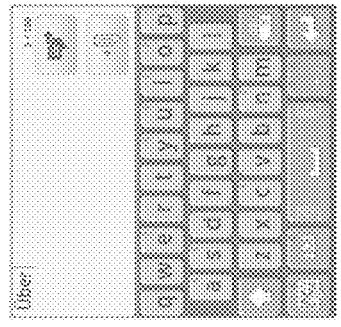
Figure 31B:
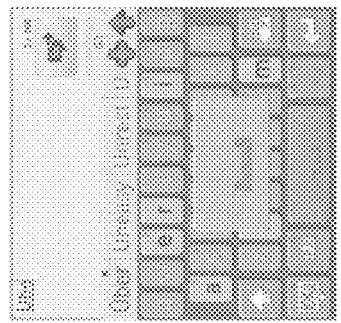
Figure 31B:
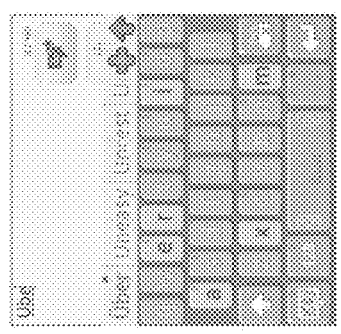
Figure 31B:
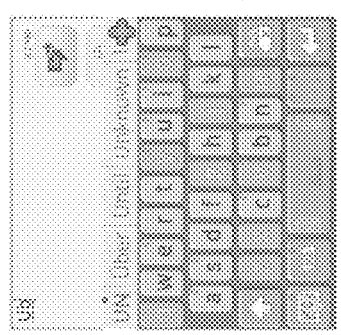
Figure 31B:
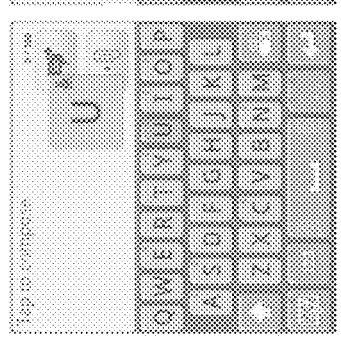

FIG. 31B comprises a series of screenshots illustrating an AutoCorrection operation where the letter "U" is substituted by the letter "Ü".

Figure 32:
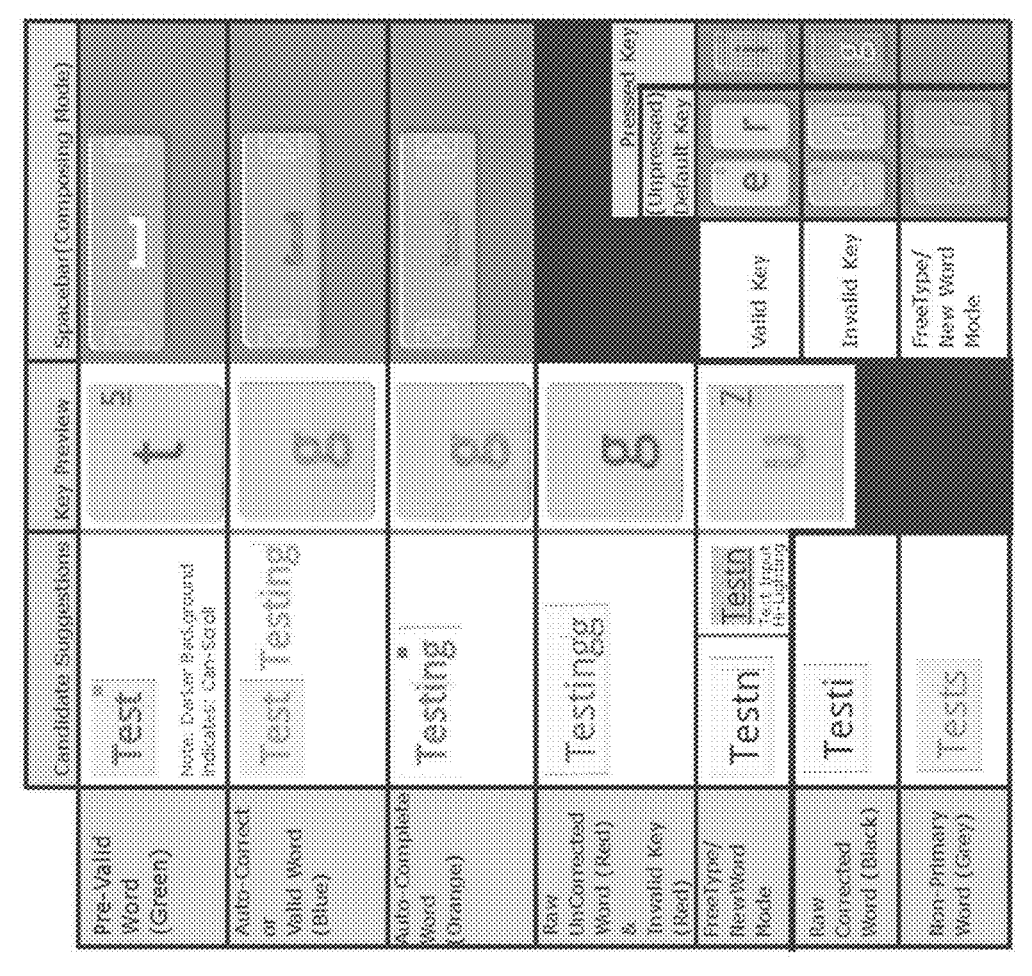

FIG. 32 comprises a table illustrating the different formats used by the smartphone 10 when implementing the various functionalities. For example, the table indicates that the smartphone 10 modifies the display of one of the suggested words (for example, the PrimaryValidWord) to change the colour of the word to blue when the ComposingWord is a Auto-correct word (that is, a AutoCorrectableWord).

Figure 33A:
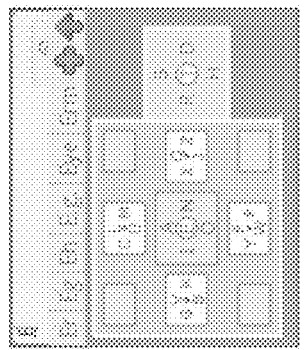
FIGS. 33A to 33J each comprises screenshots illustrating an alternative ChordKeys keyboard layout.
Figure 33A:
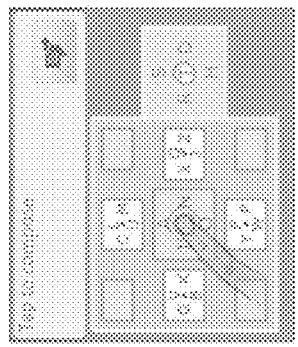
Figure 33A:
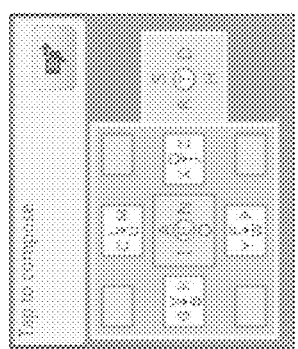

FIGS. 33A to 23I comprise screenshots illustrating an alternative ChordKeys keyboard layout.

ChordKeys allows a user to enter text using one hand. When using ChordKeys, keys are triggered via a sequence of actions. Keys are ordered into sets, with varying levels of accessibility, where the most frequently used characters are at the top level of accessibility.

FIG. 33A comprises a series of screenshots illustrating the selection of one of the Top Level Keys E and T. Specifically, the figure illustrates the selection of the Top Level Key E on the dominant side of the ChordKeys layout. As illustrated, pressing and releasing the Top Level Key E results in the letter E being committed.

In FIGS. 33A to 33I, the order of the letters in this presentation is a predetermined average, based on an analysis of letter frequency in the English language. The letters can be alternatively arranged to be similar to a QWERTY layout where the Top Level Keys are F and J with letter radiating from the Index Finger Keys, approximating a more familiar layout. Key layout can also be defined by the user.

Figure 33B:
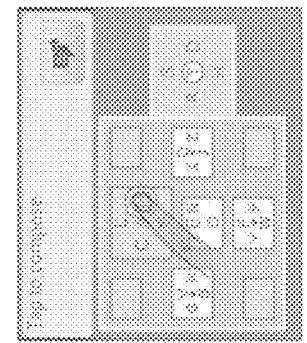
Figure 33B:
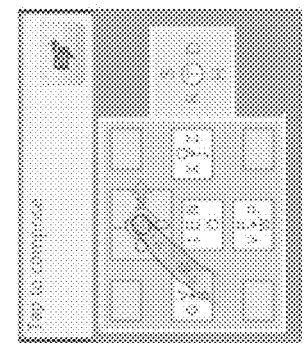
Figure 33B:
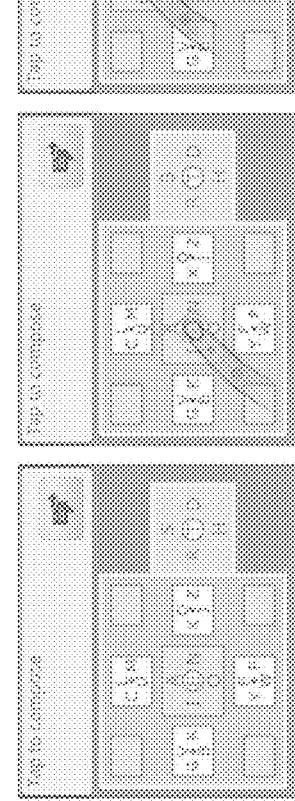
Figure 33B:
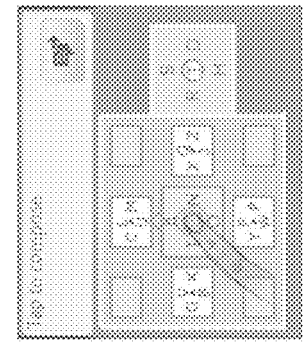

FIG. 33B comprises a series of screenshots illustrating the selection of one of the Second Level Keys A, I, O, N, S, D, H and R on the dominant side of the ChordKeys layout. As illustrated, such keys are accessible with a single stroke gesture.

Figure 33C:
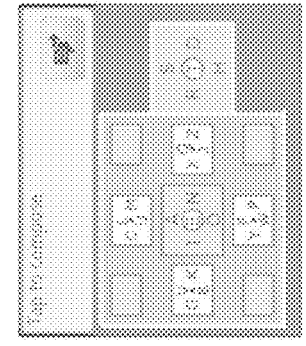

FIG. 33C comprises a series of screenshots illustrating the selection of one of the remaining Third Level Keys on the dominant side of the ChordKeys layout. As illustrated, the keys are accessible via an addition secondary level of user action, or additional portion of the tough-input. A two-part-stroke gesture or equivalent-user-action, in this case, up, and right, results in the letter M key being triggered.

Figure 33D:

FIG. 33D comprises a series of screenshots illustrating an alternative method of selecting one of the Third Level Keys on the dominant side of the ChordKeys layout using two fingers. In the process, the additional finger triggers the interface to replace the letters in the smaller (non-dominant) panel, on the right, changing the keys to those that are revealed, or uncovered, by the first fingers' gesture.

Figure 33E:
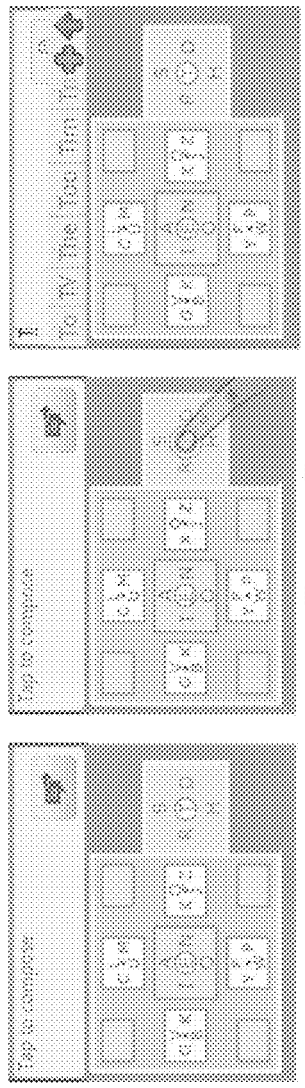
Figure 33F:
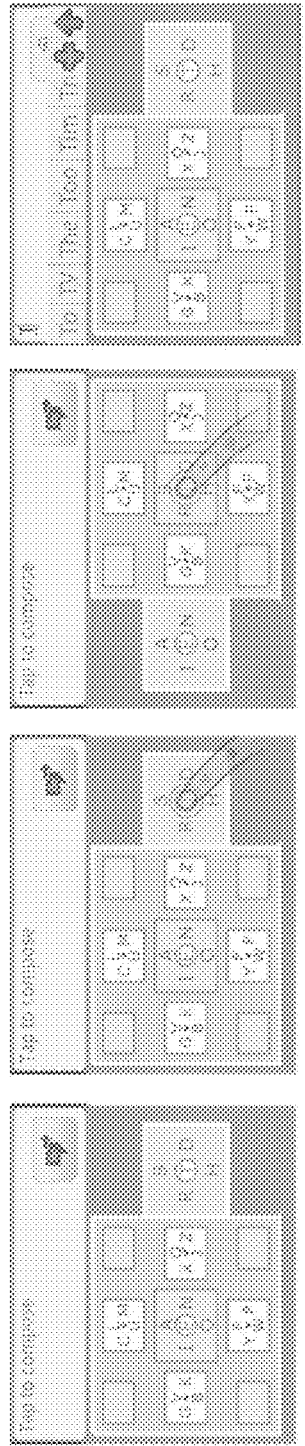

FIG. 33E comprises a series of screenshots illustrating the selection the Top Level Key T on the non dominant side of the ChordKeys layout. FIG. 33F comprises a series of screenshots illustrating that holding the Top Level Key T toggles the dominance of the keyboard, making all second and third level keys accessible from the other side of the keyboard.

Figure 33G:
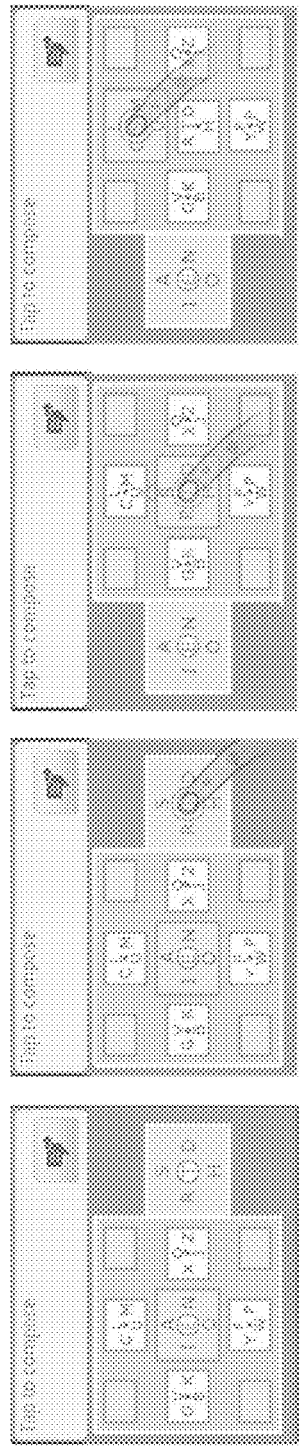

FIG. 33G comprises a series of screenshots illustrating the selection a Second Level Key on the non dominant side of the ChordKeys layout. As illustrated, holding the non-dominant side of the keyboard toggles the dominant-side of the keyboard. Adding a stroke/gesture leads to second level keys from the non-dominant side of the keyboard. In this instance, the letter S is selected. As with the above example, the user can force the change of dominance (changing between the dominant and non-dominant sides) without waiting for the system to change from the hold action.

Figure 33H:
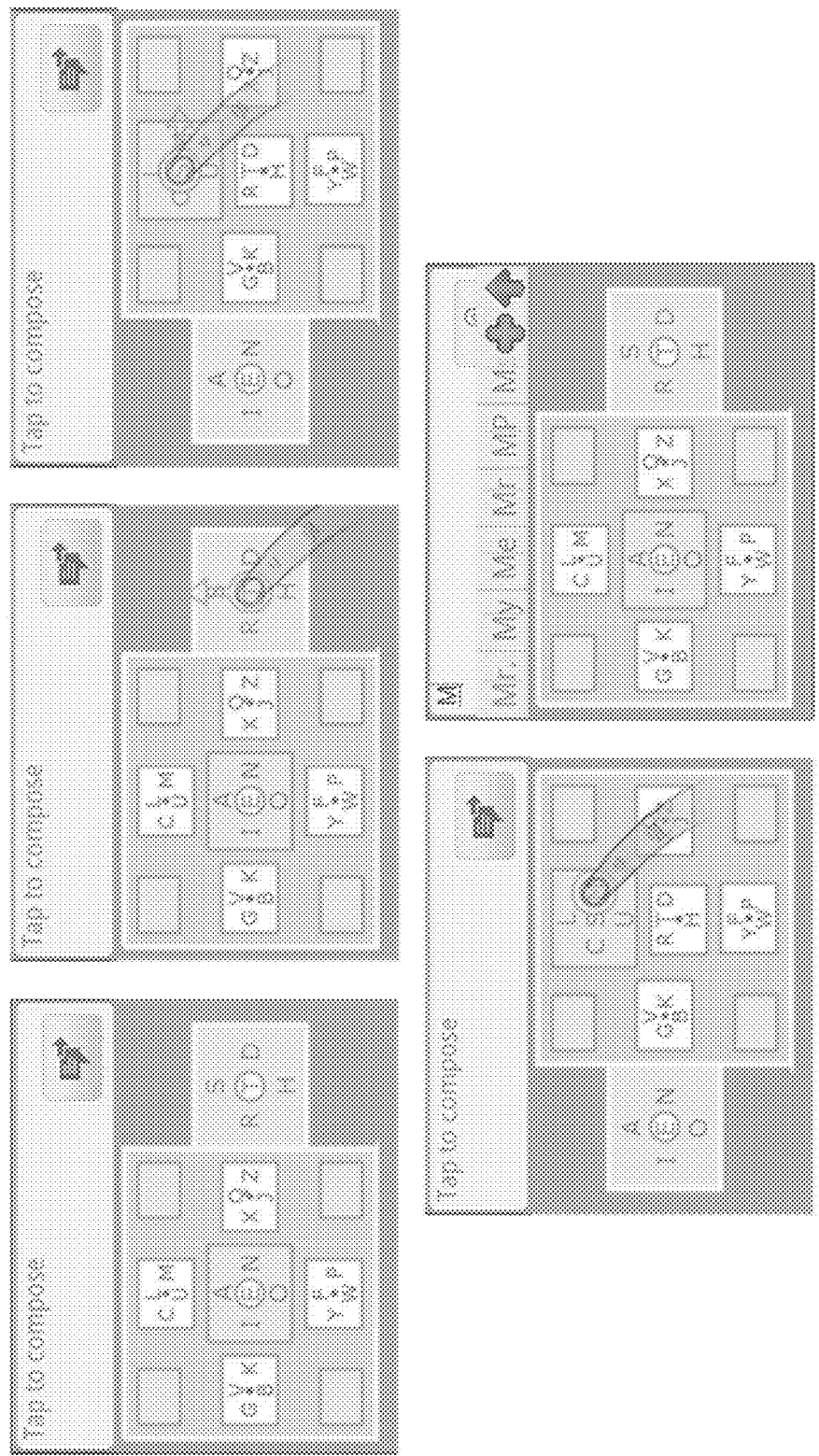

FIG. 33H comprises a series of screenshots illustrating the selection a Third Level Key on the non dominant side of the ChordKeys layout. As illustrated, a third level letter is accessed in the same way for each side-of-dominance, with the addition of the non-dominant hold action if triggered, rather than forced.

Figure 33I:
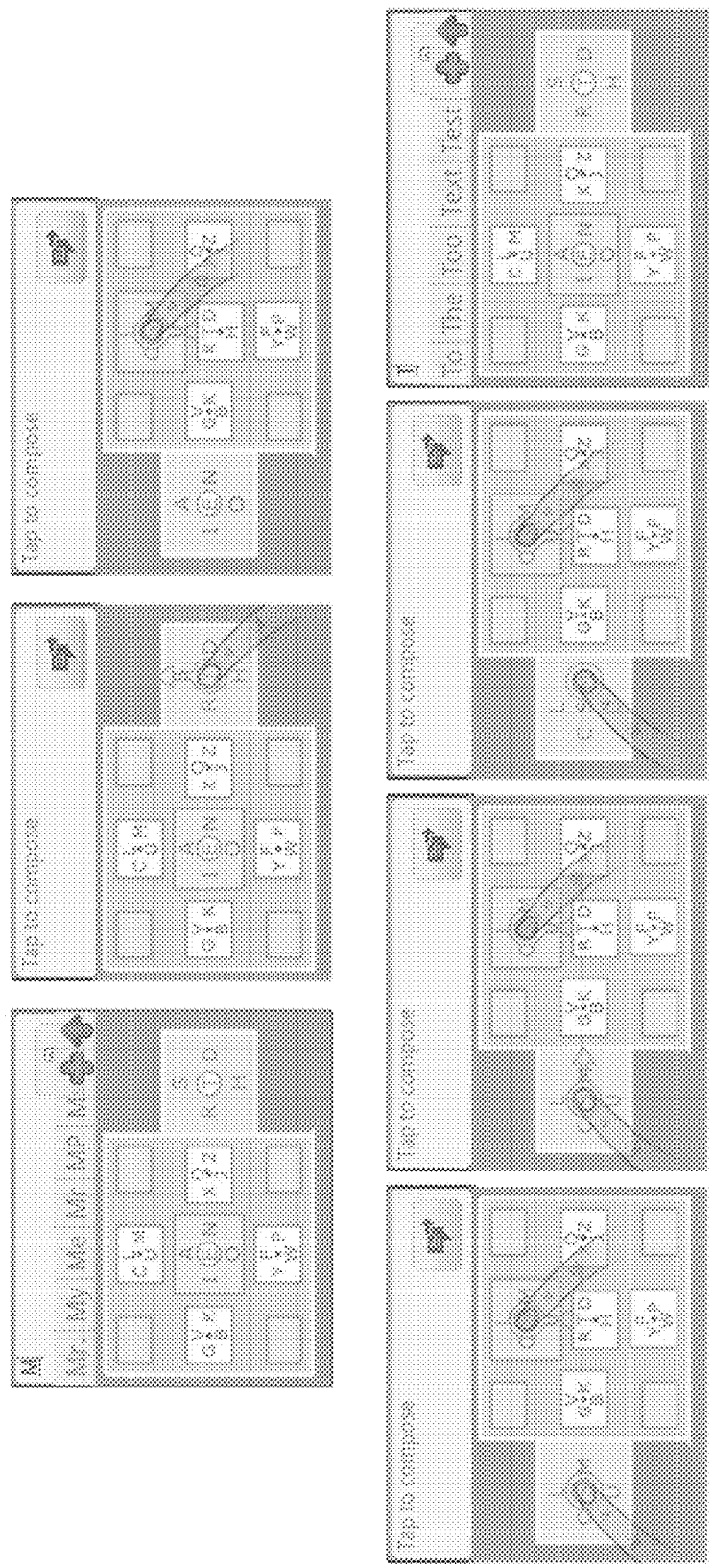
Figure 33J:
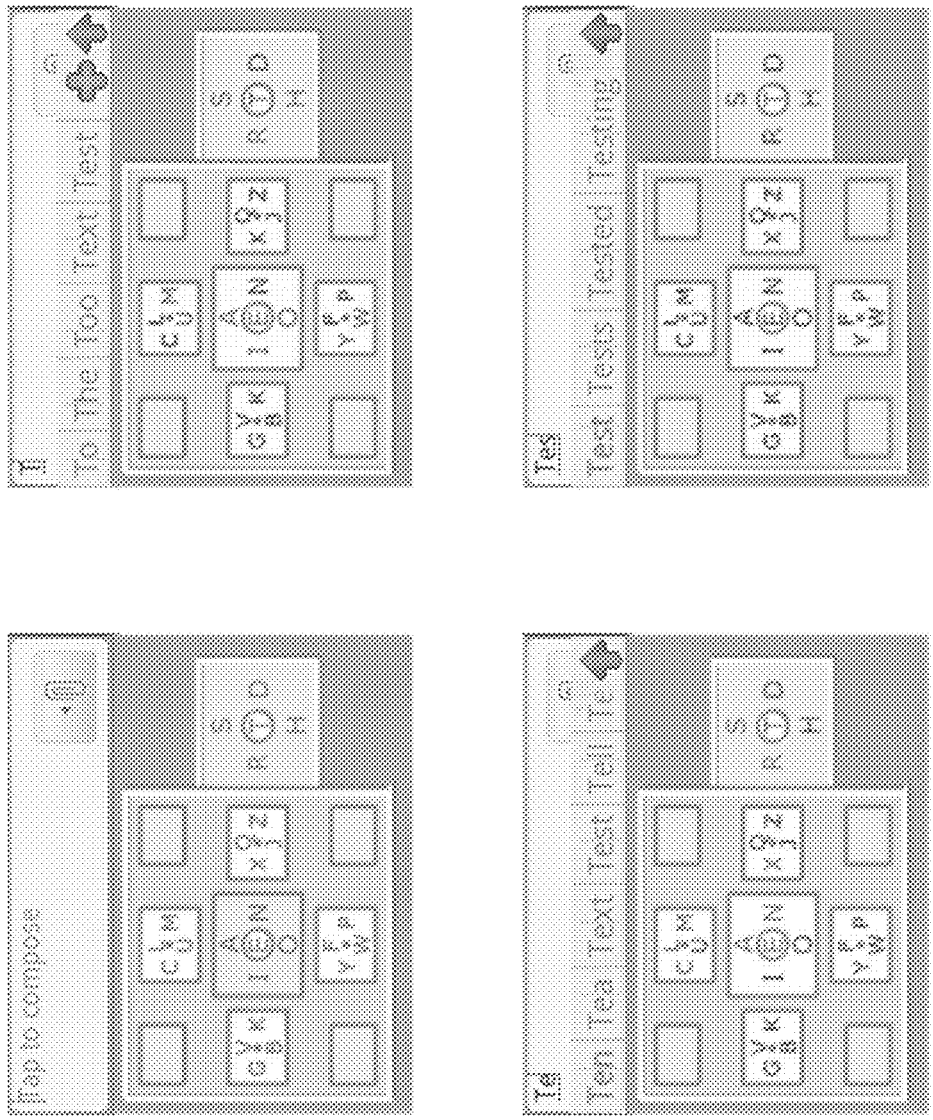

FIG. 33I comprises a series of screenshots illustrating an alternative method of selecting a Third Level Key on the non dominant side of the ChordKeys layout. This two fingered method of accessing a third-level-letter is similar to the non-dominant example, with regards to the rules illustrated throughout these sequences. The second-touch-input is use to perform the secondary portion of the two-part-stroke, triggering FIG. 33J comprises a series of screenshots illustrating the KeyShading functionality implemented on the ChordKeys layout where keys corresponding to valid subsequent letters are coloured differently to keys that do not correspond to valid subsequent letters.

FIGS. 34A to 34I comprises screenshots illustrating an alternative RadialKeys keyboard layout.

The RadialKeys keyboard layout can be used with a device that is not being held in a completely controllable manor, and provides an interface to complement, with regards to the compromised accuracy of user input and complementing methods of user inputs available in devices such as game controllers with directional inputs (such as thumbsticks and D-Pads), gyroscopic sensor and/or force sensors. Thus, the RadialKeys layout can be arranged to present the user with a variety of methods to select characters where a tradition ergonomic body position for typing is not available, or desired (for example, when the user is sitting on a couch using a small touchscreen device or using a game controller).

Figure 34A:
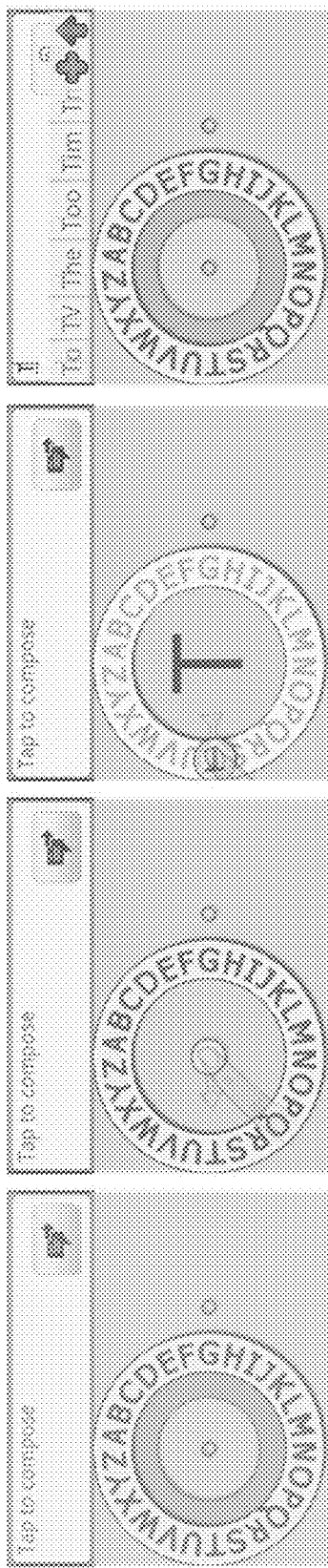
FIGS. 34A to 34F each comprises screenshots illustrating an alternative RadialKeys keyboard layout.

FIG. 34A comprises a series of screenshots illustrating the selection of one of the keys of the RadialKeys layout by pointing. Specifically, to select a key, the user moves the interactive-circle-selector to the desired key (a stroke action from the centre of the Radial Keyboard to the desired key). The circle selector expands on touch, indicating the process has been initiated.

Figure 34B:
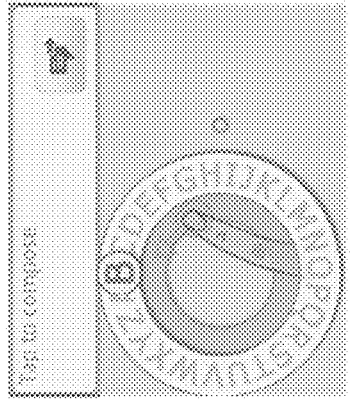

FIG. 34B comprises a series of screenshots illustrating an alternative method of selecting one of the keys of the RadialKeys layout by rotation where the user can rotate the Radial Keyboard to the desired key by holding the area indicated and rotate the interface as illustrated.

Figure 34C:
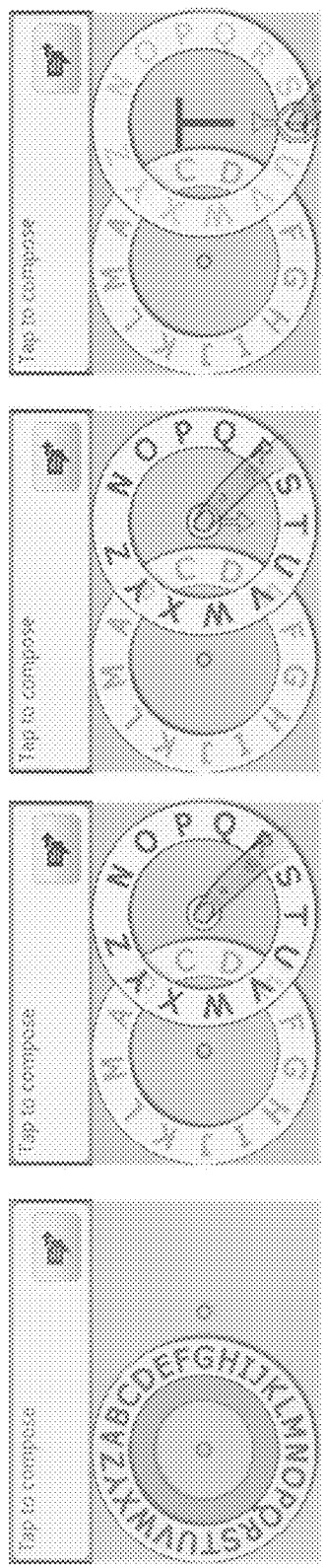

FIG. 34C comprises a series of screenshots illustrating a variant of the RadialKeys layout where there is a dominant radial selector and a non-dominant radial selector. If the user presses the non-dominant selector, the second radial selector splits the keys into the two radial selectors. The second band is used to continue a refined selection of the desired character, as illustrated.

Figure 34D:
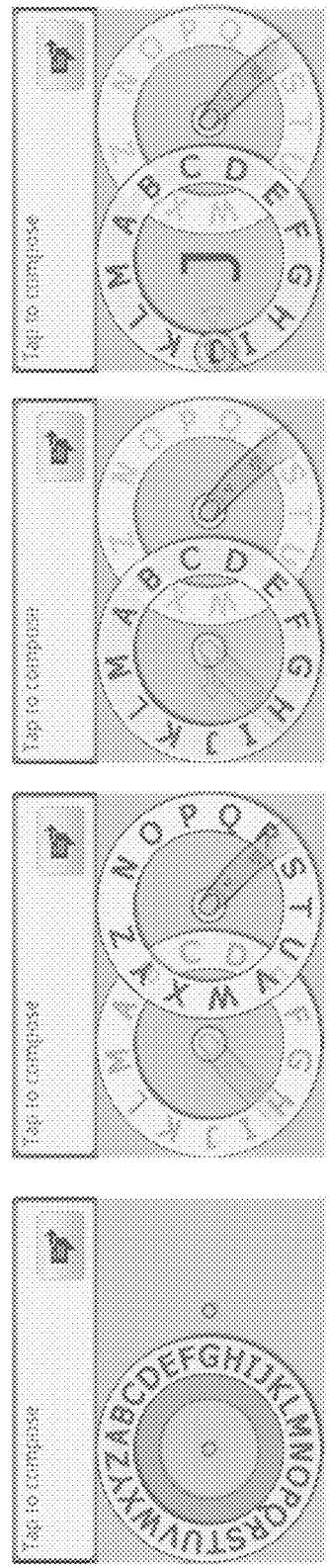

FIG. 34D comprises a series of screenshots illustrating that the user can take advantage of the reduced requirement for accuracy using the dual bands method of input, and also select a letter on the "other side", by using a second finger, as illustrated.

Figure 34E:
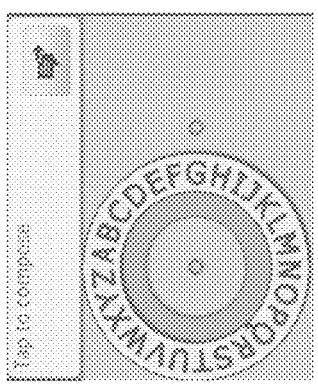
Figure 34E:
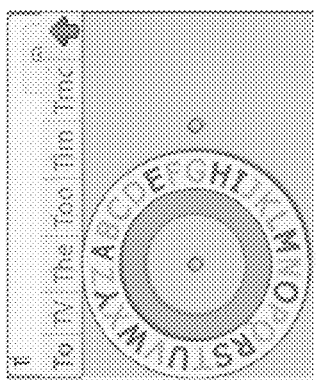
Figure 34E:
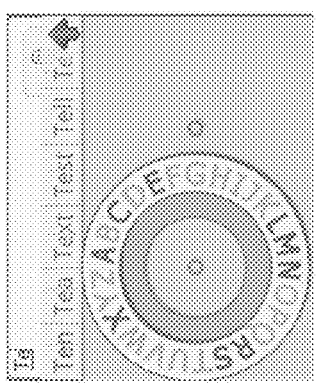
Figure 34E:
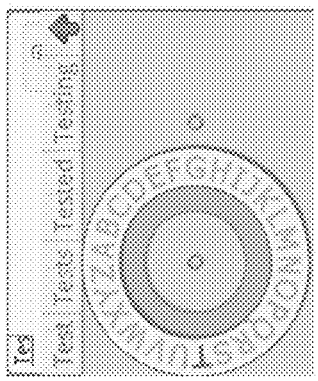
Figure 34F:
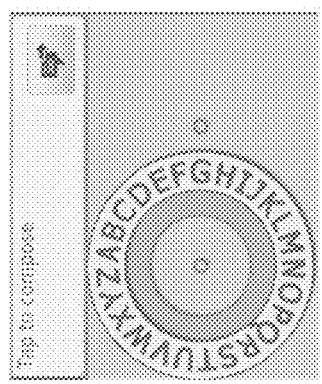
Figure 34F:
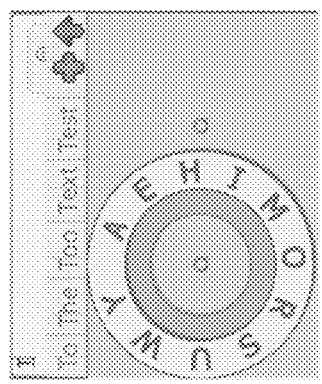
Figure 34F:
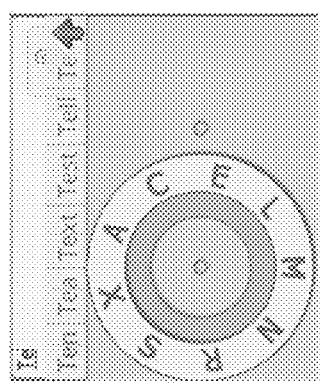
Figure 34F:
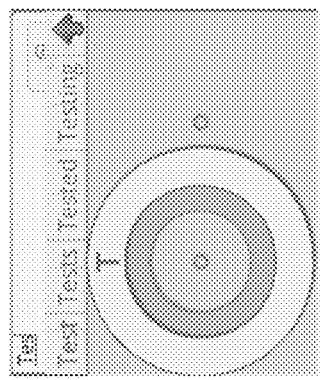

FIGS. 34E and 34F comprises two series of screenshots illustrating how the KeyShading functionality may be implemented on the RadialKeys keyboard layout.

FIGS. 35A to 35E comprises series of screenshots illustrating overriding key presses when using a combination of PreKeyCorrection and PostKeyCorrection, subject to the override tolerances set out in Tables K1 and L1 below. In these figures, InvalidLetterKeys are shaded in a darker colour than ValidLetterKeys and AdditionalValidLetterKeys. ValidLetterKeys are differentiated from AdditionalValidLetterKeys in that ValidLetterKeys are displayed in bold. ValidLetterKeys are also shaded in a slightly lighter colour than AdditionalValidLetterKeys. As mentioned above, ValidLetterKeys, AdditionalValidLetterKeys and InvalidKeys may additionally or alternatively be differentiated by size (for example, the size of the key), colour (for example, the colour of the key), and/or font attributes (for example, the size of the letter displayed on the key).

Figure 35A:
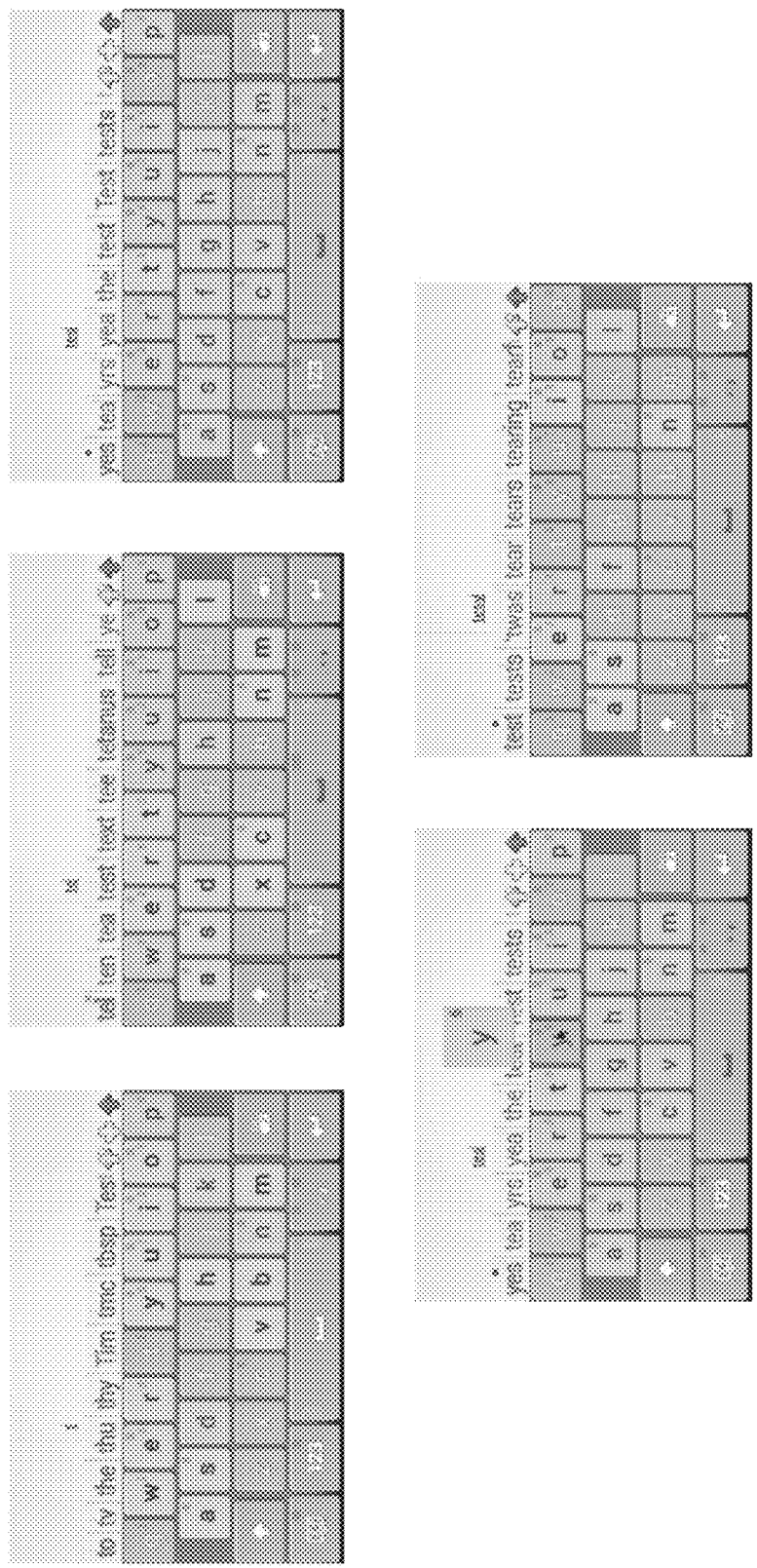
FIGS. 35A to 35E each comprises a series of screenshots illustrating overriding key presses when using a combination of PreKeyCorrection and PostKeyCorrection.

FIG. 35A comprises a series of screenshots illustrating an example where a user presses an AdditionalValidLetterKey ("y") close to a ValidLetterKey ("t"). Specifically, when the user accurately presses the letter "y" key in the fourth screenshot (that is, the first screenshot on the bottom row of screenshots), a KeyPreviewPopup of the AdditionalValidLetterKey ("y") is displayed, the PreKeyCorrection functionality dose not overrides the key press ("y"), the default behaviour.

Figure 35B:
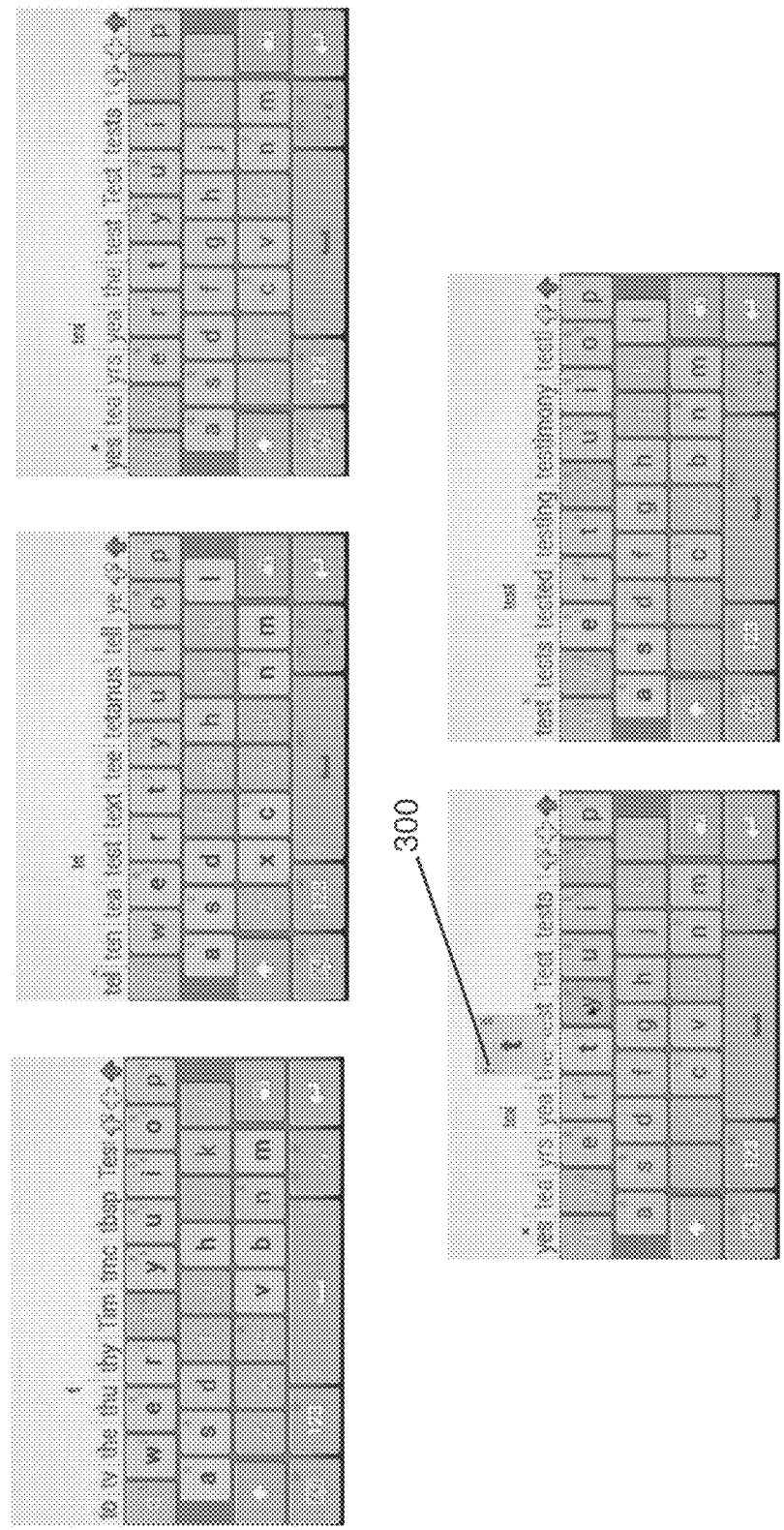

FIG. 35B comprises a series of screenshots illustrating another example where a user "inaccurately" presses an AdditionalValidLetterKey ("y") at a position of the key that is close to a ValidLetterKey ("t"). As shown in the fourth and fifth screenshots, not only is the key press ("y") replaced by the ValidLetterKey ("t"), a KeyPreviewPopup of the ValidLetterKey ("t") is also displayed when the user presses the AdditionalValidLetterKey ("y"), as indicated by 300.

Figure 35C:
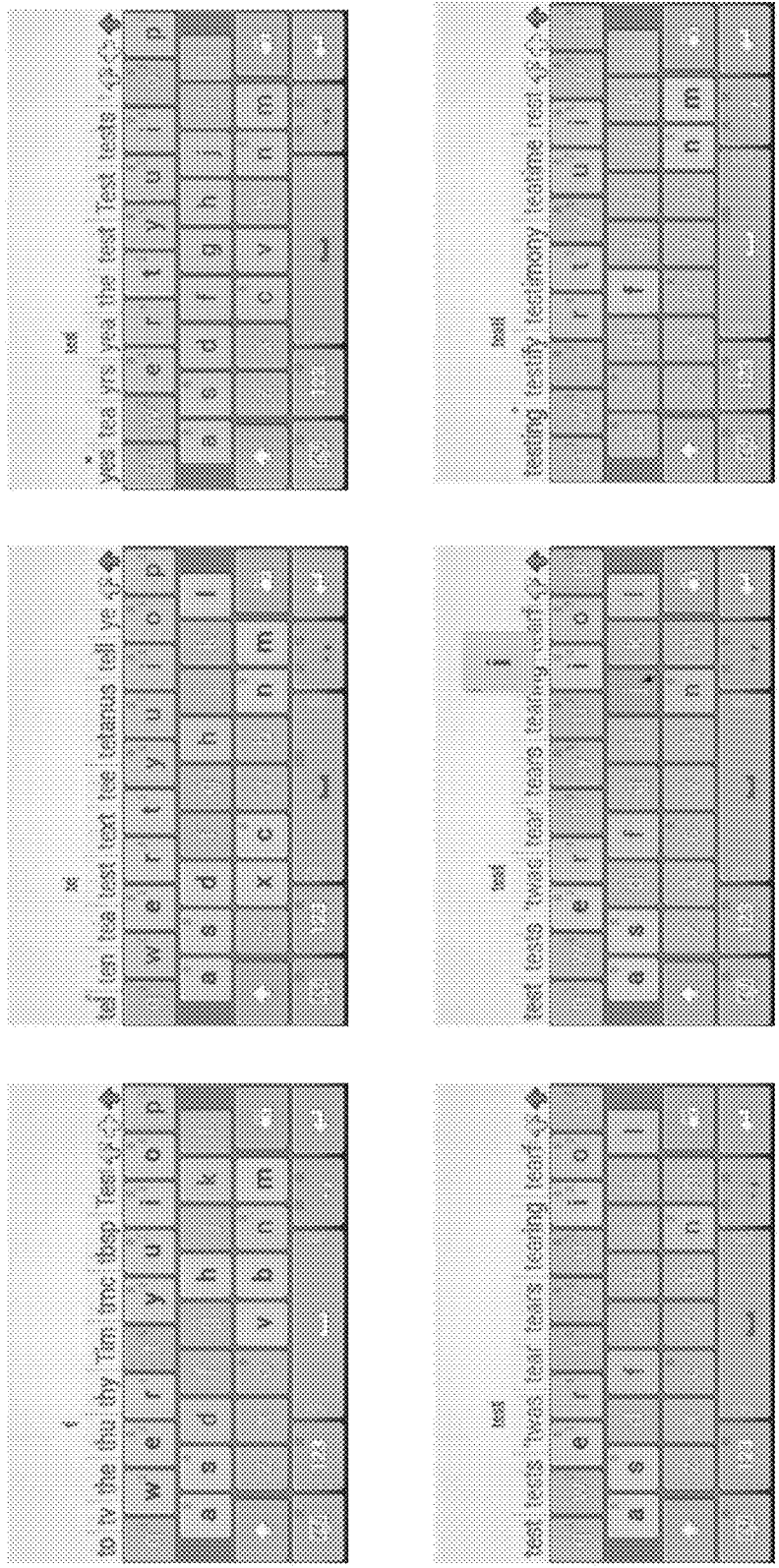

FIG. 35C comprises a series of screenshots illustrating another example where a user inaccurately presses an InvalidLetterKey ("j") close to both a ValidLetterKey ("i") and an AdditionalValidLetterKey ("n"). As shown in the fifth screenshot (that is, the middle screenshot on the bottom row of screenshots), even though the key press ("j") (as indicated by the pointer location) is closer to the AdditionalValidLetterKey ("n") than the ValidLetterKey ("i"), the PreKeyCorrection functionality overrides the key press with the ValidLetterKey ("i").

Figure 35D:
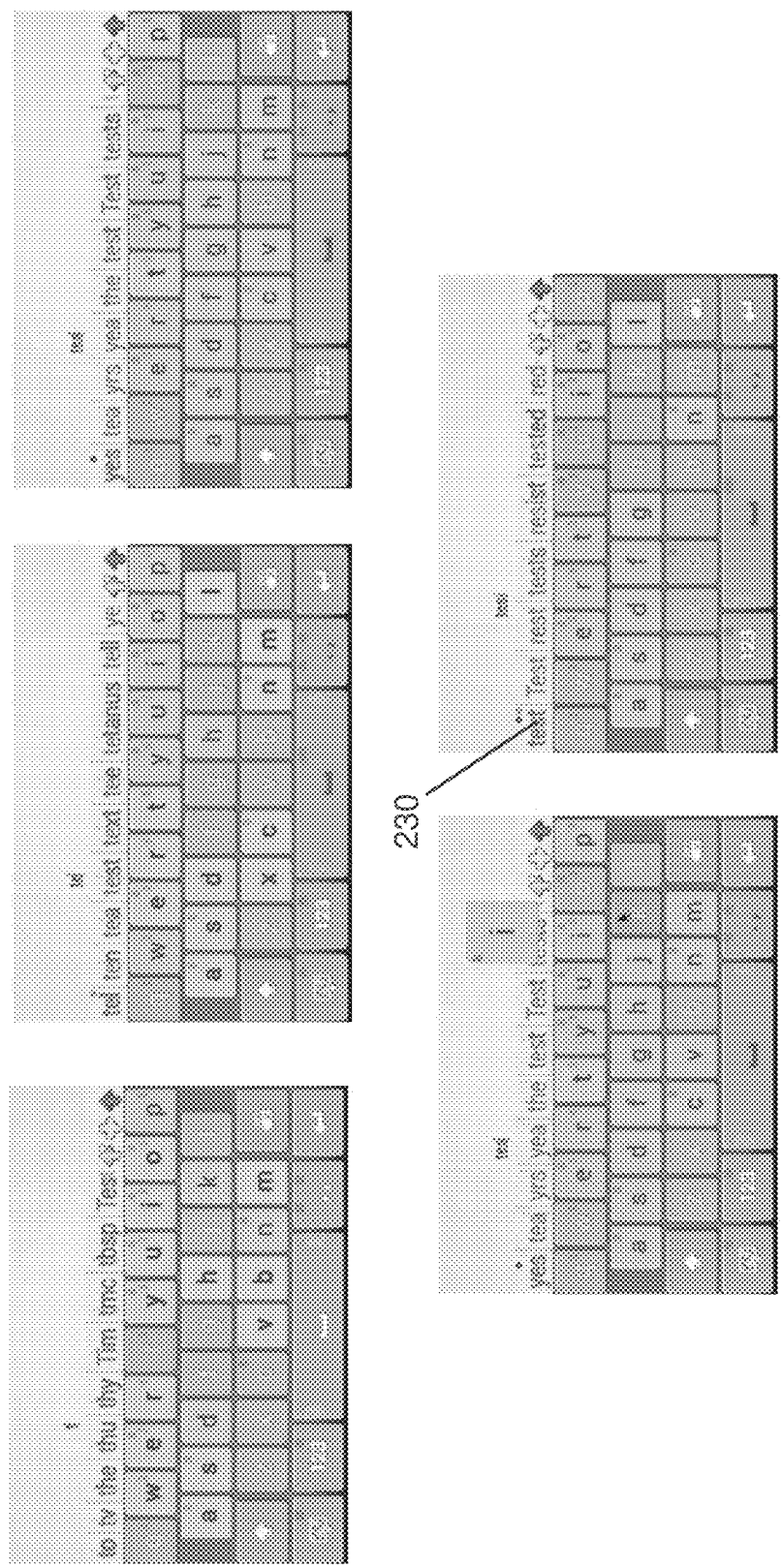

FIG. 35D comprises a series of screenshots illustrating another example where a user presses an InvalidLetterKey ("k") that is close to four AdditionalValidLetterKeys ("i", "j", "m" and "n"). As shown in the fourth screenshot, the key press ("j") (as indicated by the pointer location) is closer to the AdditionalValidLetterKey ("i") than the other AdditionalValidLetterKeys ("j", "m" and "n") and the key press is corrected with the AdditionalValidLetterKey ("i"). In this instance, the ValidLetterKey ("t")—the only ValidLetterKey in this instance—is the ValidLetterKey that is spatially closest to the key press ("k"), and the word "test" is included as a ValidWord in the ValidWordsPanel 230 as the PrimaryValidWord.

Figure 35E:
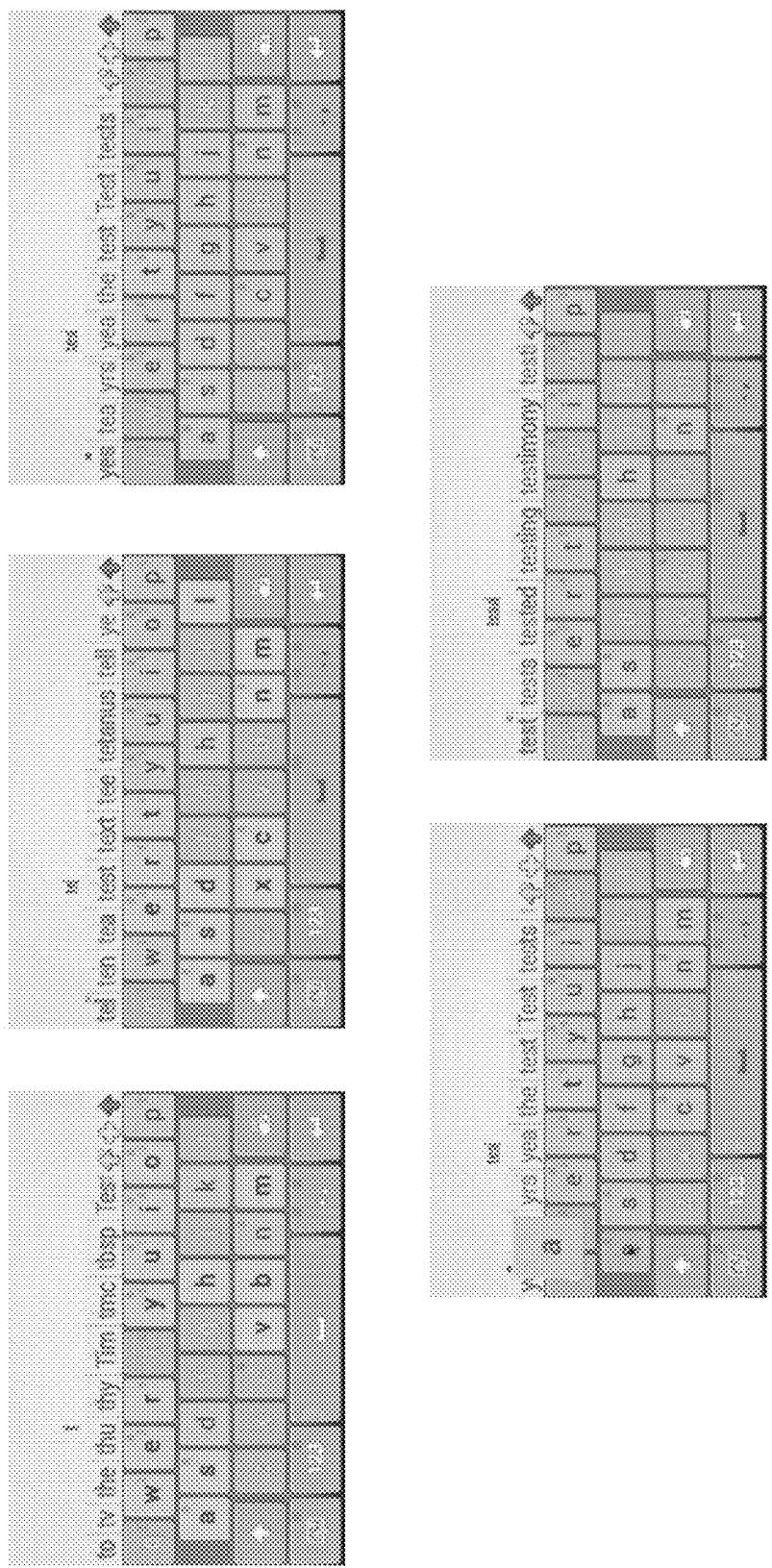

FIG. 35E comprises a series of screenshots illustrating another example where a user presses an AdditionalValidLetterKey ("a") and there are no neighboring ValidLetterKeys (the only ValidLetterKey in this instance is "t"). Again, the ValidWord "test" corresponding to the ValidLetterKey that is spatially closest to the key press ("k") is displayed in the ValidWordsPanel and in this instance also as the PrimaryValidWord.

Tables

As indicated above, the smartphone 10 of the above example is configured to modify the display of the keys or words displayed on the touchscreen 20 during operation. The tables below tabulate the various modifications applied to the various elements displayed by the touchscreen 20.

Keyboard:

| Condition | Color of letter associated with key | Key background color |
|---|---|---|
| ValidLetterKey | Black (24%) | Light Grey (85%) |
| AdditionalValidLetterKey | Dark Grey (35%) | Mid-Light Grey (80%) |
| Invalid LetterKey | Light Grey (87%) Letter | Grey (70%) |
| FreeType (Mode) Key | Green | Dark Grey (61%) |

Pop up previews:

| Condition | Color of letter associated with key | Color of ClosestValidLetterKey when overriding InvalidLetterKey press |
|---|---|---|
| PreValidWord | White | Background/Border Alternative Colour (Illustrated as a red letter: top-left) |
| AutoCorrectableWord | Blue (Display as White in diagrams) | Background/Border Alternative Colour (Illustrated as a red letter: top-left) |
| AutoCompletableWord | Orange | Background/Border Alternative Colour (Illustrated as a red letter: top-left) |
| InvalidLetterKey Override | Red | None |
| InvalidLetterKey | Green/FreeType Preview | None |

ValidWordsPanel:

| Condition | Color of the letters or words | WordTail Indicator |
|---|---|---|
| PreValidWord | Green | Text Underlined |
| AutoCorrectable Word | Blue | Text Underlined |
| AutoCompletable Word | Orange | Text Underlined |
| FreeType Mode | Black | Text Underlined |
| Other (Non Primary-Suggested) | Grey | Text Underlined |

Other modifications:

| Condition | Modification |
|---|---|
| WordTail | When editing a word, remaining characters of the original word are replaced with the new words remaining characters (from the point of the cursor) |
| WordTail Override | Retains the original WordStem, while retaining the remaining letters of the word (from the point of the cursor). A Space character is inserted in-between (as the action has been triggered by the spacebar. |
| New Sentence - Auto Capitalise | An empty TextField or a terminating punctuation character will automatically trigger the Shift state and display capitalised keys on the keyboard. |
| New Sentence - Auto Space | Entering a terminating punctuation character will automatically trigger the insertion of a Space character is the user strikes a Letter Key after the Punctuation Key, without entering a space character. |
| Punctuation | When a word is selected from the ValidWordsPanel, a space is automatically added, this space will be removed when a punctuation character is typed. |
| Retain Caps | When the first letter of a Capitalized word is deleted the keyboard is put into Capital Mode. |
| Auto Fill | Inserts the common letters where all suggested word share a common group of Next-Letter-Characters. |

The following table lists the action taken by the smartphone 10 in response to user inputs corresponding to system and non-letter keys.

Key Types (System and non-character Keys):

| Key Type | Key Name | Press | Double Press | Press & Hold |
|---|---|---|---|---|
| System | Keyboard Mode | Toggle Keyboard Mode | No special Functionality | Display Alternative Keyboards (Numeric Keypad) |
| System | Hide Keyboard | Hide Keyboard | No special Functionality | Open Setting Screen |
| Edit | Shift | Toggle Shift | Toggle Shift Lock | Toggle Shift Lock |
| Edit | Delete | Delete | No special Functionality | Try Rapid Delete |
| Punctuation | Smart Punctuation | Add Primary Character (Full Stop) | Add Secondary Character (Comer) | Display Popup Punctuation Mini-Keyboard |

The following tables (including tables A1 to J2) list the action taken by the smartphone 10 of the above examples in response to user inputs corresponding to letter and punctuation keys.

| Key Types (Letters and Punctuation): | | | |
|---|---|---|---|
| Description | WordTail | Table (Press) | Table (Release) |
| SpaceBar | No | A1 | A2 |
| Single Key - Valid | No | B1 | B2 |
| Single Key - Invalid | No | C1 | C2 |
| Single Key & Alternatives - Valid | No | D1 | D2 |
| Single Key & Alternatives - Invalid | No | E1 | E2 |
| SpaceBar | Yes | F1 | F2 |
| Single Key - Valid | Yes | G1 | G2 |
| Single Key - Invalid | Yes | H1 | H2 |
| Single Key & Alternatives - Valid | Yes | I1 | I2 |
| Single Key & Alternatives - Invalid | Yes | J1 | J2 |

TABLE A1

SpaceBar Press, Without WordTail

| Table A1 | PreValidWord | AutoCorrectableWord | AutoCompletableWord |
|---|---|---|---|
| Press | Display Preview (White) | Display Preview (Orange) note: change to blue | Display Preview (Orange) |
| Hold | Repeat Add Space | Trigger Condition: onRelease Add Space Trigger Condition: onRelease Commit ComposingWord or UnPreCorrected ComposingWord (where exists and ComposingWord does not exist) | Set Colour Coding to ComposingWord Trigger Condition: onRelease Add Space Trigger Condition: onRelease Commit ComposingWord or UnPreCorrected ComposingWord (Where exists and ComposingWord does not exist) |
| Long Hold | n/a | Trigger Condition: onRelease Commit UnPreCorrected ComposingWord (where exists) | Trigger Condition: onRelease Commit UnPreCorrected ComposingWord (where exists) |

TABLE A2

SpaceBar Release, Without WordTail

| Table A2 | PreValidWord | AutoCorrectableWord | AutoCompletableWord |
|---|---|---|---|
| Press | Commit Composing Word-Add Space Dismiss Preview | Commit PrimaryValidWord Add Space Dismiss Preview | Commit PrimaryValidWord Add Space Dismiss Preview |
| Hold | n/a | if onRelease Condition Trigged: Add Space if onRelease Condition Trigged: Commit ComposingWord/UnPreCorrected-ComposingWord Dismiss Preview | if onRelease Condition Trigged: Add Space if onRelease Condition Trigged: Commit ComposingWord/ UnPreCorrected-ComposingWord Dismiss Preview |
| Long Hold | n/a | if onRelease Condition Trigged: Add Space if onRelease Condition Trigged: Commit UnPreCorrected ComposingWord | if onRelease Condition Trigged: Add Space if onRelease Condition Trigged: Commit UnPreCorrected ComposingWord |

TABLE B1

Single Key - Valid Press, Without WordTrail

| Table B1 | PreValidWord | AutoCorrectableWord | AutoCompletableWord |
|---|---|---|---|
| Press | Display Preview (White) | Display Preview (Orange) note: change to blue | Display Preview (Orange) |
| Hold | n/a | n/a | n/a |
| Long Hold | n/a | n/a | n/a |

TABLE B2

Single Key - Valid Release, Without WordTail

| Table B2 | PreValidWord | AutoCorrectableWord | AutoCompletableWord |
|---|---|---|---|
| Press | Commit Key Dismiss Preview | Commit Key Dismiss Preview | Commit Key Dismiss Preview |
| Hold | n/a | n/a | n/a |
| Long Hold | n/a | n/a | n/a |

TABLE C1

Single Key - Invalid Press, Without WordTail

| Table C1 | PreValidWord | AutoCorrectableWord | AutoCompletableWord |
|---|---|---|---|
| Press | Compute ClosestValidLetterKey Display Preview-ClosestValidLetterKey (White) note: Change background/border to alt colour and display invalid letter in corner to indicate, closest valid Displayed. | Compute ClosestValidLetterKey Display Preview-ClosestValidLetterKey (Orange) note: change to blue note: Change background/border to alt colour and display invalid letter in corner to indicate, closest valid Displayed. | Compute ClosestValidLetterKey Display Preview-ClosestValidLetterKey (Orange) note: Change background/border to alt colour and display invalid letter in corner to indicate, closest valid Displayed. |
| Hold | Override ClosestValidLetterKey Display Preview (Green/FreeType preview). Trigger Condition: FreeType onRelease | Override ClosestValidLetterKey Display Preview (Green/FreeType preview). Trigger Condition: FreeType onRelease | Override ClosestValidLetterKey Display Preview (Green/FreeType preview). Trigger Condition: FreeType onRelease |
| Long Hold | n/a | n/a | n/a |

TABLE C2

Single Key - Invalid Release, Without WordTail

| Table C2 | PreValidWord | AutoCorrectableWord | AutoCompletableWord |
|---|---|---|---|
| Press | Commit Key (ClosestValidLetterKey) Dismiss Preview | Commit Key (ClosestValidLetterKey) Dismiss Preview | Commit Key (ClosestValidLetterKey) Dismiss Preview |
| Hold | Set FreeType Mode (Override Key Shading) Commit Key (Raw/Invalid) Dismiss Preview | Set FreeType Mode (Override Key Shading) Commit Key (Raw/Invalid) Dismiss Preview | Set FreeType Mode (Override Key Shading) Commit Key (Raw/Invalid) Dismiss Preview |
| Long Hold | n/a | n/a | n/a |

TABLE D1

Sinale Key & Alternatives - Valid Press, Without WordTail

| Table D1 | PreValidWord | AutoCorrectableWord | AutoCompletableWord |
|---|---|---|---|
| Press | Display Preview (White) | Display Preview (Orange) note: change to blue | Display Preview (Orange) |
| Hold | Dismiss Preview Display Popup Mini-Keyboard for Alternative Characters | Dismiss Preview Display Popup Mini-Keyboard for Alternative Characters | Dismiss Preview Display Popup Mini-Keyboard for Alternative Characters |
| Long Hold | n/a | n/a | n/a |

TABLE D2

Single Key & Alternatives - Valid Release, Without WordTail

| Table D2 | PreValidWord | AutoCorrectableWord | AutoCompletableWord |
|---|---|---|---|
| Press | Commit Key<br>Dismiss Preview | Commit Key<br>Dismiss Preview | Commit Key<br>Dismiss Preview |
| Hold | n/a | n/a | n/a |
| Long Hold | n/a | n/a | n/a |

TABLE E1

Single Key & Alternatives - Invalid Release, Without WordTail

| Table E1 | PreValidWord | AutoCorrectableWord | AutoCompletableWord |
|---|---|---|---|
| Press | Compute ClosestValidLetterKey<br>Display Preview-ClosestValidLetterKey (White)<br>note: Change background/border to alt colour to indicate, closest valid Displayed. | Compute ClosestValidLetterKey<br>Display Preview-ClosestValidLetterKey (Orange)<br>note: change to blue<br>note: Change background/border to alt colour to indicate, closest valid Displayed. | Compute ClosestValidLetterKey<br>Display Preview-ClosestValidLetterKey (Orange)<br>note: Change background/border to alt colour to indicate, closest valid Displayed. |
| Hold | Override ClosestValidLetterKey<br>Display Preview (Green/FreeType preview).<br>Trigger Condition: FreeType onRelease | Override ClosestValidLetterKey<br>Display Preview (Green/FreeType preview).<br>Trigger Condition: FreeType onRelease | Override ClosestValidLetterKey<br>Display Preview (Green/FreeType preview).<br>Trigger Condition: FreeType onRelease |
| Long Hold | Display Popup Mini-Keyboard for Alternative Characters | Display Popup Mini-Keyboard for Alternative Characters | Display Popup Mini-Keyboard for Alternative Characters |

TABLE E2

Single Key & Alternatives - Invalid Release, Without WordTail

| Table E2 | PreValidWord | AutoCorrectableWord | AutoCompletableWord |
|---|---|---|---|
| Press | Commit Key (ClosestValidLetterKey)<br>Dismiss Preview | Commit Key (ClosestValidLetterKey)<br>Dismiss Preview | Commit Key (ClosestValidLetterKey)<br>Dismiss Preview |
| Hold | if onRelease Condition: Set FreeType Mode Timeout Valid (Override Key Shading)<br>Commit Key (Raw/Invalid)<br>Dismiss Preview | if onRelease Condition: Set FreeType Mode Timeout Valid (Override Key Shading)<br>Commit Key (Raw/Invalid)<br>Dismiss Preview | if onRelease Condition: Set FreeType Mode Timeout Valid (Override Key Shading)<br>Commit Key (Raw/Invalid)<br>Dismiss Preview |
| Long Hold | n/a | n/a | n/a |

TABLE F1

Spacebar Press, With WordTail

| Table F1 | PreValidWord | AutoCorrectableWord | AutoCompletableWord |
|---|---|---|---|
| Press | Display Preview (White) | Display Preview (Orange)<br>note: change to blue | Display Preview (Orange) |
| Hold | Repeat Add Space | OverRide Default Behaviour (Repeat Add | Set Colour Coding to ComposingWord |

TABLE F1-continued

Spacebar Press, With WordTail

| Table F1 | PreValidWord | AutoCorrectableWord | AutoCompletableWord |
|---|---|---|---|
| | Retain WordTail | Space) Clear WordTail Indicator (ValidWords Underlined) Trigger Condition: OnRelease-Retain wordTail | Trigger Condition: onRelease Add Space Trigger Condition: onRelease Commit ComposingWord |
| Long Hold | n/a | n/a | Clear WordTail Indicator (Clear ValidWords Underlined) Trigger Condition: OnRelease-Retain wordTail |

TABLE F2

Spacebar Release, With WordTail

| Table F2 | PreValidWord | AutoCorrectableWord | AutoCompletableWord |
|---|---|---|---|
| Press | Commit ComposingWord-Add Space Indirect Retain WordTail Dismiss Preview | Commit PrimaryValidWord Add Space Clear WordTail Dismiss Preview | Commit PrimaryValidWord Add Space Clear WordTail Dismiss Preview |
| Hold | n/a | if onRelease Condition Trigged: Add Space if onRelease Condition Trigged: Commit ComposingWord Retain WordTail Dismiss Preview | if onRelease Condition Trigged: Add Space if onRelease Condition Trigged: Commit ComposingWord Clear WordTail Dismiss Preview |
| Long Hold | n/a | n/a | if onRelease Condition Trigged: Commit ComposingWord if onRelease Condition Trigged: Add Space if onRelease Condition Trigged: Retain wordTail Dismiss Preview |

TABLE G1

Single Key - Valid Press, With WordTail

| Table G1 | PreValidWord | AutoCorrectableWord | AutoCompletableWord |
|---|---|---|---|
| Press | Display Preview (White) | Display Preview (Orange) note: change to blue | Display Preview (Orange) |
| Hold | n/a | n/a | n/a |
| Long Hold | n/a | n/a | n/a |

TABLE G2

Single Key - Valid Release, With WordTail

| Table G2 | PreValidWord | AutoCorrectableWord | AutoCompletableWord |
|---|---|---|---|
| Press | Remove WordTail Commit Key Dismiss Preview | Remove WordTail Commit Key Dismiss Preview | Remove WordTail Commit Key Dismiss Preview |
| Hold | n/a | n/a | n/a |
| Long Hold | n/a | n/a | n/a |

TABLE H1

Single Key - Invalid Release, With WordTail

| Table H1 | PreValidWord | AutoCorrectableWord | AutoCompletableWord |
|---|---|---|---|
| Press | Compute ClosestValidLetter Key Display Preview-ClosestValidLetter Key (White) note: Change background/border to alt colour to indicate, closest valid Displayed. | Compute ClosestValidLetterKey Display Preview-ClosestValidLetterKey (Orange) note: change to blue note: Change background/border to alt colour to indicate, closest valid Displayed. | Compute ClosestValidLetterKey Display Preview-ClosestValidLetterKey (Orange) note: Change background/border to alt colour to indicate, closest valid Displayed. |
| Hold | Override ClosestValidLetter Key Display Preview (Green/FreeType preview). Trigger | Override ClosestValidLetterKey Display Preview (Green/FreeType preview). Trigger Condition: FreeType | Override ClosestValidLetterKey Display Preview (Green/FreeType preview). Trigger Condition: FreeType |

TABLE H1-continued

Single Key - Invalid Release, With WordTail

| Table H1 | PreValidWord | AutoCorrectableWord | AutoCompletableWord |
|---|---|---|---|
| | Condition: FreeType onRelease | onRelease | onRelease |
| Long Hold | n/a | n/a | n/a |

TABLE H2

Single Key - Invalid Release, With WordTail

| Table H2 | PreValidWord | AutoCorrectableWord | AutoCompletableWord |
|---|---|---|---|
| Press | Commit Key (ClosestValidLetterKey) Dismiss Preview | Commit Key (ClosestValidLetter Key) Dismiss Preview | Commit Key (ClosestValidLetterKey) Dismiss Preview |
| Hold | Set FreeType Mode (Override Key Shading) Commit Key Dismiss Preview | Set FreeType Mode (Override Key Shading) Commit Key Dismiss Preview | Set FreeType Mode (Override Key Shading) Commit Key Dismiss Preview |
| Long Hold | n/a | n/a | n/a |

TABLE I1

Single Key & Alternatives - Valid Press, With WordTail

| Table I1 | PreValidWord | AutoCorrectableWord | AutoCompletableWord |
|---|---|---|---|
| Press | Display Preview (White) | Display Preview (Orange) note: change to blue | Display Preview (Orange) |
| Hold | Dismiss Preview Display Popup-Mini-Keyboard for Alternative Characters | Dismiss Preview Display Popup-Mini-Keyboard for Alternative Characters | Dismiss Preview Display Popup-Mini-Keyboard for Alternative Characters |
| Long Hold | n/a | n/a | n/a |

TABLE I2

Single Key & Alternatives - Valid Release, With WordTail

| Table I2 | PreValidWord | AutoCorrectableWord | AutoCompletableWord |
|---|---|---|---|
| Press | Commit Key Dismiss Preview | Commit Key Dismiss Preview | Commit Key Dismiss Preview |
| Hold | n/a | n/a | n/a |
| Long Hold | n/a | n/a | n/a |

TABLE J1

Single Key & Alternatives - Invalid Press, With WordTail

| Table J1 | PreValidWord | AutoCorrectableWord | AutoCompletableWord |
|---|---|---|---|
| Press | Compute ClosestValidLetterKey Display Preview-ClosestValidLetterKey (White) note: Change background/border to alt colour to indicate, closest valid Displayed. | Compute ClosestValidLetter Key Display Preview-ClosestValidLetter Key (Orange) note: change to blue note: Change background/border to alt colour to indicate, closest valid Displayed. | Compute ClosestValidLetterKey Display Preview-ClosestValidLetterKey (Orange) note: Change background/border to alt colour to indicate, closest valid Displayed. |
| Hold | Override ClosestValidLetterKey Display Preview (Green/FreeType preview). Trigger | Override ClosestValidLetter Key Display Preview (Green/FreeType preview). | Override ClosestValidLetterKey Display Preview (Green/FreeType preview). Trigger |

TABLE J1-continued

Single Key & Alternatives - Invalid Press, With WordTail

| Table J1 | PreValidWord | AutoCorrectableWord | AutoCompletableWord |
|---|---|---|---|
|  | Condition: FreeType onRelease | Trigger Condition: FreeType onRelease | Condition: FreeType onRelease |
| Long Hold | Display Popup-Mini-Keyboard for Alternative Characters | Display Popup-Mini-Keyboard for Alternative Characters | Display Popup-Mini-Keyboard for Alternative Characters |

TABLE J2

Single Key & Alternatives - Invalid Release, With WordTail

| Table J2 | PreValidWord | AutoCorrectableWord | AutoCompletableWord |
|---|---|---|---|
| Press | Commit Key (ClosestValidLetter Key) Dismiss Preview | Commit Key (ClosestValidLetter Key) Dismiss Preview | Commit Key (ClosestValidLetter Key) Dismiss Preview |
| Hold | if onRelease Condition: Set FreeType Mode Timeout Valid (Override Key Shading) Commit Key Dismiss Preview | if onRelease Condition: Set FreeType Mode Timeout Valid (Override Key Shading) Commit Key Dismiss Preview | if onRelease Condition: Set FreeType Mode Timeout Valid (Override Key Shading) Commit Key Dismiss Preview |
| Long Hold | n/a | n/a | n/a |

With respect to the above table, where there is no valid keys available, invalid keys may be added (for example, as UnPreCorrected-ComposingWords).

Also, with respect to the above tables, any trigger condition or conditions are cleared after each user input. Also, with respect to the key presses, an extra long hold key press overrides a long hold key press which in turn overrides a hold key press which in turn overrides a normal key press (that is, non-hold key press).

TABLE K1

Override tolerances when using a combination of PreKeyCorrection and PostKeyCorrection

| Table K1 | Override tolerance |
|---|---|
| When key press is a ValidLetterKey | n/a |
| When key press is an AdditionalValidLetterKey | Override with a ValidLetterKey if the key press (that is, the AdditionalValidLetterKey) is within ⅓ width (approximately) beyond key edges of the ValidLetterKey |
| When key press is an InValidKey | Override with the closest ValidLetterKey (that is, the ValidLetterKey closest to the key press (that is, the InValidKey)) if the key press is within a separation distance from the closest ValidLetterKey, the separation distance being ⅔ of the distance separating the closest ValidLetterKey and the closest AdditionalValidLetterKey |

TABLE L1

Keys that will be considered when overriding a key press, when using a combination of PreKeyCorrection and PostKeyCorrection

| Table L1 | Key count upper limit threshold |
|---|---|
| ValidLettersKeys | 2 (or more as defined by a program variable) closest ValidLetterKeys to the key press |
| AdditionalValidLettersKeys | all AdditionalValidLetterKeys within a spatial threshold (as defined by a program variable) |

It will be understood to persons skilled in the art of the invention that many modifications may be made without departing from the spirit and scope of the invention, in particular it will be apparent that certain functionalities of embodiments of the invention can be employed to form further embodiments.

It is to be understood that any reference to prior art made herein does not constitute an admission that the prior art formed or forms a part of the common general knowledge in the art in Australia or in any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated functionalities but not to preclude the presence or addition of further functionalities in various embodiments of the invention.

The invention claimed is:
1. A method of assembling a word comprising a sequence of letters according to one or more word assembly conventions, the method comprising:

storing in a memory a sequence of one or more letters of the word;

locating by a word locator of a processor both a set of one or more valid words and a set of one or more additional valid words from a plurality of possible words stored in a words database, each valid word comprising a sequence of one or more letters corresponding to the sequence of letters stored in the memory, each additional valid word comprising a sequence of one or more letters corresponding to a subset of the sequence of letters stored in the memory;

receiving, after the locating, by the processor a user input from a keyboard device having a plurality of keys respectively associated with a plurality of possible letters, the received user input corresponding to one of the keys of the keyboard device;

determining by a letter determiner of the processor whether or not a user input letter is a valid subsequent letter that validly continues from the sequence of letters stored in the memory based on both the set of valid words and the set of additional valid words located by the word locator, the user input letter being the possible letter associated with the key of the keyboard device corresponding to the user input received by the processor; and adding by a letter adder of the processor to the stored sequence of letters of the word either (i) the user input letters, when the letter determiner determines that the user input letter is a valid subsequent letter that validly continues from the sequence of letters stored in the memory based on both the located set of valid words and the located set of additional valid words, or (ii) a closest valid subsequent letter, when the letter determiner determines that the user input letter is not a valid subsequent letter that validly continues from the sequence of letters stored in the memory based on both the located set of valid words and the located set of additional valid words, wherein the method further comprises:
controlling by a display controller of the processor a display to display the keys of the keyboard device; and in response to the word locator locating the set of valid words:
determining by the letter determiner a set of one or more valid subsequent letters based on the set of valid words located by the word locator, wherein each valid subsequent letter validly continues from the sequence of letters stored in the memory;
controlling the display by the display controller to modify the display of the key associated with each valid subsequent letter;
determining by a key position determiner of the processor a display position of the key associated with the possible letter corresponding to each valid subsequent letter; and
determining by a closest key determiner of the processor the closest valid subsequent letter based on which one of the keys associated with the possible letters corresponding to the valid subsequent letters is displayed closest to the key corresponding to the user input.

2. A method as claimed in claim 1, further comprising controlling the display by the display controller to display one or more, or all, of the valid words located by the word locator, in response to the word locator locating the set of valid words.

3. A method as claimed in claim 2, further comprising:
in response to the word locator locating the set of valid words:
determining by a valid word set size determiner of the processor that the set of valid words consists of only one valid word; and
controlling the display by the display controller to modify the display of the valid word.

4. A method as claimed in claim 2, further comprising:
in response to the letter adder adding a letter to the sequence of letters stored in the memory:
determining by a letter number comparator of the processor that the stored sequence of letters of the word does not have the same number of letters as one of the set of valid words; and
controlling the display by the display controller to modify the display of the valid word that does not have the same number of letters as the stored sequence of letters of the word.

5. A method as claimed in claim 1, further comprising controlling the display by the display controller to display one or more, or all, of the additional valid words located by the word locator.

6. A method as claimed in claim 1, further comprising:
in response to the word locator locating the set of additional valid words:
determining by a valid word set size determiner of the processor that the set of additional valid words consists of only one additional valid word, and
controlling the display by the display controller to modify the display of the additional valid word.

7. A method as claimed in claim 1, further comprising:
in response to the letter adder adding a letter to the sequence of letters stored in the memory:
determining by a letter number comparator of the processor that the stored sequence of letters of the word has the same number of letters as one of the set of valid words; and
controlling the display by the display controller to modify the display of the valid word that has the same number of letters as the stored sequence of letters of the word.

8. A method as claimed in claim 1, further comprising:
in response to the word locator locating the set of more than one valid words:
determining by a common letter determiner of the processor that each of the valid words comprises a sequence of one or more common subsequent valid letters that (i) are common to all valid words, and that (ii) validly continue from the sequence of letters stored in the memory; and
adding by the letter adder the sequence of common subsequent valid letters to the sequence of letters stored in the memory.

9. A controller for assembling a word comprising a sequence of letters according to one or more word assembly conventions, the controller comprising:
a memory for storing a sequence of one or more letters of the word; and
a processor arranged to:
locate both a set of one or more valid words and a set of one or more additional valid words from a plurality of possible words stored in a words database, each valid word comprising a sequence of one or more letters corresponding to the sequence of letters stored in the memory, each additional valid word comprising a sequence of one or more letters corresponding to a subset of the sequence of letters stored in the memory;

receive a user input from a keyboard device having a plurality of keys respectively associated with a plurality of possible letters, the received user input corresponding to one of the keys of the keyboard device;

determine whether or not a user input letter is a valid subsequent letter that validly continues from the sequence of letters stored in the memory based on both the located set of valid words and the located set of additional valid words, the user input letter being the possible letter associated with the key of the keyboard device corresponding to the user input received by the processor; and add to the stored sequence of letters of the word either (i) the user input letter, when the processor determines that the user input letter is a valid subsequent letter that validly continues from the sequence of letters stored in the memory based on both the located set of valid words and the located set of additional valid words, add the user input letter to the stored sequence of letters of the word, or (ii) a closest valid subsequent letter, and when the processor determines that the user input letter is not a valid subsequent letter that validly continues from the sequence of letters stored in the memory based on both the located set of valid words and the located set of additional valid words, wherein the processor is further arranged to:

control a display to display the keys of the keyboard device; and in response to a location of the set of valid words:
  determine a set of one or more valid subsequent letters based on the set of valid words located by the word locator, wherein each valid subsequent letter validly continues from the sequence of letters stored in the memory;
  control the display to modify the display of the key associated with each valid subsequent letter;
  determine a display position of the key associated with the possible letter corresponding to each valid subsequent letter; and
  determine the closest valid subsequent letter based on which one of the keys associated with the possible letters corresponding to the valid subsequent letters is displayed closest to the key corresponding to the user input.

10. A controller as claimed in claim 9, wherein the processor is further arranged to control the display to display one or more, or all, of the located valid words, in response to a location of the set of valid words.

11. A controller as claimed in claim 10, wherein the processor is further arranged to:
  in response to a location of the set of valid words:
    determine that the set of valid words consists of only one valid word; and
    control the display to modify the display of the valid word.

12. A controller as claimed in claim 10, wherein the processor is further arranged to:
  in response an adding of a letter to the sequence of letters stored in the memory:
    determine that the stored sequence of letters of the word has the same number of letters as one of the set of valid words; and
    control the display to modify the display of the valid word that has the same number of letters as the stored sequence of letters of the word.

13. A controller as claimed in claim 10, wherein the processor is further arranged to:
  in response an adding of a letter to the sequence of letters stored in the memory:
    determine that the stored sequence of letters of the word does not have the same number of letters as one of the set of valid words; and
    control the display to modify the display of the valid word that does not have the same number of letters as the stored sequence of letters of the word.

14. A controller as claimed in claim 9, wherein the processor is further arranged to control the display to display one or more, or all, of the located additional valid words.

15. A controller as claimed in claim 9, wherein the processor is further arranged to:
  in response to a location of the set of additional valid words:
    determine that the set of additional valid words consists of only one additional valid word; and
    control the display to modify the display of the additional valid word.

16. A controller as claimed in claim 9, wherein the processor is further arranged to:
  in response a location of more than one valid words:
    determine that each of the valid words comprises a sequence of one or more common subsequent valid letters that (i) are common to all valid words, and that (ii) validly continue from the sequence of letters stored in the memory; and
    add the sequence of common subsequent valid letters to the sequence of letters stored in the memory.

* * * * *